(12) United States Patent
Fontana et al.

(10) Patent No.: US 9,335,791 B2
(45) Date of Patent: May 10, 2016

(54) STAND AND DRAWING-EASEL ATTACHED TO A KEYBOARD TO USE WITH MOBILE ELECTRONIC DEVICES

(71) Applicants: Gustavo Fontana, Framingham, MA (US); Matthew Esecson, Kailua, HI (US)

(72) Inventors: Gustavo Fontana, Framingham, MA (US); Matthew Esecson, Kailua, HI (US)

(73) Assignee: Gustavo Fotanan Inc.

( * ) Notice: Subject to any disclaimer, the term of this patent is extended or adjusted under 35 U.S.C. 154(b) by 375 days.

(21) Appl. No.: 13/860,667

(22) Filed: Apr. 11, 2013

(65) Prior Publication Data

US 2013/0279100 A1    Oct. 24, 2013

Related U.S. Application Data

(60) Provisional application No. 61/625,688, filed on Apr. 18, 2012.

(51) Int. Cl.
*G06F 1/16* (2006.01)
(52) U.S. Cl.
CPC ............ *G06F 1/1632* (2013.01); *G06F 1/1628* (2013.01); *G06F 1/1667* (2013.01); *G06F 1/1669* (2013.01)

(58) Field of Classification Search
CPC .............................. G06F 1/1632; G06F 1/1669
USPC ................ 361/679.08–679.2, 679.41–679.44
See application file for complete search history.

(56) References Cited

U.S. PATENT DOCUMENTS

| | | | | |
|---|---|---|---|---|
| 2003/0206395 A1* | 11/2003 | Jones | .................... | G06F 1/1616 361/679.19 |
| 2008/0142662 A1* | 6/2008 | Leung | .................. | G06F 1/1632 248/346.3 |

* cited by examiner

*Primary Examiner* — Ramon M Barrera
(74) *Attorney, Agent, or Firm* — White-Welker & Welker, LLC; Matthew T. Welker, Esq.

(57) ABSTRACT

A stand attached to a physical keyboard that holds devices with slate form-factor such as tablets, smartphones, media players and e-book readers. The keyboard-stand combination can hold devices in multiple angles optimal for reading, web-browsing, typing and drawing. The footprint of the keyboard-stand combination is expandable. A minimal 'storage-position' provides sufficient stability to be used on a table-top. The non-skid base surface of the stand prevents sliding when actuating mobile electronic devices with fingers. An 'extended-position' gives extra footprint and stability to be used in inclined planes or low-friction surfaces also preventing toppling. Optionally the stand can also hold a sliding-stylus for use with such mobile electronic device. Such stylus can be place in a storage position optimized for transport, or in an easy-to-reach inkwell.

21 Claims, 62 Drawing Sheets

14 a ⇔ a b ⇔ d

STAND AND DRAWING-EASEL ATTACHED TO A KEYBOARD TO USE WITH MOBILE ELECTRONIC DEVICES

CROSS REFERENCE TO RELATED APPLICATIONS

This application claims priority from U.S. Patent Application Ser. No. 61/625,688, entitled "Stand and drawing-easel attached to a keyboard to use with mobile electronic devices", filed on 18 Apr. 2012. The benefit under 35 USC §119e of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to external stands for mobile electronic devices. More specifically, the present invention relates to a stand and drawing-easel attached to a keyboard to use with slate or other equivalent mobile electronic devices.

BACKGROUND OF THE INVENTION

Devices with a slate form factor such as tables, smart-phones, media players and e-book readers are hard to hold for long periods of time. External stands can alleviate this problem in many situations.

Touch-input and pen-input methods are limited ergonomically when used for extended periods of time. External physical keyboards alleviate this problem for text entry. Easels or stands that hold the tablet can prevent the fatigue of constantly holding the tablet with one hand while pushing against it with the other hand for input directly with fingers or with a stylus.

Physically attaching accessories to mobile electronic devices, such as carrying cases with integrated stands, cases with integrated keyboards and/or cases with integrated pen-holders add weight, thickness and complexity to such devices and undermine their mobility virtues. Most of these accessories provide extra functionality but some have minimum stability when using them in places other than on a table-top. They also don't have very good grip to be placed on an inclined and/or uneven surface such as on a lap while sitting.

Most accessories require extra hardware components such as hinges and multiple moving parts to achieve multiple screen angles of the tablet. These accessories also add substantial complexity, size, weight, and possible failure points.

DEFINITIONS

"Slate" devices, which resemble writing slates, are tablet computers without a dedicated keyboard. For text input, users rely on handwriting recognition via an active digitizer, touching an on-screen keyboard using fingertips or a stylus, or using an external keyboard that can usually be attached via a wireless or USB connection.

"Slate" devices typically incorporate small 8.4-14.1 inches/21-36 centimeter LCD screens and have been popular in vertical markets such as health care, education, hospitality, aviation pilot documentation and maps, and field work. Applications for field work often require a tablet computer that has rugged specifications that ensure long life by resisting heat, humidity, and drop/vibration damage. This added focus on mobility and/or ruggedness often leads to elimination of moving parts that could hinder these qualities.

"Mobile electronic device" is a general term defined as including an encompassing any mobile electronic machine or computer such as, but not limited to a slate device, tablets, smartphones, media players, and e-book reader, computers, smartphones, IPADs, IPHONEs, and thin laptop. A mobile electronic device is any device with a computer processor and display screen. It may have a touch screen, but that is not required.

SUMMARY OF THE INVENTION

The present invention relates to a stand attached to a physical keyboard that holds devices with slate form-factor such as tables, smartphones, media players and e-book readers. The keyboard-stand combination can hold devices in multiple angles optimal for reading, web-browsing, typing and drawing. The footprint of the keyboard-stand combination is expandable.

A minimal 'storage-position' provides sufficient stability to be used on a table-top. The non-skid base surface of the stand prevents sliding when actuating mobile electronic devices with fingers. An 'extended-position' gives extra footprint and stability to be used in inclined planes or low-friction surfaces also preventing toppling. Optionally the stand can also hold a sliding-stylus for use with such mobile electronic device. Such stylus can be place in a storage position optimized for transport, or in an easy-to-reach inkwell.

| TABLE OF NUMERICAL REFERENCES | |
|---|---|
| 10 | stand core |
| 12 | extension wedge |
| 14 | sliding-stylus |
| 16 | stand-alone keyboard |
| 18 | slate-device |
| 20 | smartphone |
| 22 | slate-cover |
| 24 | slate-skin |
| 26 | smartphone-skin |
| 28 | privacy-shield-landscape |
| 30 | privacy-shield-portrait |
| 32 | anti-glare sheet |
| 34 | keyboard-cover |
| 36 | nesting area of stand core following the outline of 16 stand-alone keyboard |
| 38 | nesting area of stand core to place slate-device 18 or smartphone 20 in "writing with keyboard position" |
| 40 | nesting area of stand core to place slate-device 18 or smartphone 20 in "drawing easel position" |
| 42 | upper edge of 38 nesting section for "drawing easel position" provides extended support for tablets when used in "writing with keyboard position" |
| 44 | chamfer next to upper edge of 36 nesting section for "writing with keyboard position" |
| 45 | various profiles and protruding elements on slate-devices |
| 46 | base of stand core |
| 48 | length of 46 base of stand core |
| 50 | non-slip coating/padding on 46 base of stand core |
| 52 | blended bridge of the x-sections of 36 and 38 both nesting cross-section for slate placement |
| 54 | sharp transition of the x-sections of 36 and 38 both nesting cross-section for slate placement |
| 56 | open space defined by combination of functional cross-sections 38, 40 and 46 |
| 58 | pen-clip of 14 sliding-stylus |

TABLE OF NUMERICAL REFERENCES

| | |
|---|---|
| 60 | pen slot created on 52 blended bridge |
| 62 | pen tip of 14 sliding-stylus |
| 64 | central elongated cavity/slot of stand core on 52 blended bridge |
| 66 | sliding-rail on stand core for 'storage-position' of 12 extension wedge |
| 67 | sliding-rail on 12 extension wedge |
| 68 | sliding-rail on stand core for 'extended-position' of 12 extension wedge |
| 70 | central elongated cavity/slot of stand core on 44 chamfer next to upper edge of 36 |
| 72 | upper cut of 70 cavity |
| 74 | lower cut of 70 cavity |
| 76 | upper cut of 64 cavity |
| 78 | lower cut of 64 cavity |
| 80 | 5"plus screen mobile electronic device |
| 82 | 7"-8" screen slate-device |
| 84 | storage-position when 12 extension wedge fits under 16 stand-alone keyboard by sliding into 66 sliding-rail for 'storage-position' of stand core |
| 86 | extended-position when 12 extension wedge slides into 68 sliding-rail for 'extended-position' of stand core has extra support/stability needed for use on inclined or uneven areas |
| 88 | slate-device in landscape orientation |
| 90 | active screen area of slate-device 18 |
| 94 | slate-device in portrait orientation |
| 96 | home button of slate-device 18 or smartphone 20 |
| 100 | power-button of 16 stand-alone keyboard |
| 102 | protruding parts of 16 stand-alone keyboard outside its standard cross-section |
| 104 | softened edge in stand core for accommodating slide installation of 102 protruding parts |
| 106 | battery-door of 16 stand-alone keyboard |
| 108 | batteries for 16 stand-alone keyboard |
| 110 | width of 88 slate-device in landscape orientation |
| 112 | width of 16 stand-alone keyboard |
| 114 | width difference between 88 slate-device in landscape orientation and 16 stand-alone keyboard |
| 116 | physical keyboard key of 16 stand-alone keyboard to invoke 118 on-screen keyboard |
| 118 | on-screen keyboard of slate-device 18 |
| 120 | volume-down key of 16 stand-alone keyboard |
| 122 | volume-up key of 16 stand-alone keyboard |
| 124 | mute key of 16 stand-alone keyboard |
| 126 | charge/sync cable for smartphone 20 |
| 128 | width of 12 extension wedge |
| 130 | cut-out on 12 extension wedge |
| 132 | spaced-apart outer-walls of 12 extension wedge |
| 133 | thicker cross-section at converging end of 12 extension wedge |
| 134 | flat ground-plane |
| 136 | overhang on 130 cut-out handle on extension wedge |
| 138 | wall-mounted screw |
| 139 | wall |
| 140 | custom hook for 130 cut-out on extension wedge |
| 142 | generic drawer pull or hook |
| 144 | paring/on-off light on 16 stand-alone keyboard |
| 146 | see-through windows or holes on stand core |
| 148 | central circular cavity of stand core on 44 chamfer next to upper edge of 36 and upper wall of 36 writing with keyboard position nesting area |
| 150 | front-facing camera of slate-device 18 or smartphone 20 |
| 152 | rear-facing camera of slate-device 18 or smartphone 20 |
| 154 | office or household objects of desired height |
| 156 | user of slate-device 18 or smartphone 20 |
| 158 | keyboard shield |
| 160 | protruding keys of 16 stand-alone keyboard |
| 162 | portable objects |
| 164 | carrying bag |
| 166 | pinching sliding-rail |
| 168 | inkwell for 14 sliding-stylus |
| 170 | barrel-shelf for 14 sliding-stylus |
| 172 | sliding-tray in close position |
| 174 | sliding-tray in open position |
| 176 | sliding-stylus 14 eject window in stand core |
| 178 | outer rail on 172/174 sliding-tray |
| 180 | outer rail on stand core |
| 182 | center rail on 172/174 sliding-tray |
| 184 | center rail on stand core |
| 186 | guiding/assembly screws for 184 |
| 188 | Storage position |
| 190 | Extended position |
| 192 | Friction pin hinge |
| 198 | Movie mode |
| 200 | Conferencing mode |
| 202 | Friction hinge |
| 204 | Extended base |
| 206 | Attachment screws |
| 210 | Storage position |
| 212 | Extended position |
| 214 | Swiveling flange |
| 216 | Friction hinge |
| 220 | Drawing easel |
| 222 | Rail |
| 223 | Screws or Rivets |
| 228 | Thin device |
| 230 | Thicker device |

BRIEF DESCRIPTION OF THE SEVERAL VIEWS OF THE DRAWING

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following are detailed descriptions of the invention of exemplary embodiments. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Figure 1:
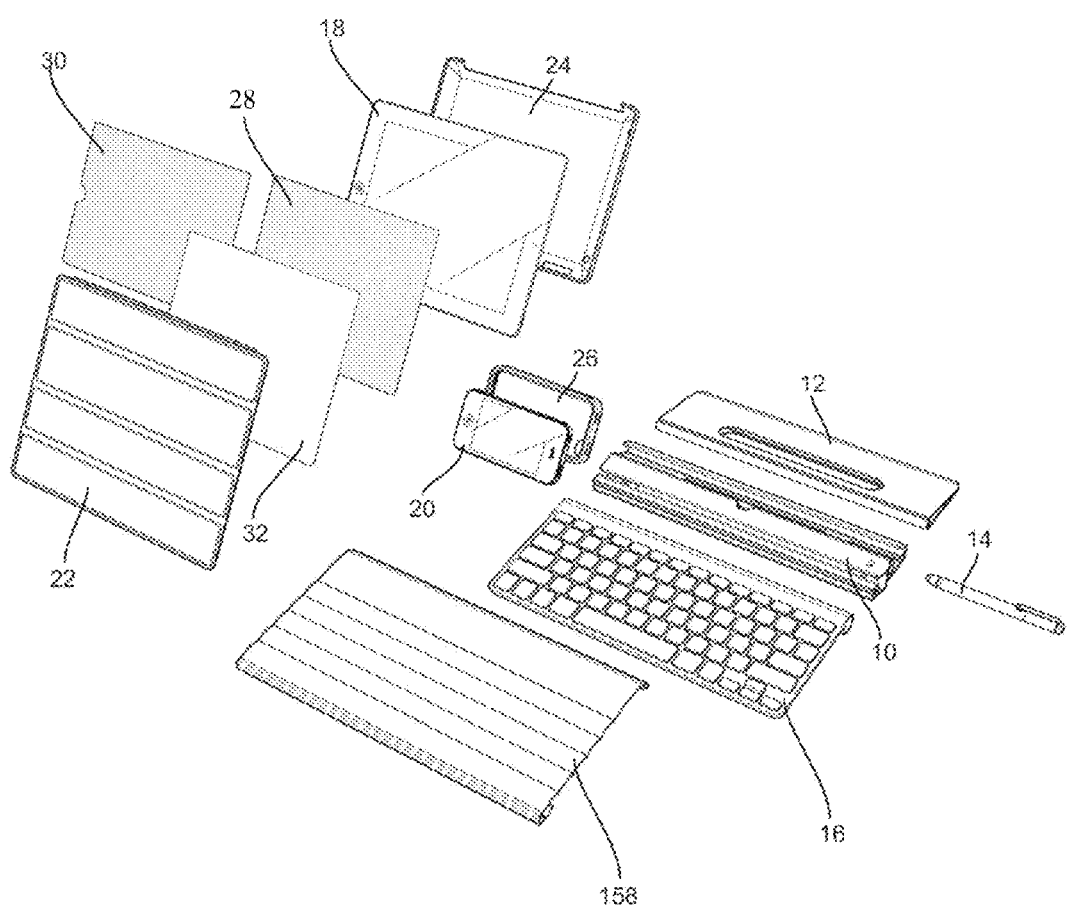
FIG. 1 Keyboard stand components, mobile electronic devices, and accessories. Exploded view.

Referring now to the invention in more detail, the keyboard stand, components, mobile electronic devices, and accessories are show in the figures. FIG. 1 illustrates an exploded view of one embodiment of the present invention. In this embodiment, the keyboard stand is made out of three parts: a stand-alone keyboard 16, a stand core 10, an extension wedge 12, and a keyboard shield 158. Also unique to this design are the optional accessories such as a privacy-shield-portrait 30, privacy-shield-landscape 28, and anti-glare-shield 32.

This keyboard stand design works with a stand-alone keyboard 16, and an existing sliding-stylus 14. It can accommodate a smartphone 20 with or without a smartphone-skin 26 or an slate-device 18 with or without a slate-skin 24 and/or with or without a slate-cover 22.

Figure 2:
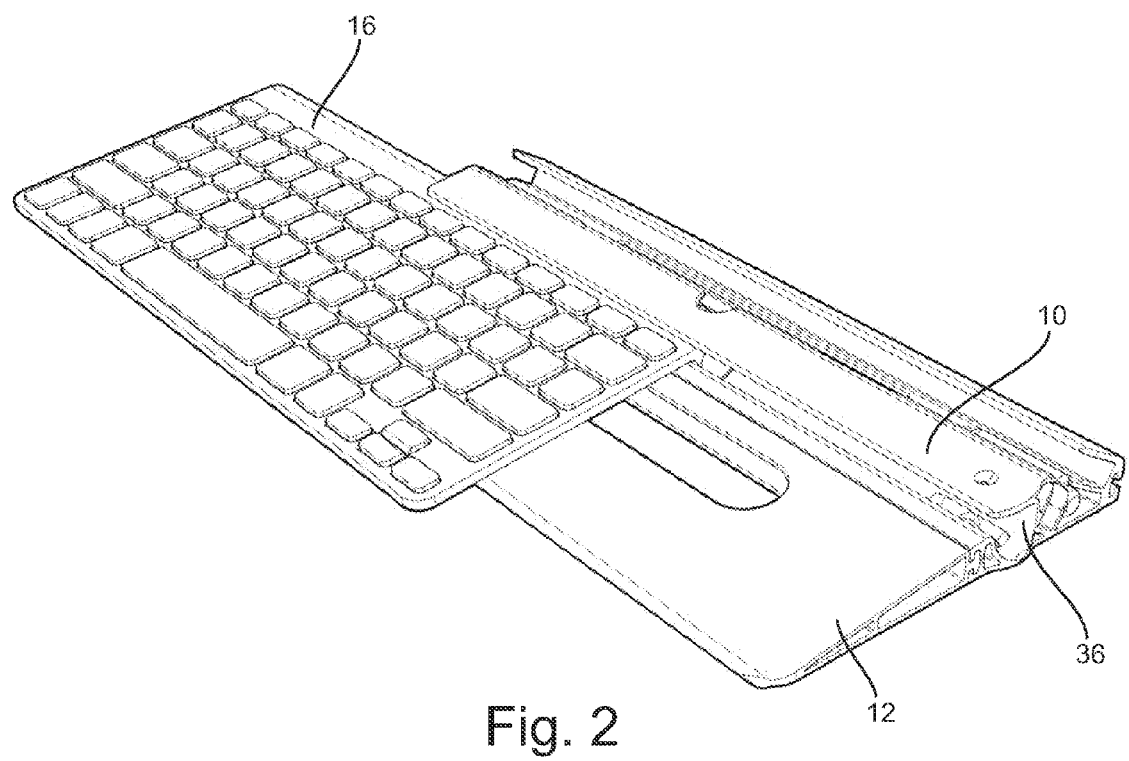
FIG. 2 Coupling stand-alone keyboard with stand core.

FIG. 2 shows the coupling stand-alone keyboard with stand core 10 of the keyboard stand is attached to stand-alone keyboard 16 by sliding it into a nesting area 36.

Figure 3:
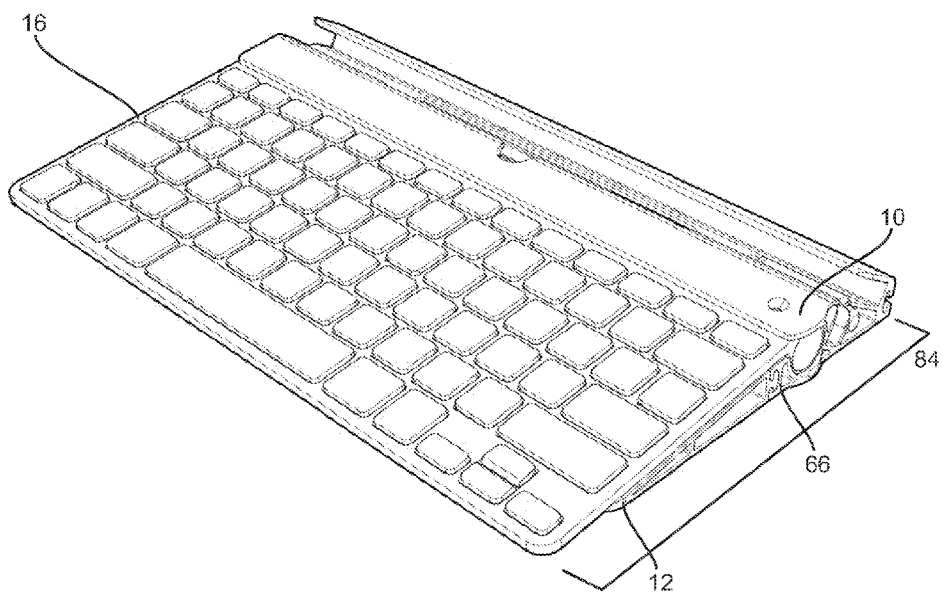
FIG. 3 Keyboard Stand in storage-position.
Figure 4:
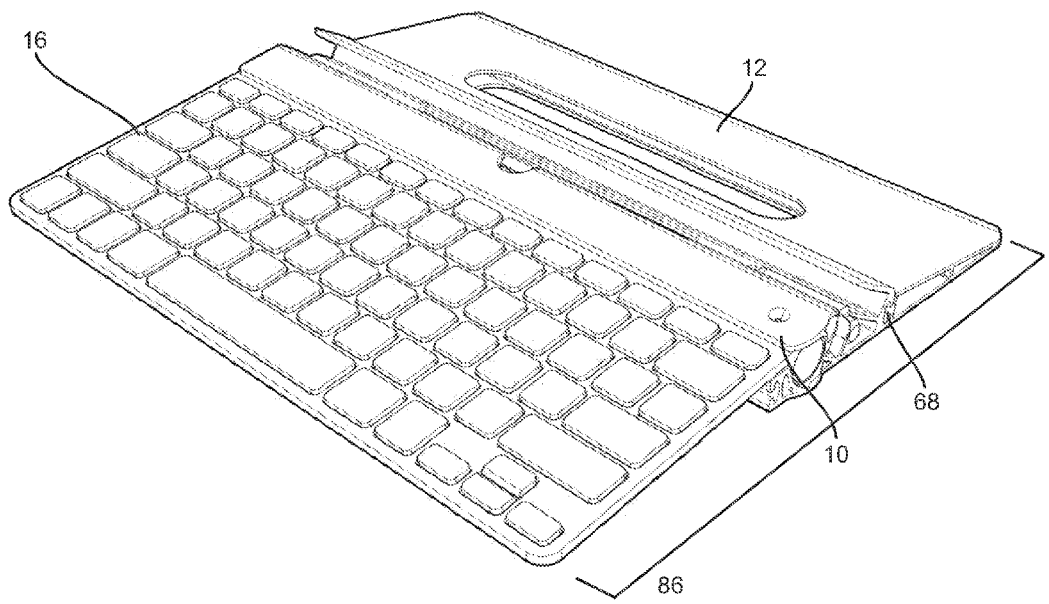
FIG. 4 Stand in extended-position.

Referring to FIG. 3, in a storage-position, the extension wedge 12 fits under the stand-alone keyboard 16 by sliding into a sliding-rail 66 for a 'storage-position' of the stand core. Referring to FIG. 4-, in an extended-position the extension wedge 12 slides into a sliding-rail 68 for an 'extended-position' of the stand core which has provides extra support/stability needed for use on inclined or uneven areas.

Figure 5:
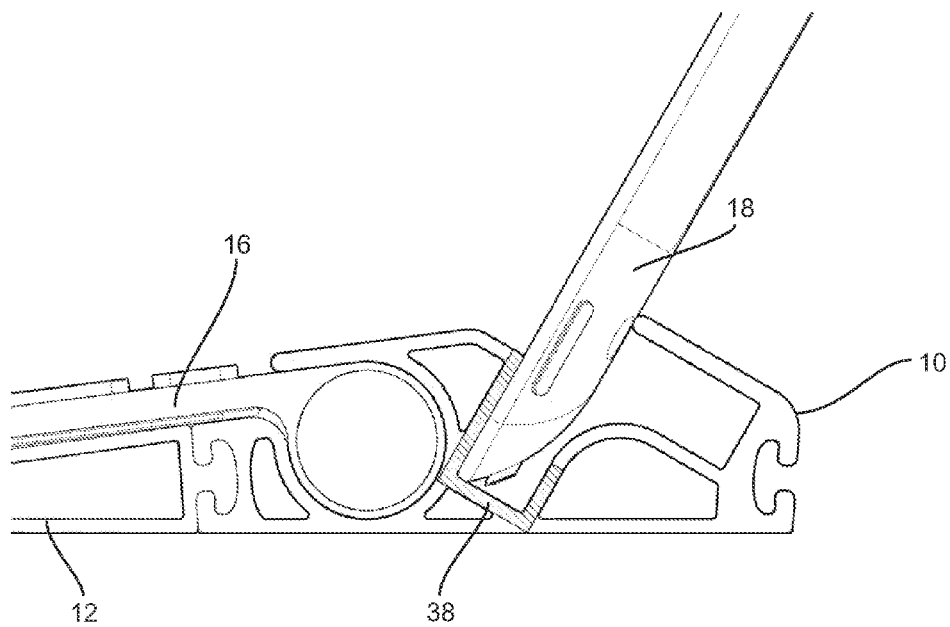
FIG. 5 Writing with keyboard position, extension wedge in storage-position.
Figure 6:
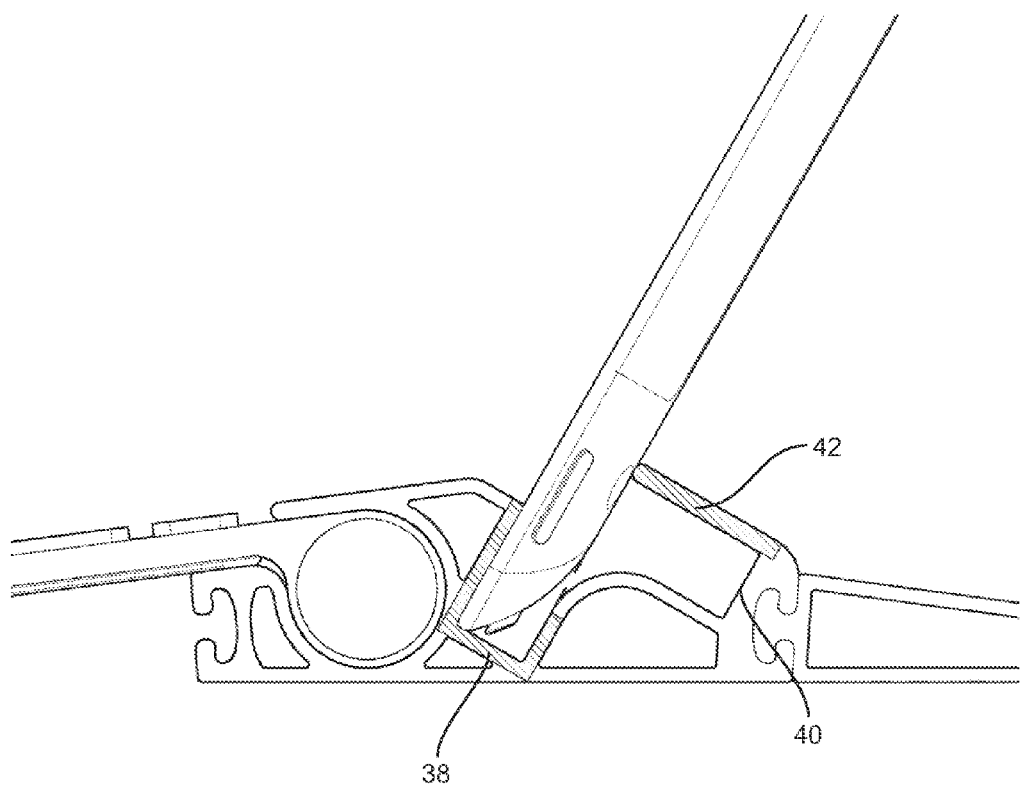
FIG. 6 Nesting area for writing with keyboard.

FIG. 5 illustrates writing in the keyboard position, with the extension wedge in storage-position. FIG. 6 shows the nesting area for writing with the keyboard. The upper edge of the nesting section 40 for the "drawing easel position" provides extended support for tablets when used in a "writing with keyboard position".

Figure 7:
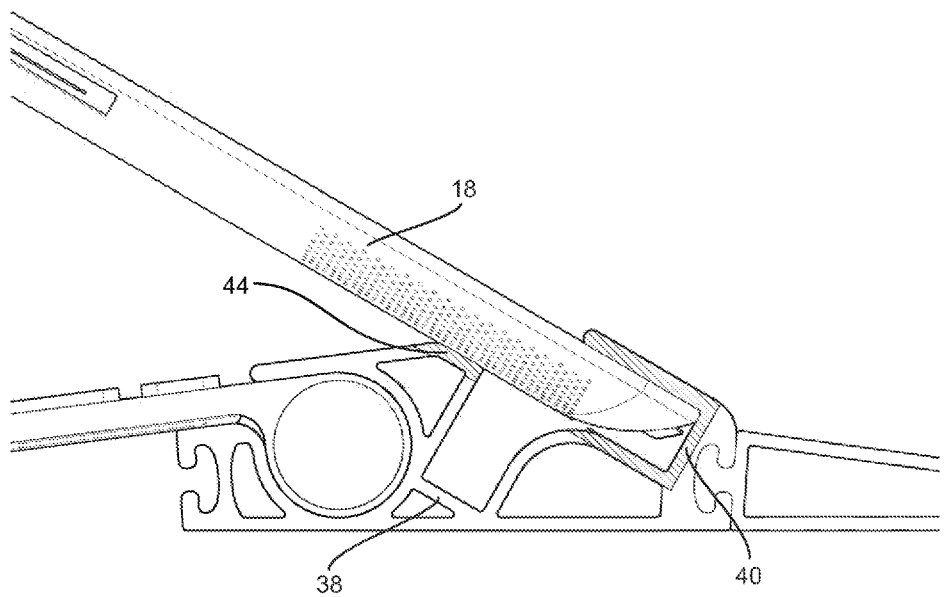
FIG. 7 Nesting area for drawing easel position.

The nesting area for the drawing easel position is shown in FIG. 7. The chamfer next to the upper edge of nesting section for "writing with keyboard position" 38 provides extended support for tablets when used in "drawing easel position".

Figure 8:
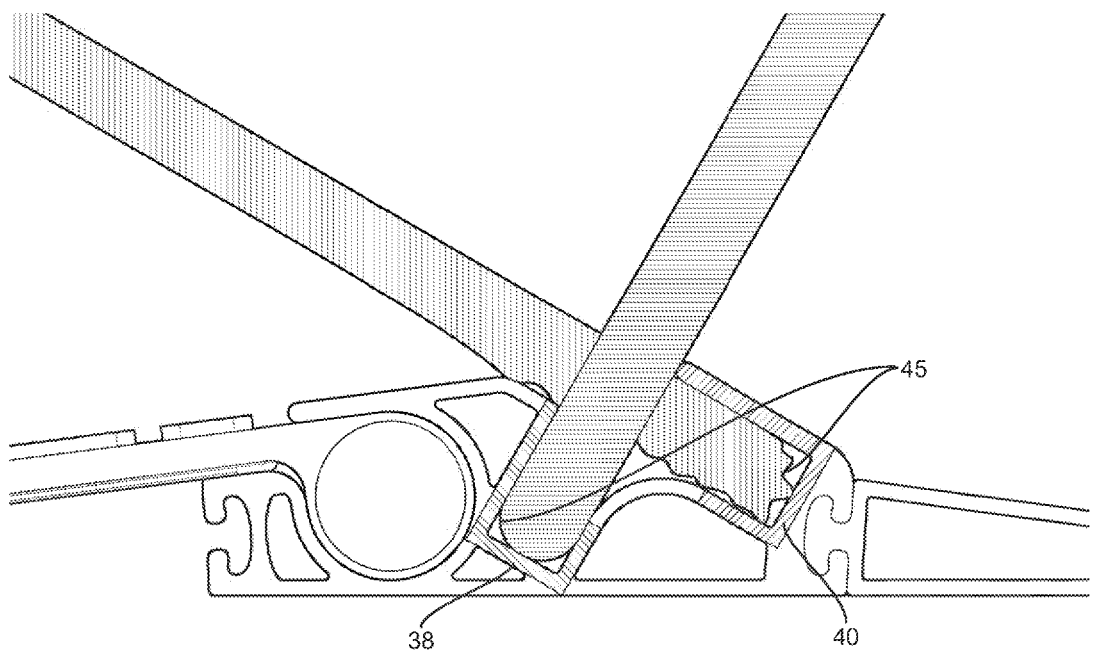
FIG. 8 Rectangular generic profile of nesting cross-sections.
Figure 9:
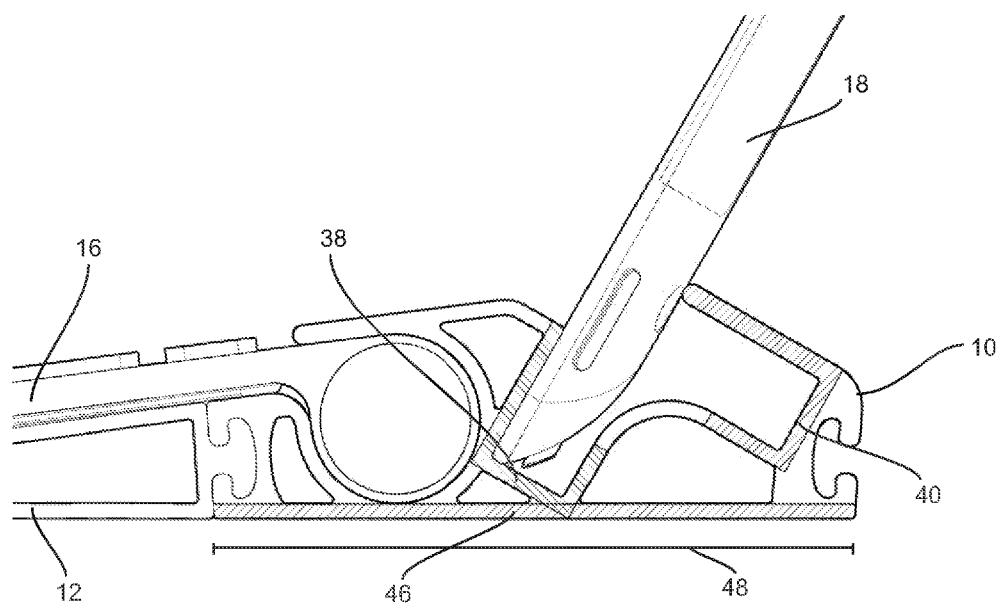
FIG. 9 Support for Writing with keyboard position, extension wedge in storage-position.

The rectangular generic profile of the nesting cross-sections of FIG. 8 shows various profiles and protruding elements on tablets which can be accommodated by the rectangular generic profile for the nesting section for "writing with keyboard position" 38 and nesting cross-section for tablets 40. Support for Writing with keyboard position, extension wedge 12 in storage-position is shown in FIG. 9 where the length 48 of the base of stand core 46 extends behind the nesting section for "writing with keyboard position" 38 with the nesting section for "drawing easel position"40 to provide enough stability of tablets when using it in "writing with keyboard position" on a tabletop as shown in FIG. 9. A non-slip coating/padding 46 on the base of the stand-core 10 provides maximum grip in all surfaces, including a person's lap or an inclined work surface.

Figure 10:
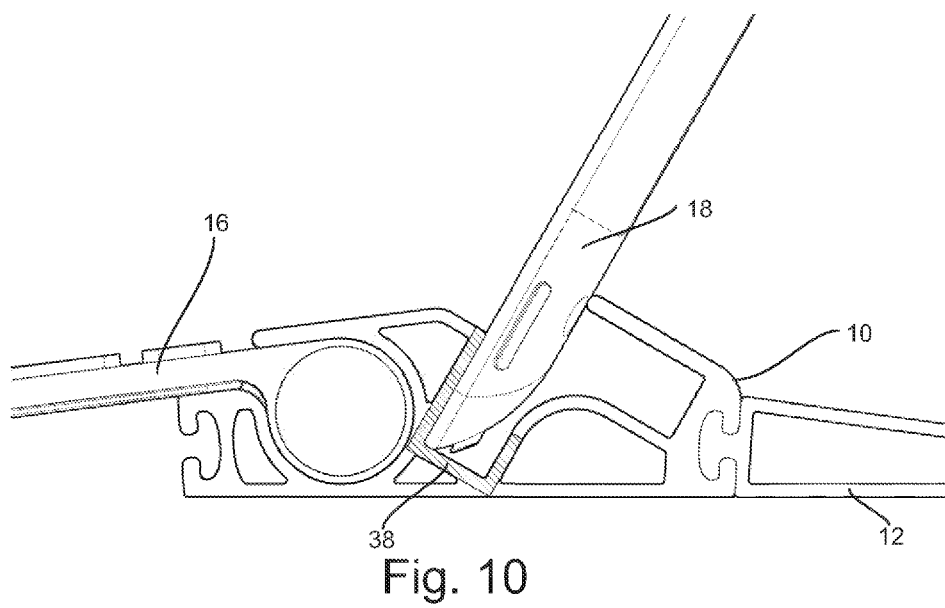
FIG. 10 Writing with keyboard position, extension wedge in extended-position.
Figure 11:
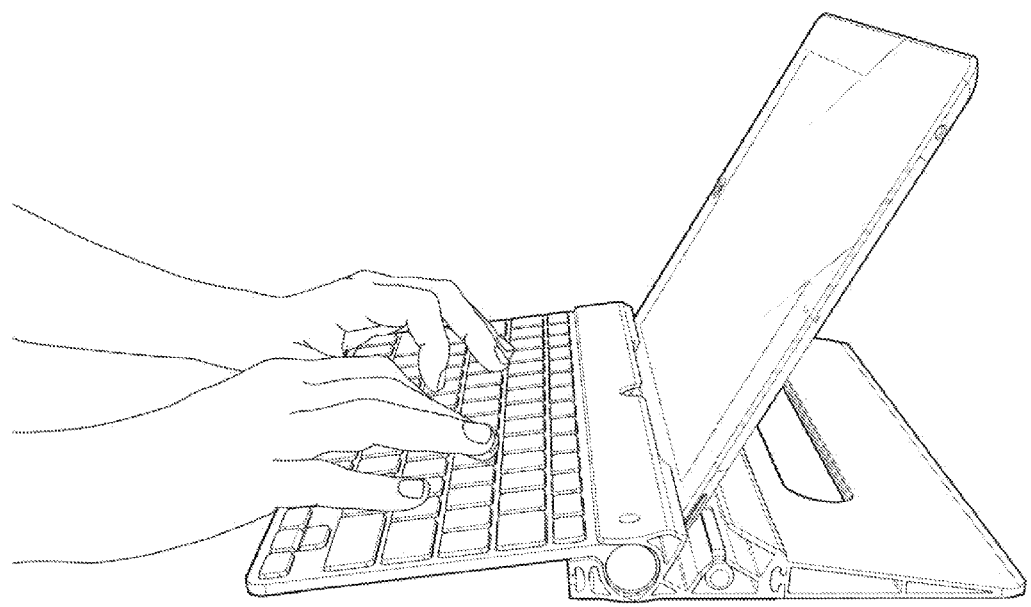
FIG. 11 Keyboard Stand. Typing extended position.

FIG. 10 illustrates writing with an extension-wedge 12 in extended-position with respect to the keyboard 16 position. FIG. 11 illustrates the keyboard stand and typing in an extended position.

Figure 12:
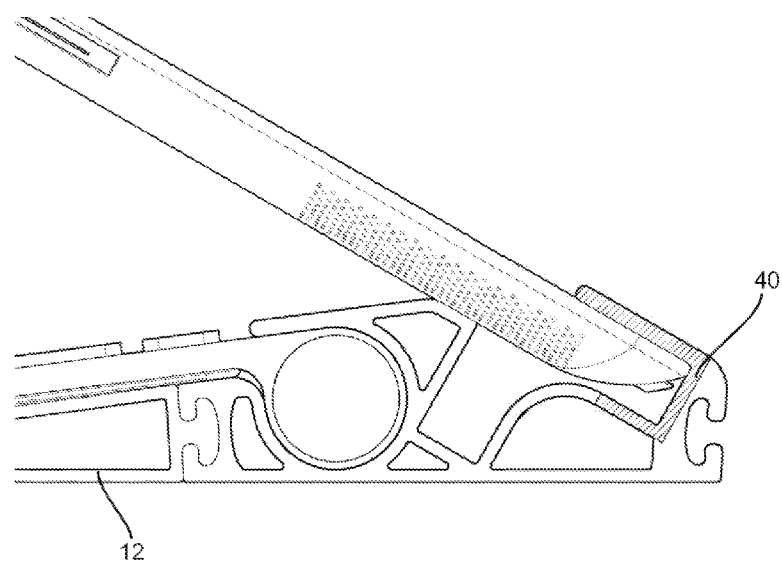
FIG. 12 Drawing with easel position, extension wedge in storage-position.
Figure 13:
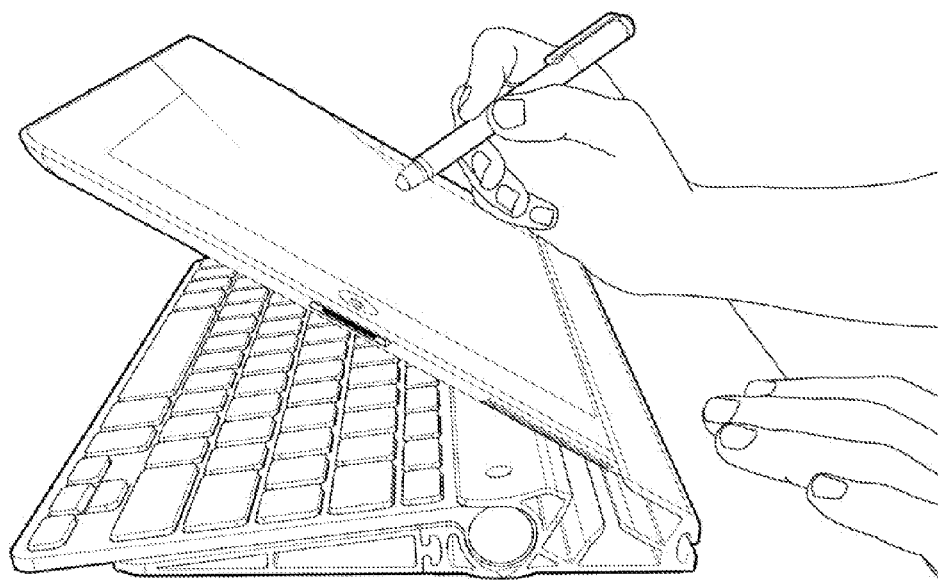
FIG. 13 Drawing with easel.
Figure 14:
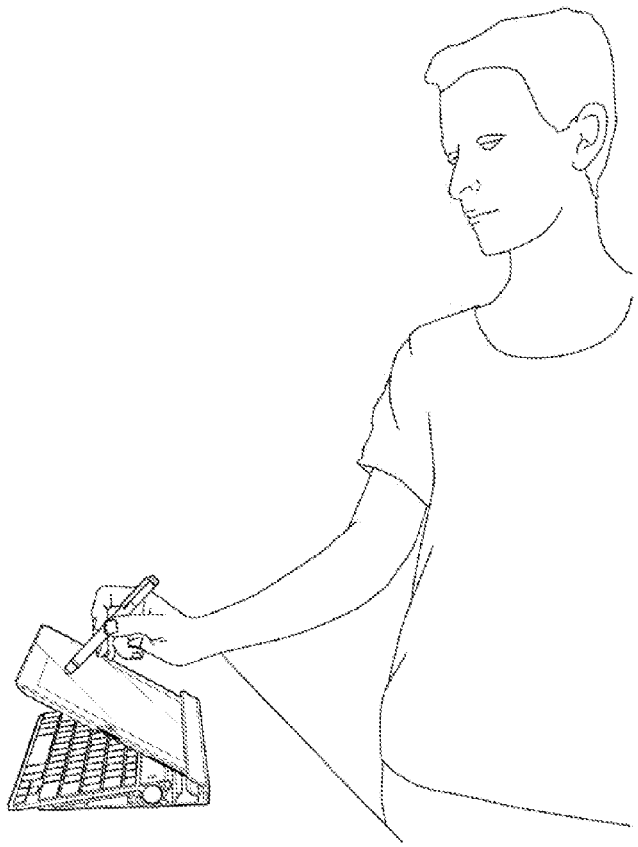
FIG. 14 Standing angle use position in tabletop.

FIG. 12 illustrates drawing in the easel position, wherein the extension-wedge 12 is in a storage-position. FIG. 13 illustrates drawing in the easel position on a tabletop. FIG. 14 illustrates the standing angle for use.

Figure 15:
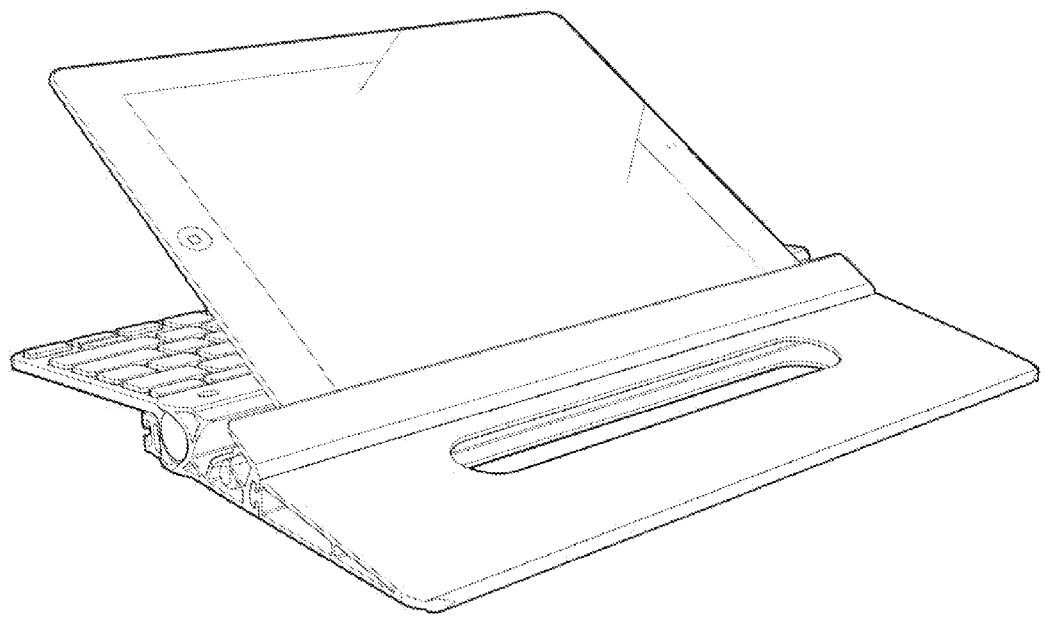
FIG. 15 Drawing with easel position, extension wedge in extended-position.
Figure 16:
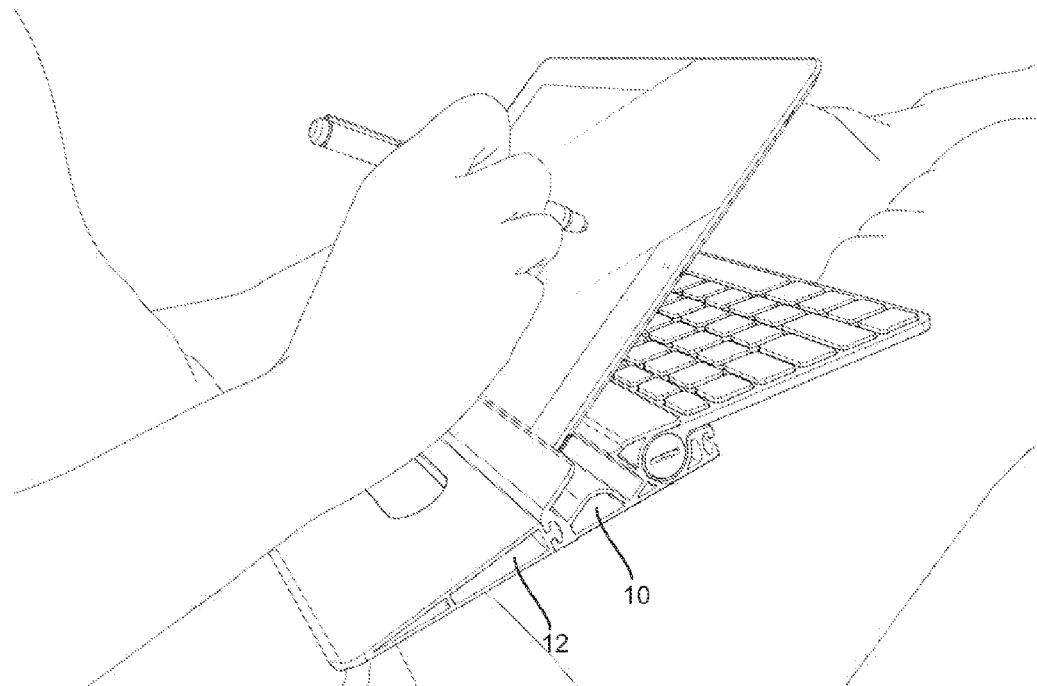
FIG. 16 Drawing with easel position, extension wedge in extended-position as spacer.

FIG. 15 illustrates drawing in the easel position, wherein the extension-wedge 12 is in an extended-position. FIG. 16 illustrates drawing in the easel position, wherein the extension-wedge 12 is in an extended-position and uses a spacer 10.

Figure 17:
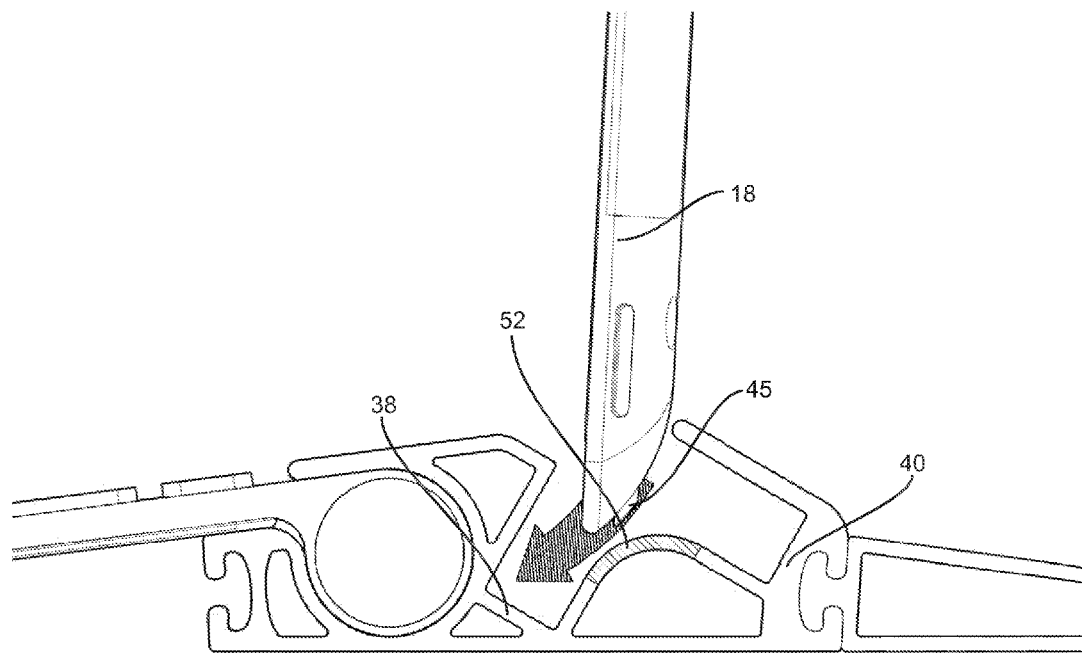
FIG. 17 Blended bridge of nesting cross-sections facilitates docking.
Figure 18A:
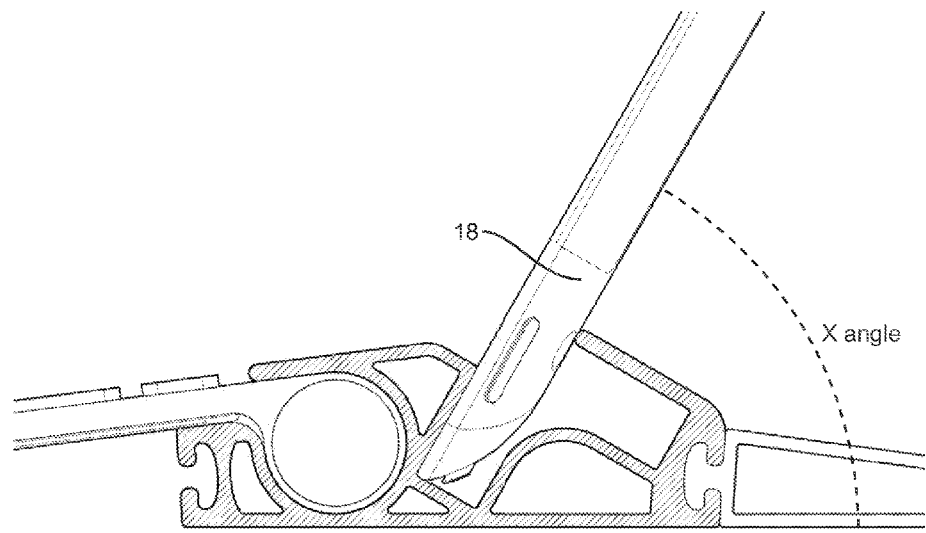
FIGS. 18A and 18B Thickness variation can be accommodated.
Figure 18B:
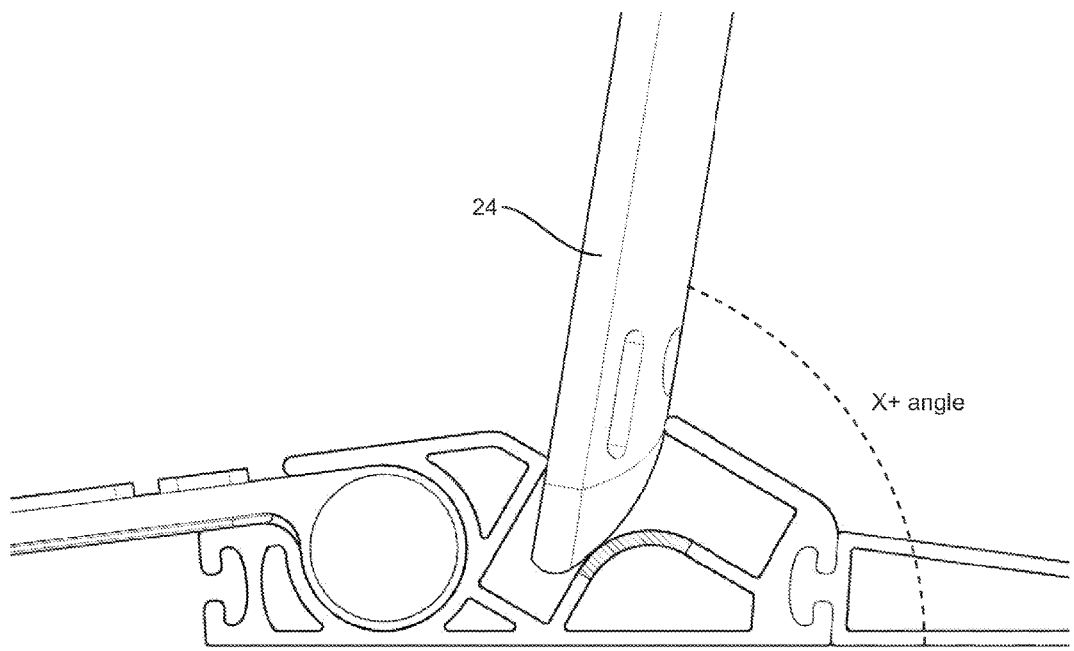

As shown in FIGS. 17, 18A, and 18B, thickness variation can be accommodated. Slates with small thickness variation or with a slate-skin 24 can also be accommodated by the extra room provided by large blended bridge 52 and slightly changing the nested angle 45.

Figure 19:
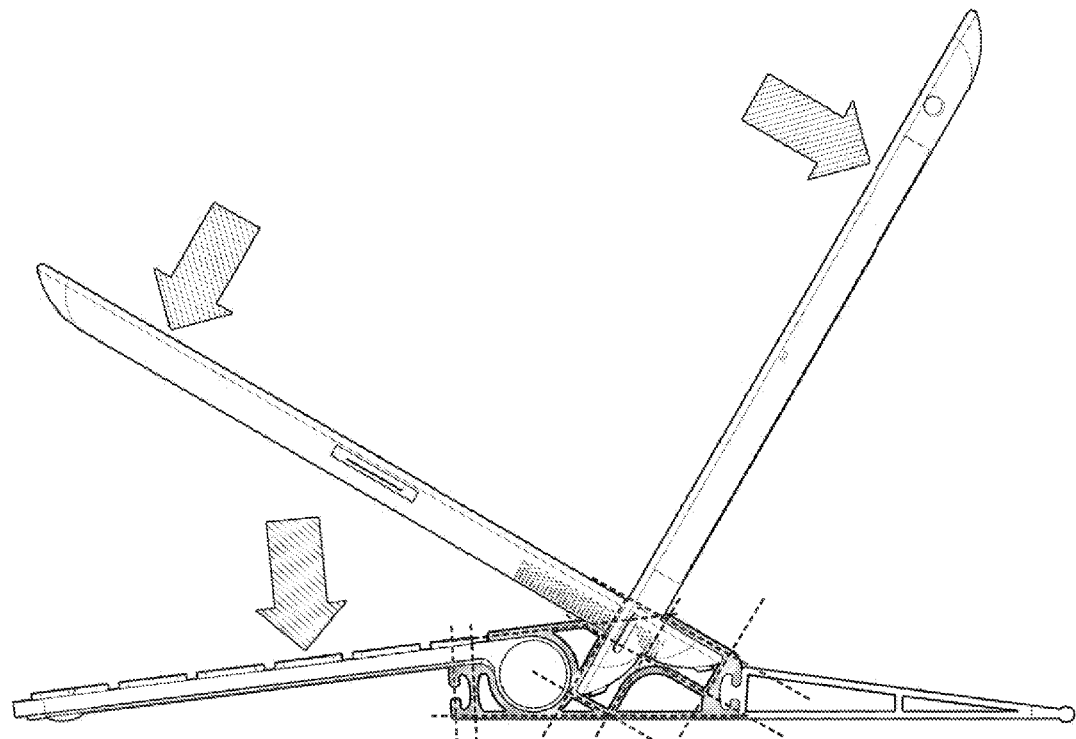
FIG. 19 Cross-linked structure x-section.

The cross-linked structure x-section is illustrated in FIG. 19. The combination of all functional cross-sections 36, 38, 40 and 46 of the stand core 10 provide a structural frame that prevents the stand core from bending when user presses on screen of slate-device 18 or smartphone 20 during touch input.

Figure 20A:
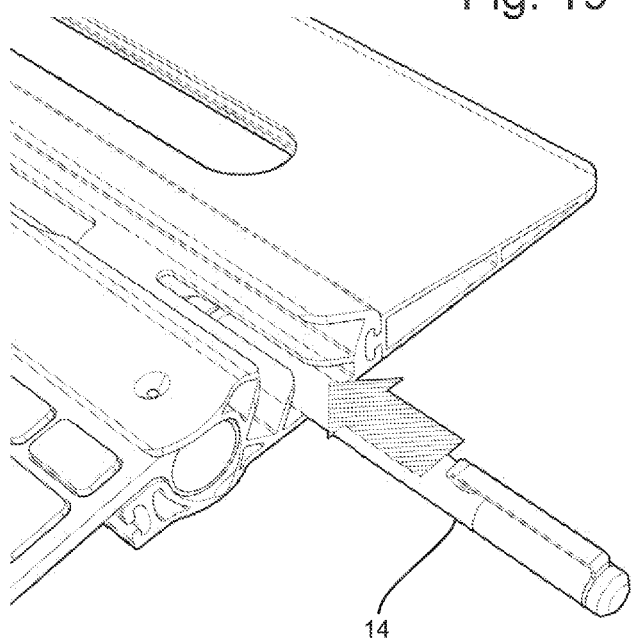
FIGS. 20A and 20B Opening for stylus-pen storage.
Figure 20B:
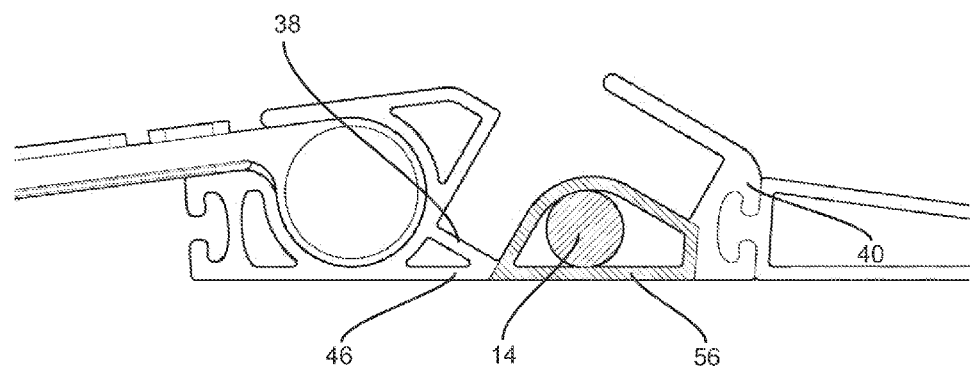
Figure 21:
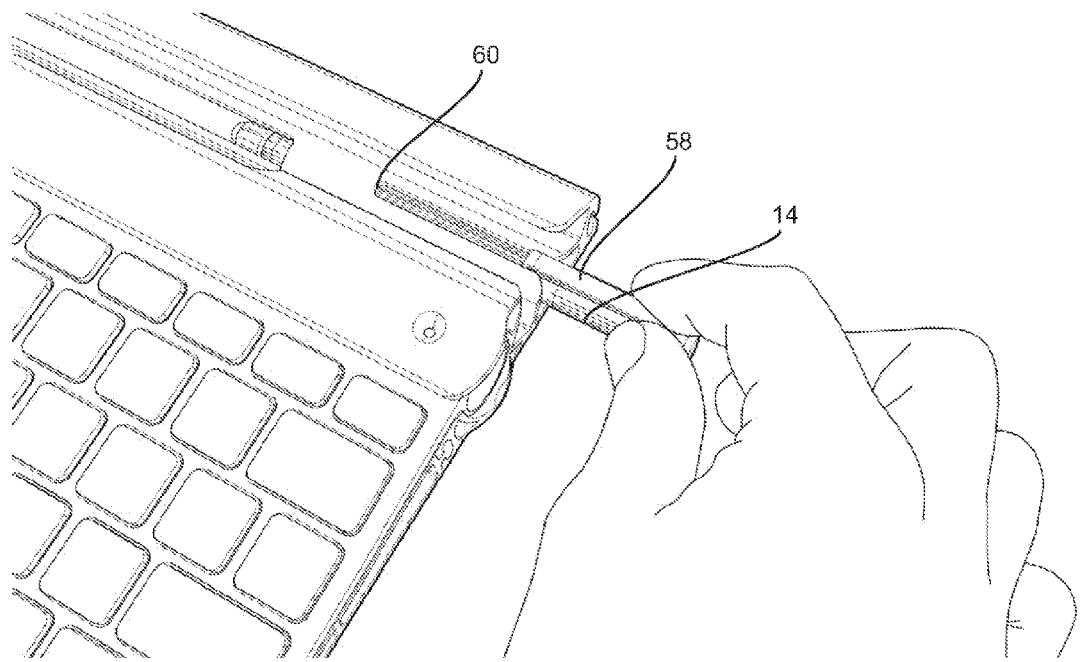
FIG. 21 Pen-slot secures pen stylus.
Figure 22:
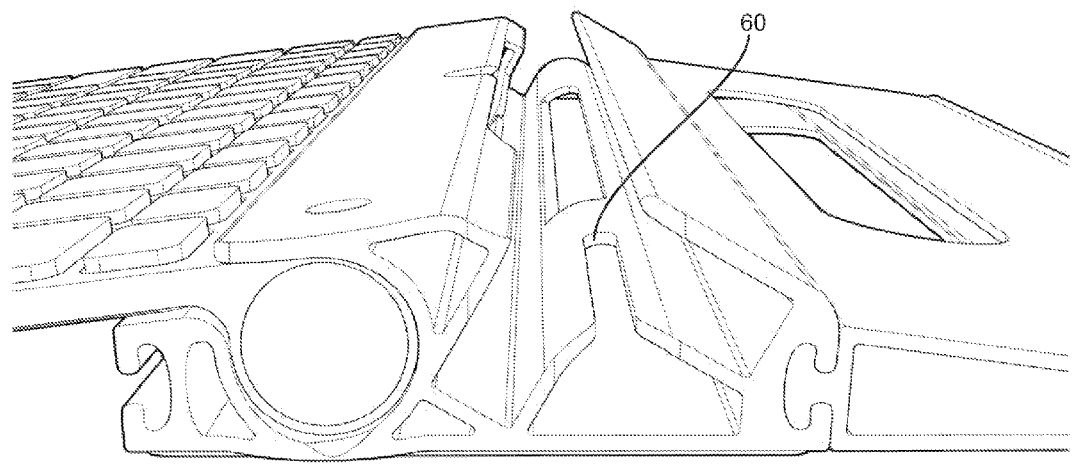
FIG. 22 Pen-clip access use for pen eject.
Figure 23:
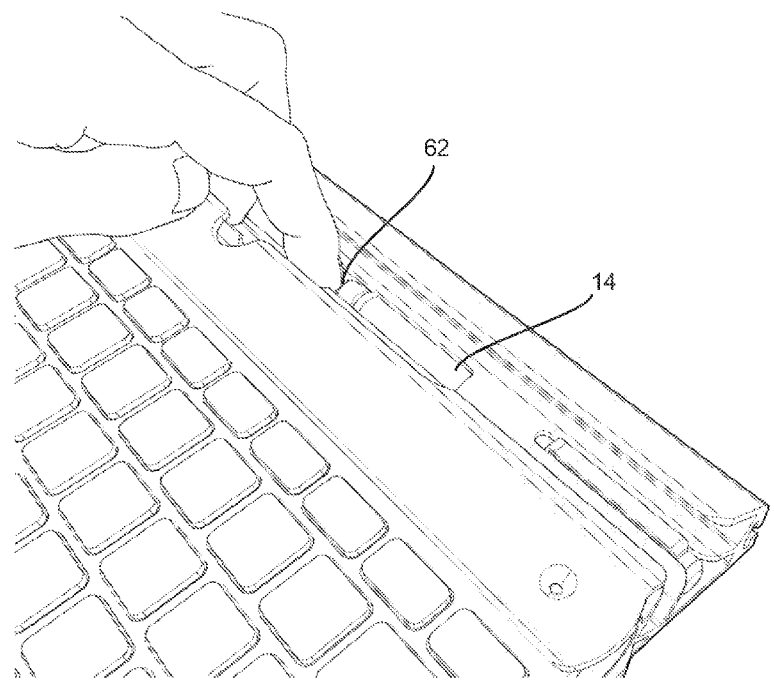
FIG. 23 Pen-tip access for pen eject.
Figure 24A:
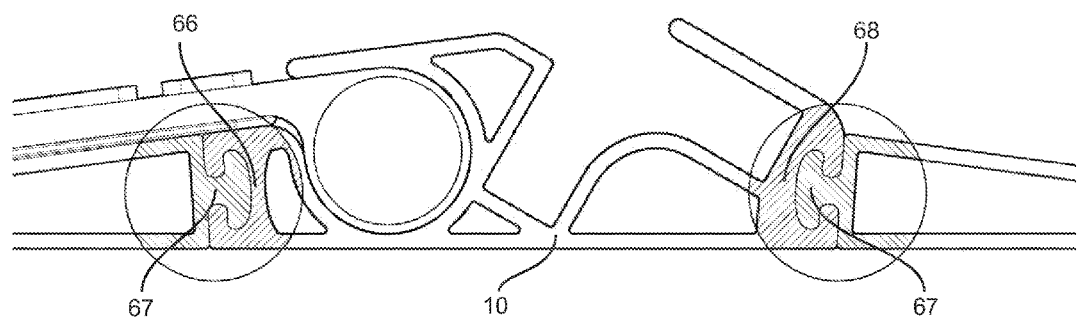
FIGS. 24A-D Symmetrical extension wedge fitting on male-female rail.
Figure 24B:
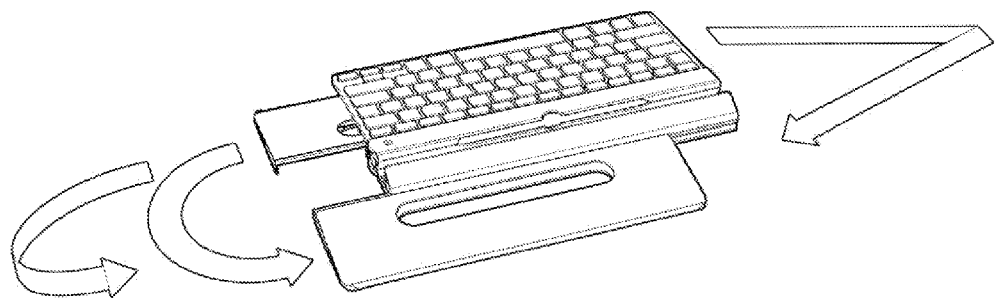
Figure 24C:
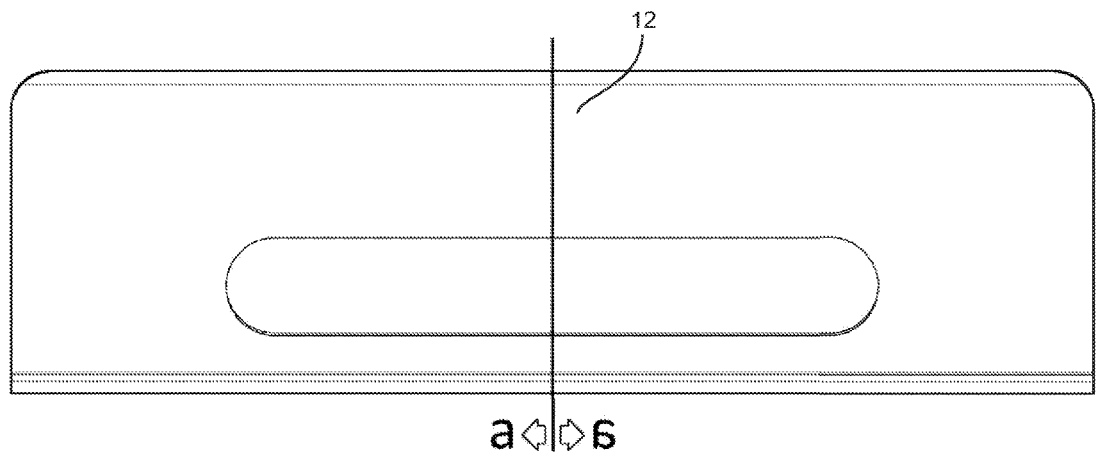
Figure 24D:
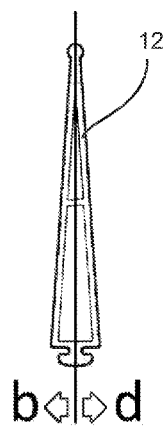

The opening for stylus or pen storage is shown in FIGS. 20A and 20B. Open space 50 defined by combination of functional cross-sections 38, 40 and 46 can be used to store a pen or stylus 14. The pen-slot 60 secures a pen or stylus 14 as shown in FIG. 21. The pen slot 60 also secures a sliding stylus 14 by a pen-clip 58. Pen-clip access use for pen eject is shown in FIG. 22. A pen can be ejected by pushing on edge of a pen-clip 58. The pen-tip access for pen eject shown in FIG. 23, can be ejected by pushing on pen-tip 62 through a slot 60.

Now referring to FIGS. 24A-D a symmetrical extension wedge fitting in male-female is shown. A sliding-rail on stand core for 'extended-position' of extension wedge 68 and sliding-rail on stand core for 'storage-position' of extension wedge 66 have the same cross-section. A sling-rail on extension wedge 67 has a male-female relationship with geometry of the sliding-rails on the stand core 66 and 68. The extension wedge 12 has a symmetrical design along its two axes' centers so there is no possibility inserting the extension wedge on the slide-on rails 66 and 68 in a wrong orientation.

Figure 25:
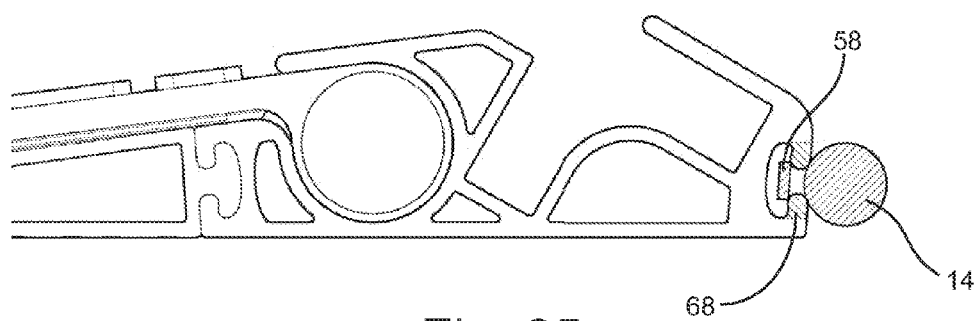
FIG. 25 Alternative quick-access and storage of pen stylus.

An alternative quick-access and storage of the pen stylus is shown in FIG. 25. The sliding-rail for 'extended-position' 68 can also be used rail in the pen-clip 58 for alternative quick-access and storage of the sliding-stylus 14.

Figure 26:
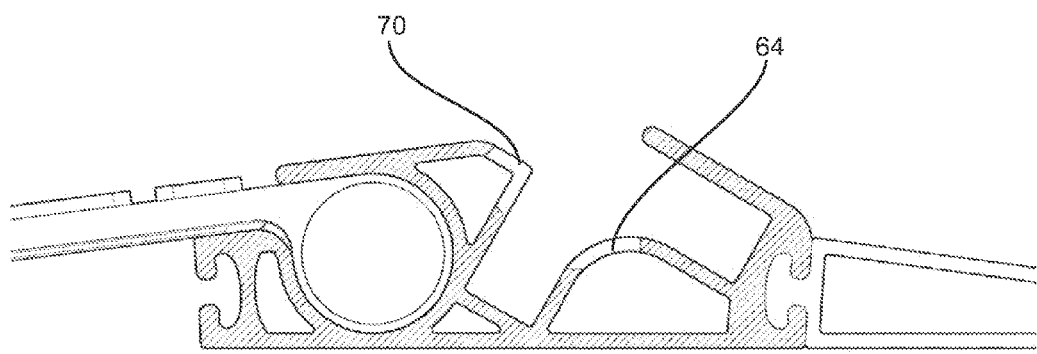
FIG. 26 Smartphone docking.
Figure 27A:
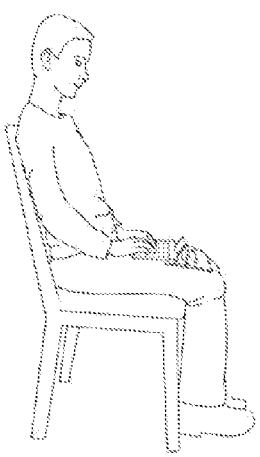
FIGS. 27A-C Smartphone docking on sitting-use angle.
Figure 27B:
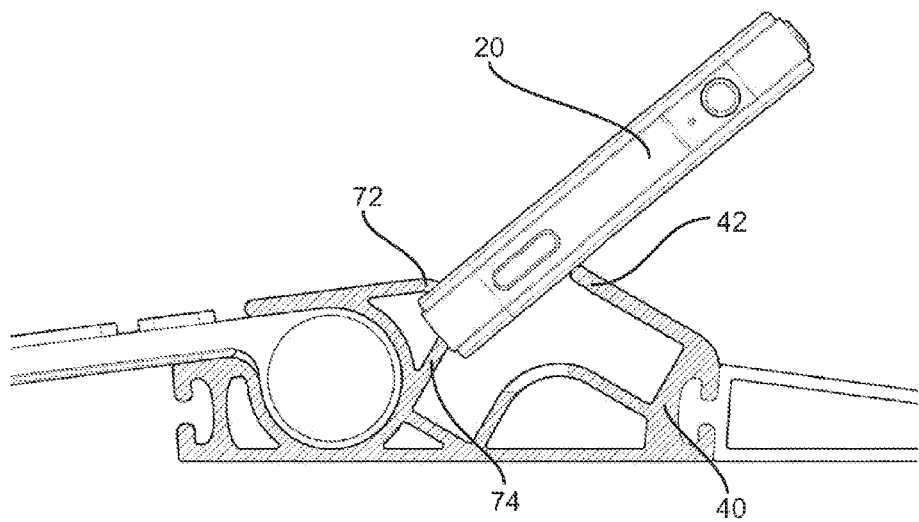
Figure 27C:
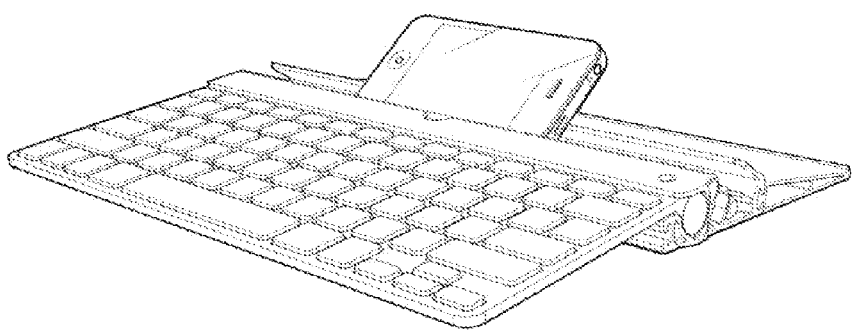

Smartphone docking is shown in FIG. 26 is accomplished by two or more cavities 70 and 64 that make it possible to place a smartphone 20 of various sizes and thicknesses in two different "writing with keyboard" angles. Smartphone docking on sitting-use angle is shown in FIGS. 27A-C where a smartphone 20 can be placed between 72 upper cut of cavity 70, and a lower cut 74 of cavity 70, and an upper edge 42 of 40 for sitting-use angle.

Figure 28A:
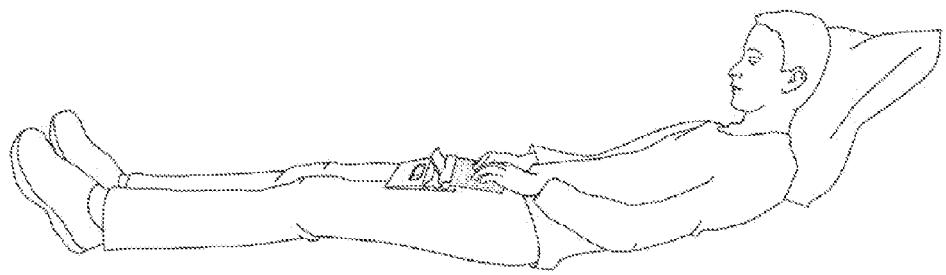
FIGS. 28A-C Smartphone docking on laying-use angle.
Figure 28B:
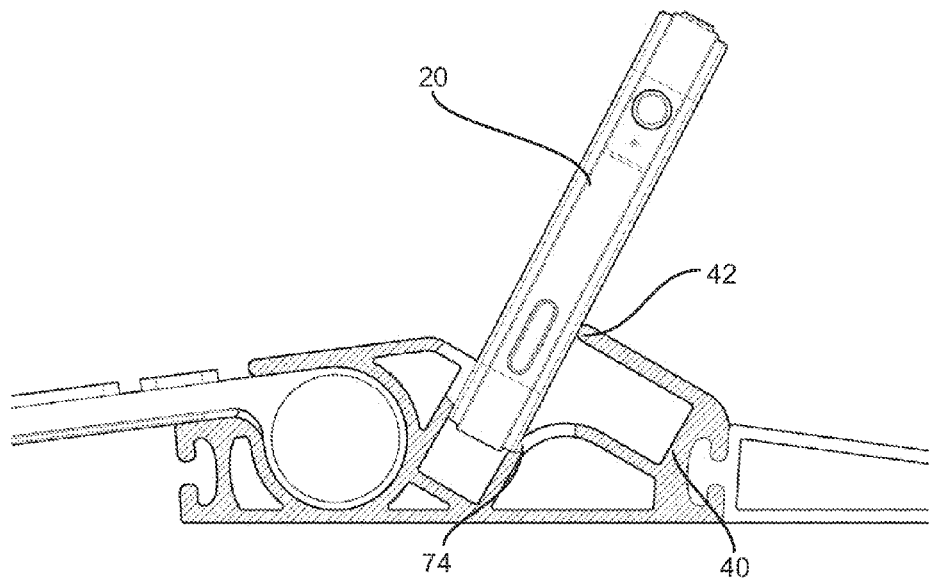
Figure 28C:
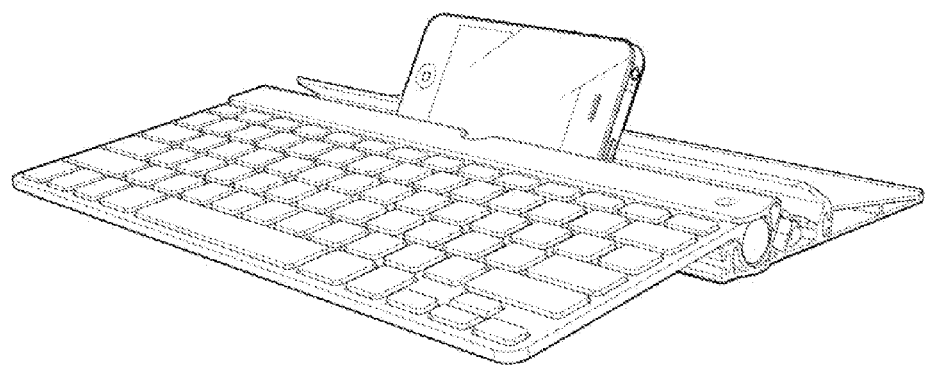

A smartphone 20 can be placed between the lower cut 74 of cavity 70, and the lower cut 76 of cavity 64, and the upper edge 42 of 40 for a laying-use angle as shown in FIGS. 28A-C.

Figure 29A:
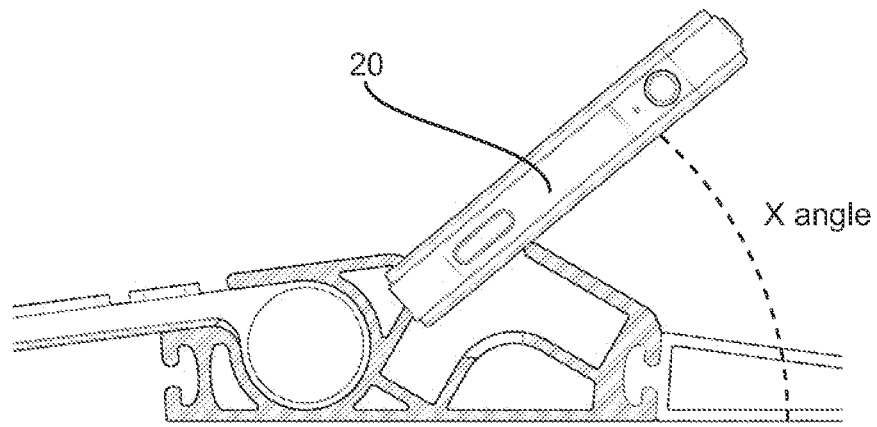
FIGS. 29A-B Smartphone plus skin in sitting-use angle.
Figure 29B:
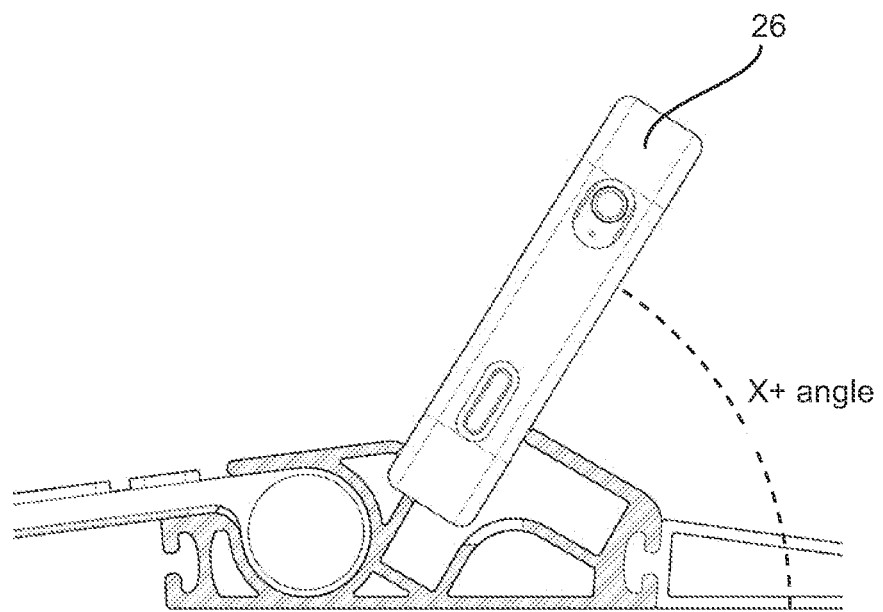

A range of various thicknesses of a smartphones can be accommodated and/or the extra thickness provided by smartphone-skin 26. Such change in thickness will translate is a slight change in angle of use from the nominal sitting-use angle a shown in FIGS. 29A-B.

Figure 30:
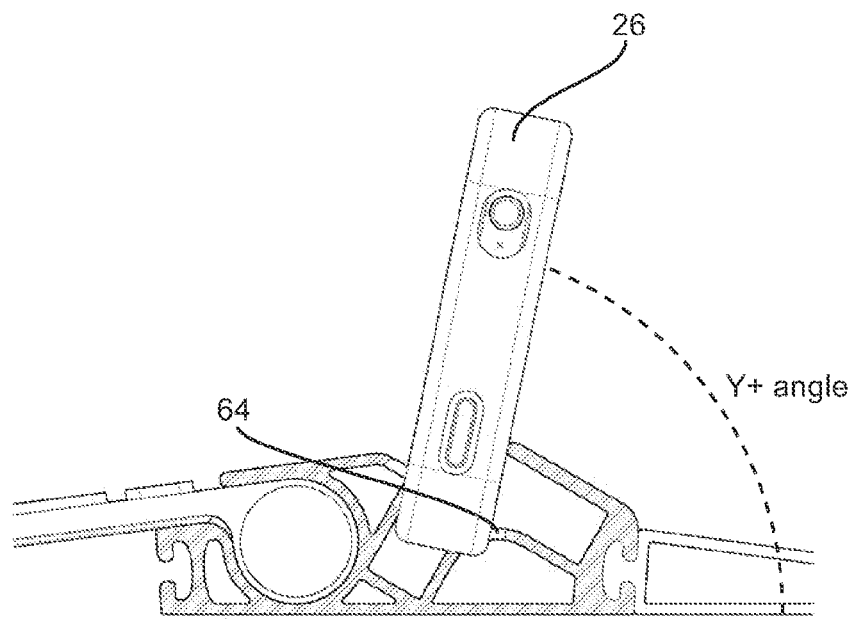
FIG. 30 Smartphone plus skin in laying-use angle.

A range of various thicknesses of a smartphones can be accommodated, including the extra thickness provided by smartphone-skin 26. Such change in thickness will translate is a slight change in angle of use from the nominal laying-use angle. Rear of thicker devices can fit in a central cavity of stand core 64 as shown in FIG. 30.

Figure 31:
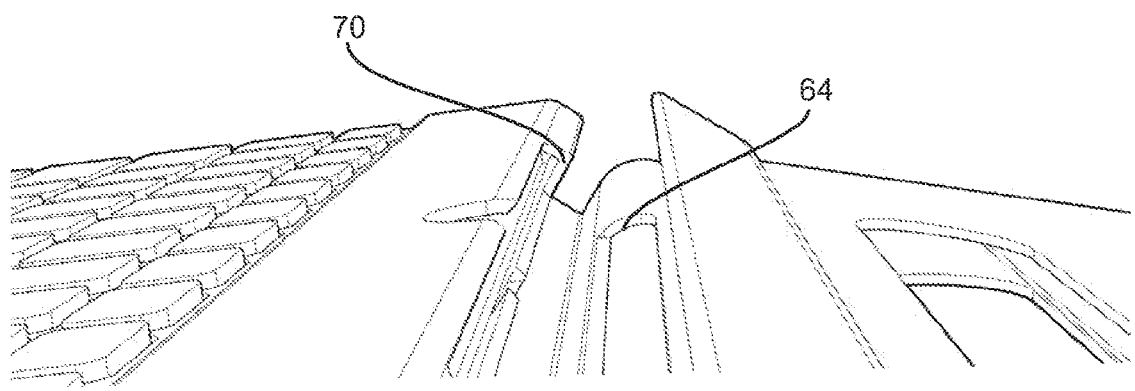
FIG. 31 Extra-large smartphone docking.

Mobile electronic devices larger than smartphones, such as a 5" plus screen mobile electronic device 80 can also be placed on portrait and/or landscape orientation within the width of the central cavities 70 and 64 as shown in FIG. 31.

Figure 32:
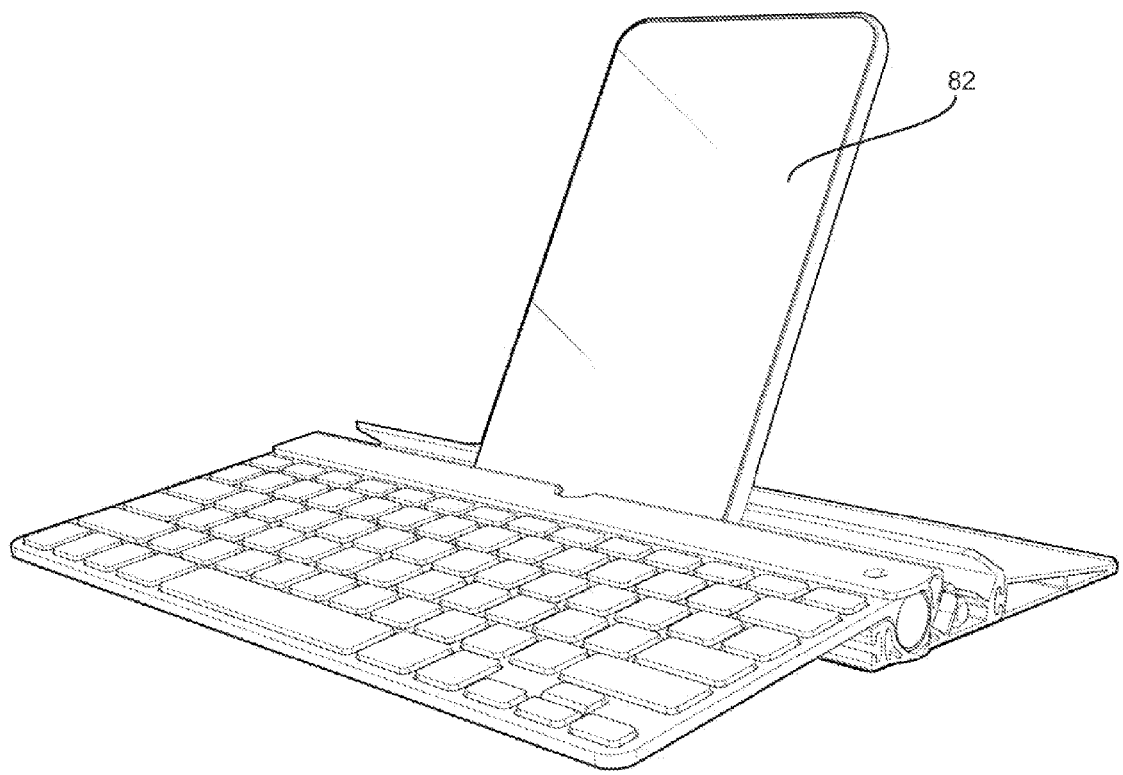
FIG. 32 Thicker 7-8" tablets portrait docking.

7"-8" screen mobile electronic device 82 thicker than the width of the nesting areas 36 and 38 of the stand core can also be placed on portrait and/or landscape orientation within the width of the central cavities 70 and 64 as shown in FIG. 32.

Figure 33:
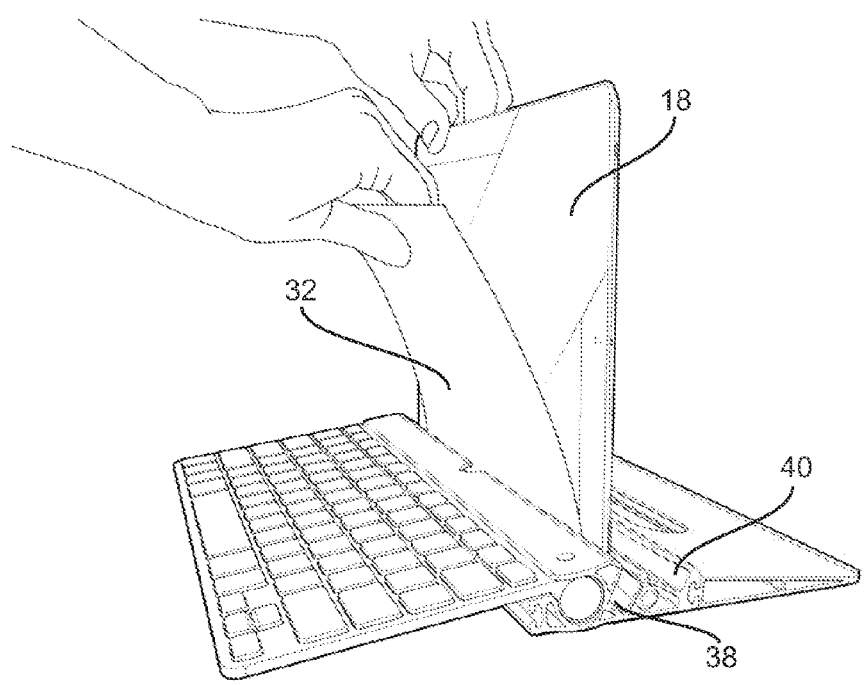
FIG. 33 Privacy and/or anti-glare shield.

An optional anti-glare sheet 32 can be sandwiched between the front-glass of slate-devices 18 or smartphones 20 and its matching surface of the nesting cross-sections 38 and 40 as shown in FIG. 33.

Figure 34:
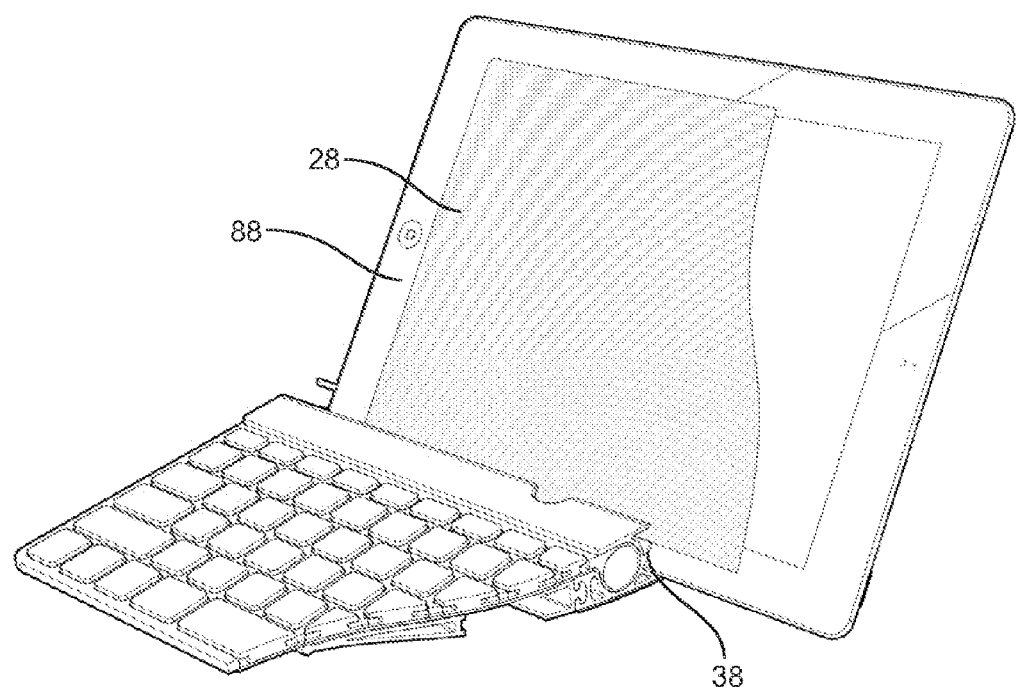
FIG. 34 Privacy-shield landscape placement cross-section.

A custom-cut privacy sheet for mobile electronic device in landscape orientation 30 covers the active screen area 90 and overextends for the gripping area in nesting areas 38 and 40 where such sheets are held in place. Other elements around the bezel, such as front facing cameras, light sensors or microphones and not occluded by the film as shown in FIG. 34.

Figure 35:
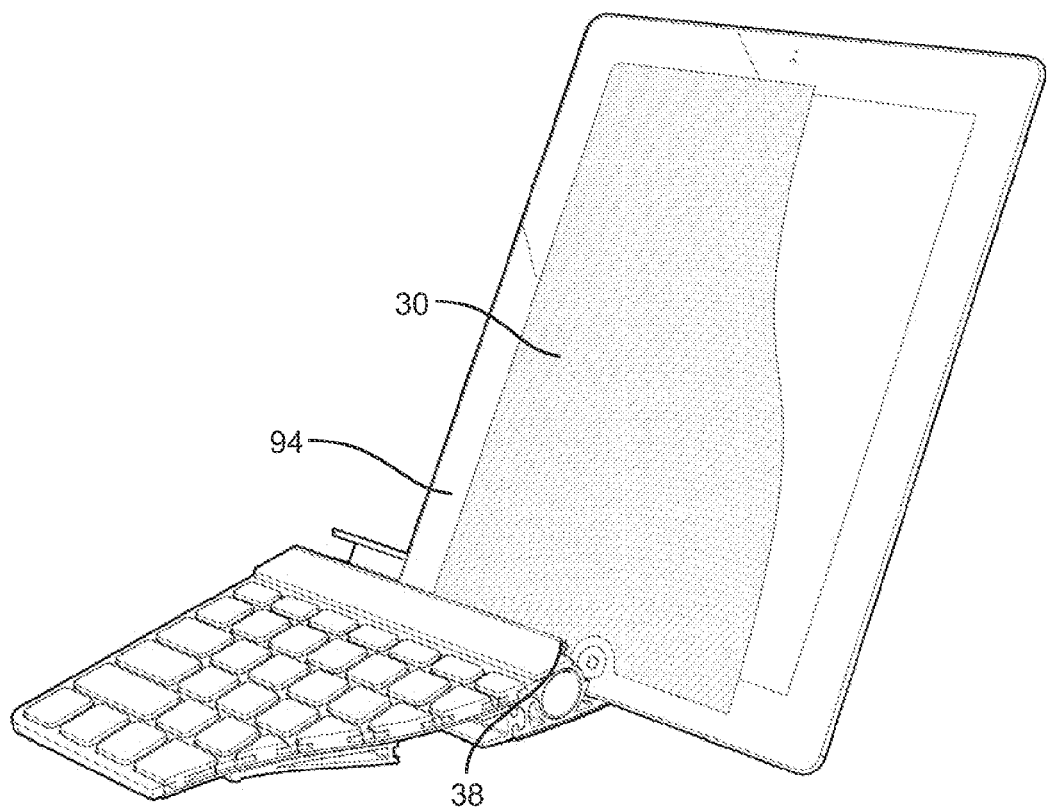
FIG. 35 Privacy-shield portrait placement cross-section.

A custom-cut privacy sheet for mobile electronic device in portrait orientation 30 covers the active screen area 90 and overextends for the gripping area in nesting areas 38 and 40 where such sheets are held in place. Other elements around the bezel, such as front facing cameras, light sensors or microphones and not occluded by the film as shown in FIG. 35.

Figure 36:
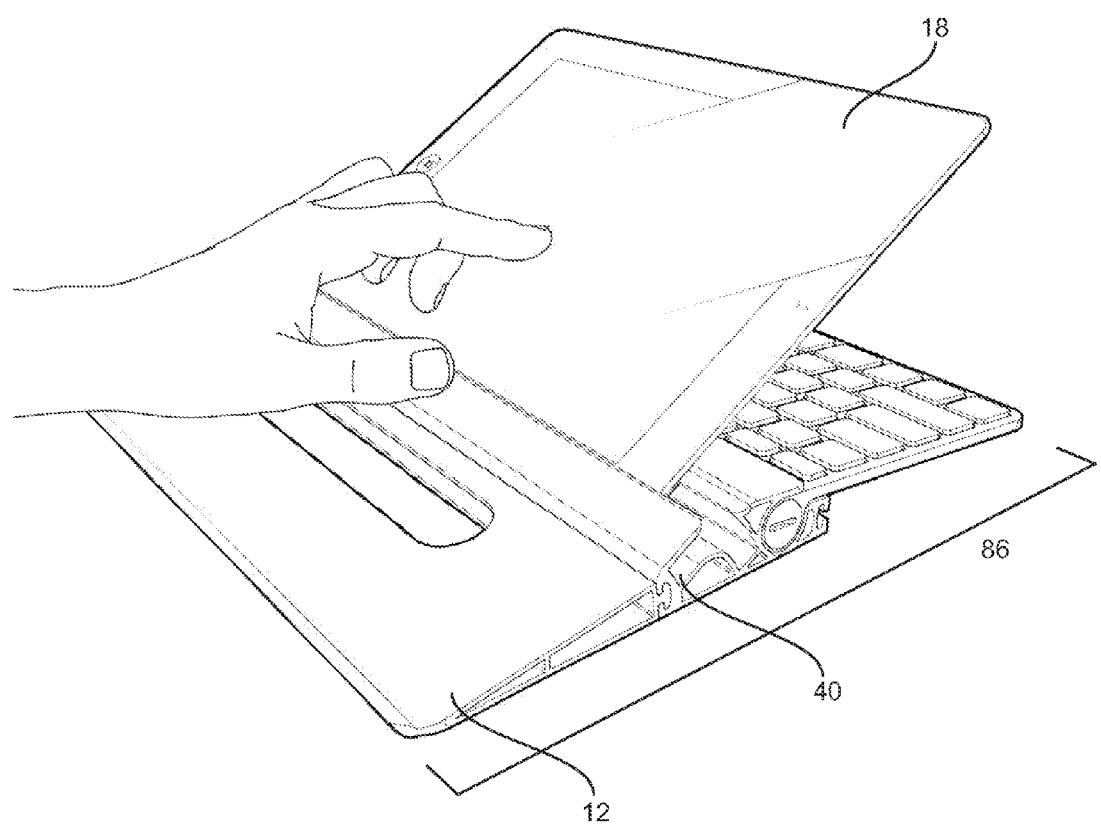
FIG. 36 Palm-rest for desktop use.

Extended-position 86 with slate-device 18 in "drawing easel position" 40 allows extension wedge 12 to be used as a palm-rest during touch interaction as shown in FIG. 36.

Figure 37:
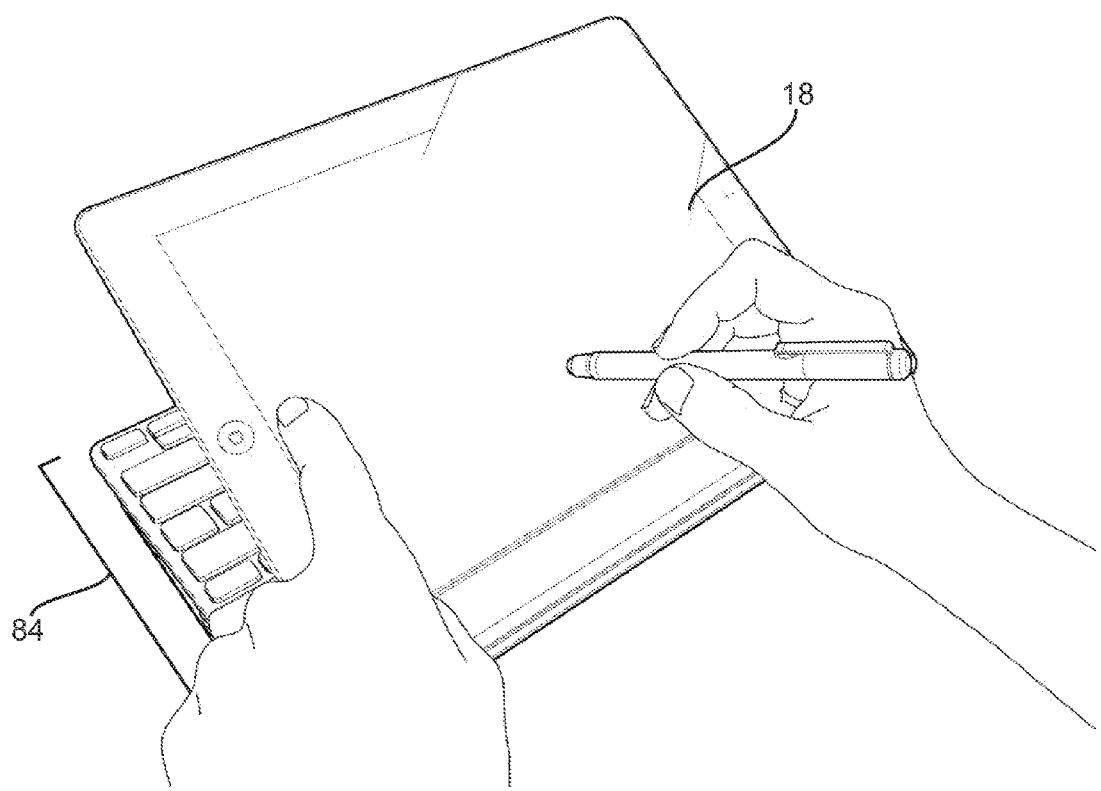
FIG. 37 Two-handed input, storage-position.

A slate-device 18 in a storage-position 84 and "drawing easel position" allows hands to be free from holding slate-device and makes possible two-handed input on the screen as shown in FIG. 37.

Figure 38:
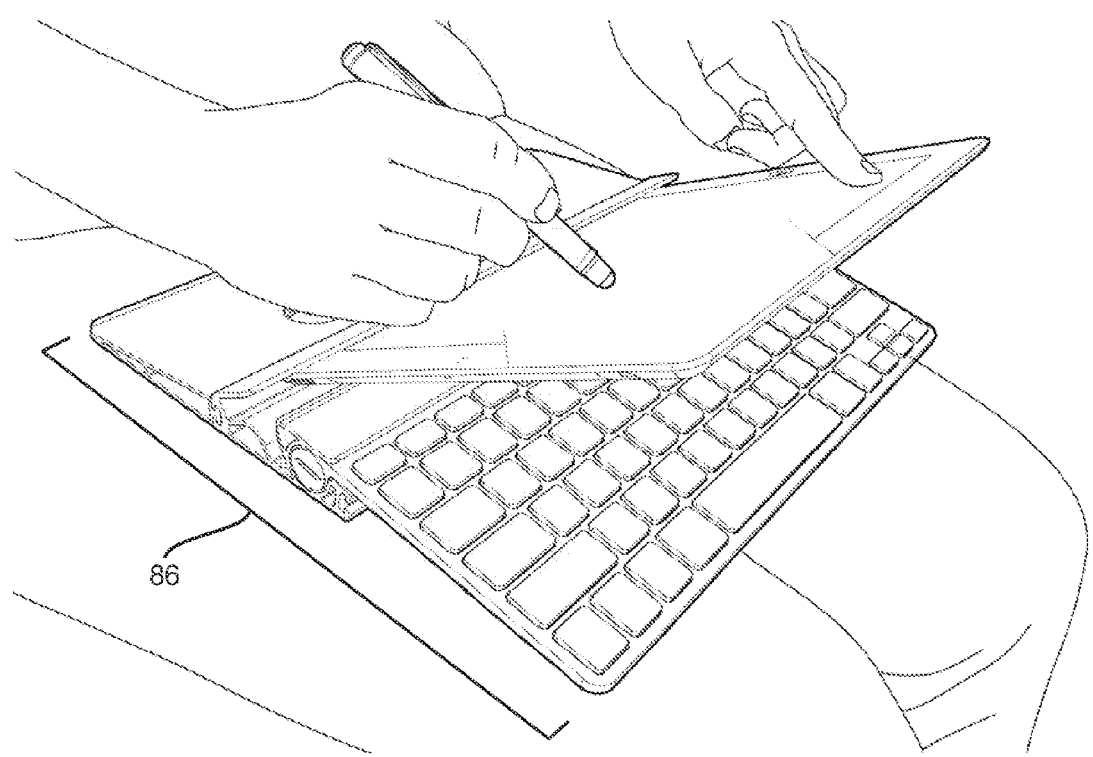
FIG. 38 Two-handed input, extended-position.

A slate-device 18 in an extended-position 86 and "drawing easel position" allows hands to be free from holding slate-device and makes possible two-handed input on the screen as shown in FIG. 38.

Figure 39:
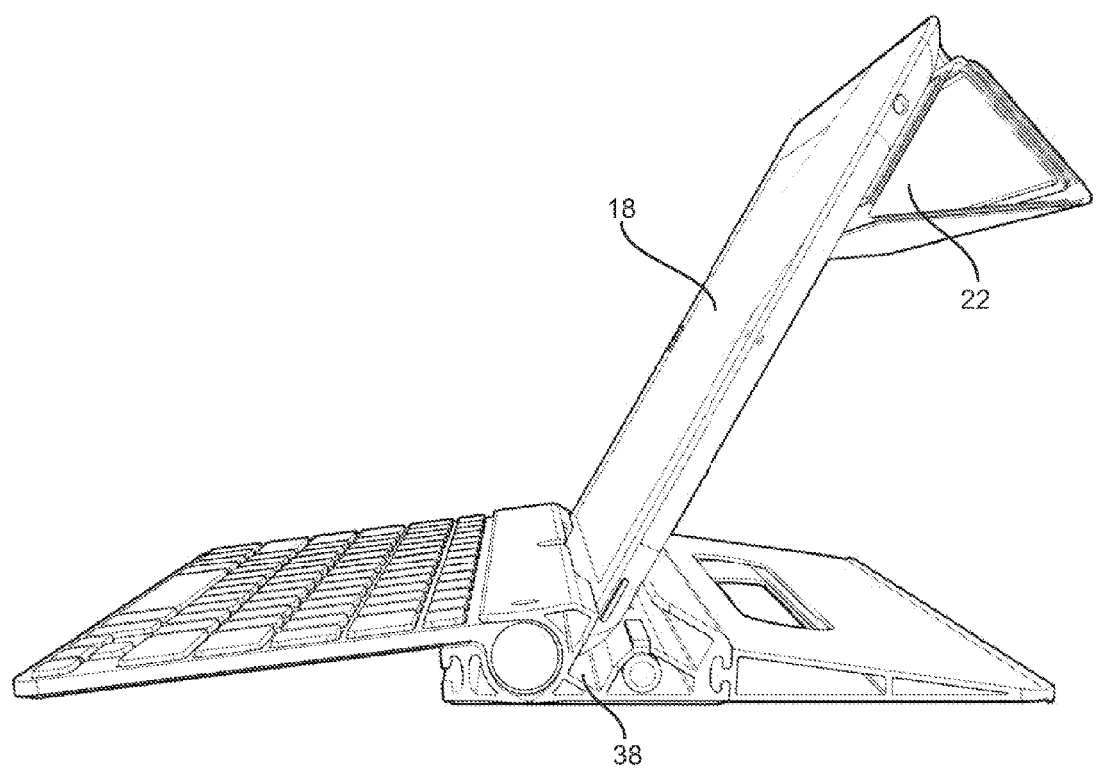
FIG. 39 Folded cover outside of "writing with keyboard" nesting area.
Figure 40:
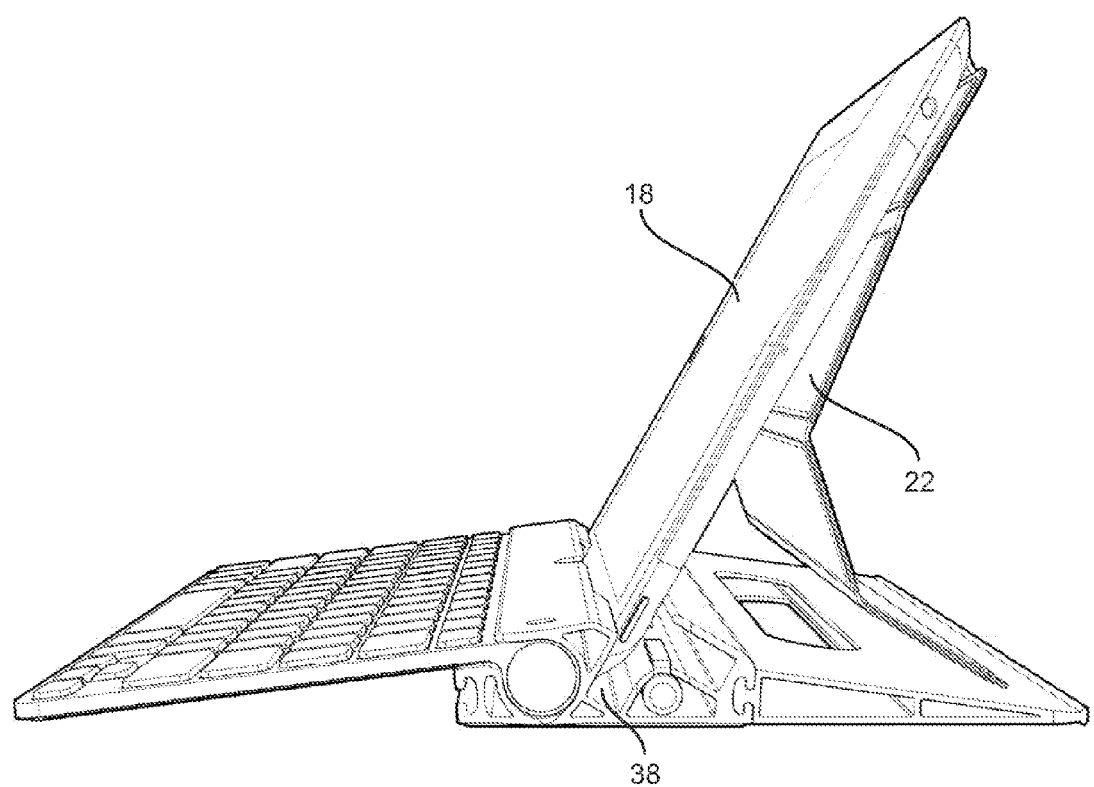
FIG. 40 Unfolded cover outside of "writing with keyboard" nesting area.

A slate-cover 22 such as the APPLE SMARTCOVER for slate-device 18 can be left folded outside of nesting area for "writing with keyboard position" 38 as shown in FIG. 39. An unfolded cover outside of "writing with keyboard" nesting area is shown in FIG. 40. A Slate-cover 22 such as the APPLE SMARTCOVER for slate-device 18 can be left unfolded outside of nesting area for "writing with keyboard position" 38.

Figure 41:
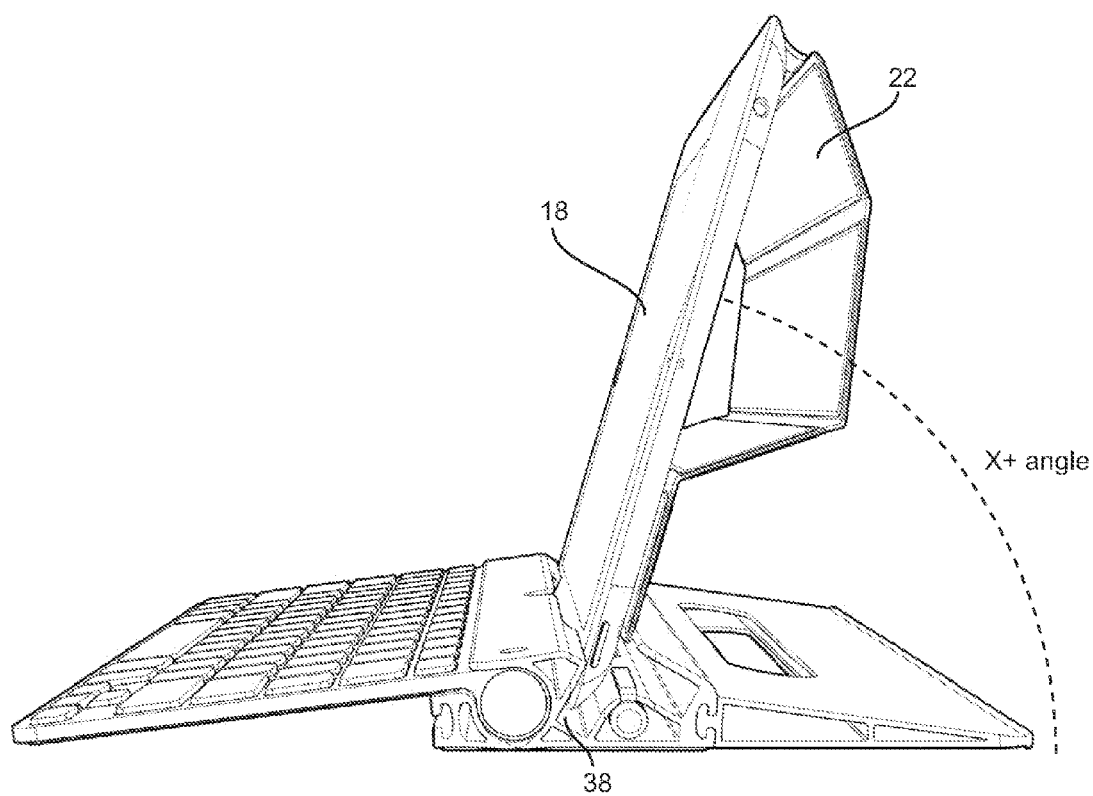
FIG. 41 Fitted cover in "writing with keyboard" nesting area changing viewing angle over outside of "writing with keyboard" nesting area.

A slate-cover 22 such as the APPLE SMARTCOVER for slate-device 18 can be fitted within nesting area for "writing with keyboard position" 38. The extra thickness changes the slate-device 18 angle of "writing with keyboard position" as shown in FIG. 41.

Figure 42:
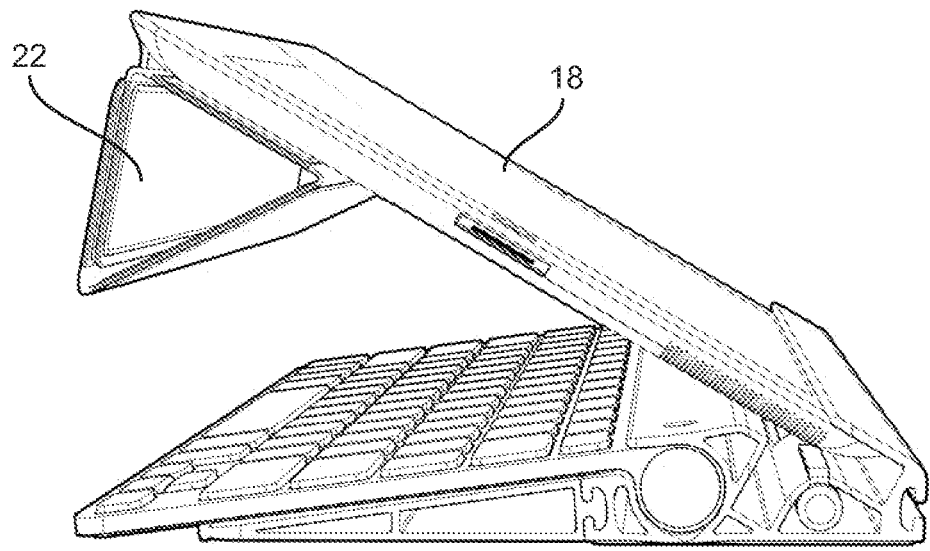
FIG. 42 Folded cover outside of "drawing with easel" nesting area.

A slate-cover 22 such as the APPLE SMARTCOVER for slate-device 18 can be left folded outside of nesting area for "drawing easel position" 40 as shown in FIG. 42.

Figure 43:
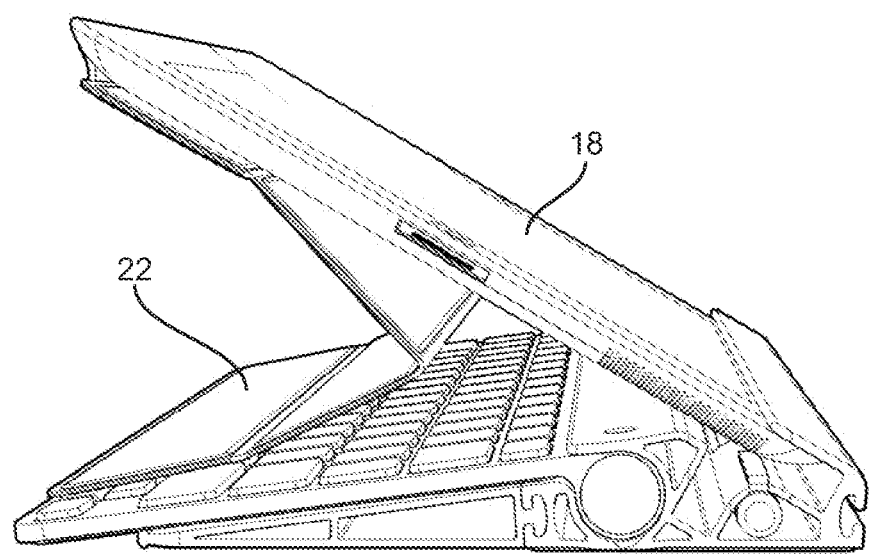
FIG. 43 Unfolded cover outside of "drawing with easel" nesting area.

A slate-cover 22 such as the APPLE SMARTCOVER for slate-device 18 can be left unfolded outside of nesting area for "drawing easel position" 40 as shown in FIG. 43.

Figure 44:
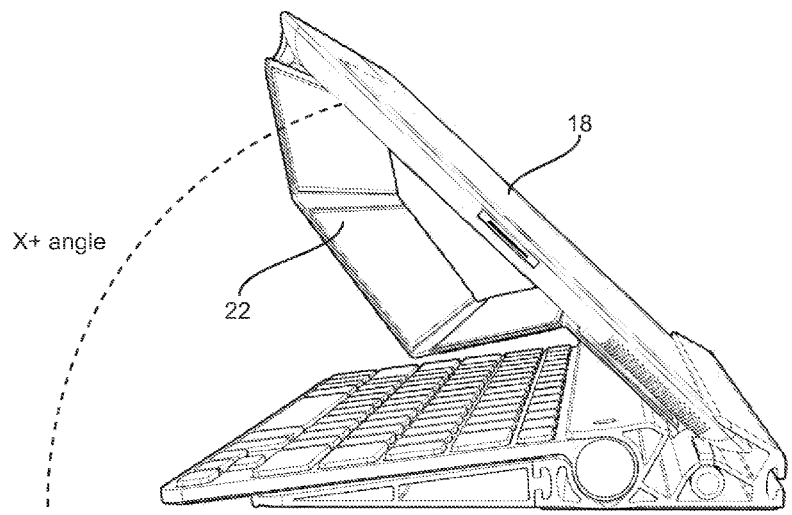
FIG. 44 Fitted cover in "drawing with easel" nesting area changing viewing angle.

A slate-cover 22 such as the APPLE SMARTCOVER for slate-device 18 can be fitted within nesting area for "drawing easel position" 40. The extra thickness changes the slate-device 18 angle of "writing with keyboard position" as shown in FIG. 44.

Figure 45:
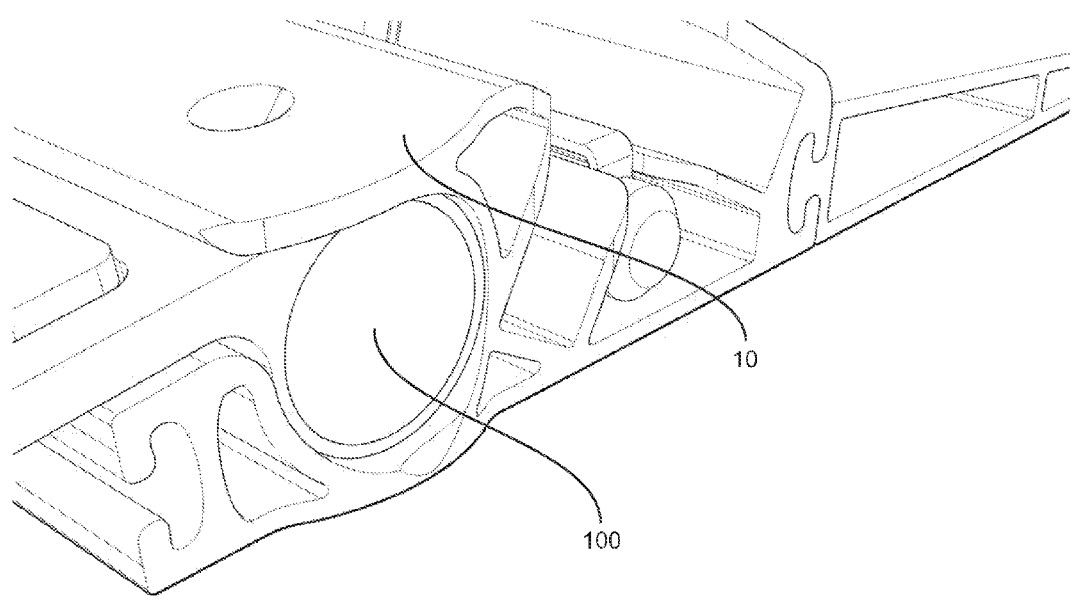
FIG. 45 Existing Keyboard's power-button shield.

A shield created by locally over-extending the length of stand core around 100 power-button of stand-alone keyboard prevents accidental button actuation by nearby objects as shown in FIG. 45.

Figure 46A:
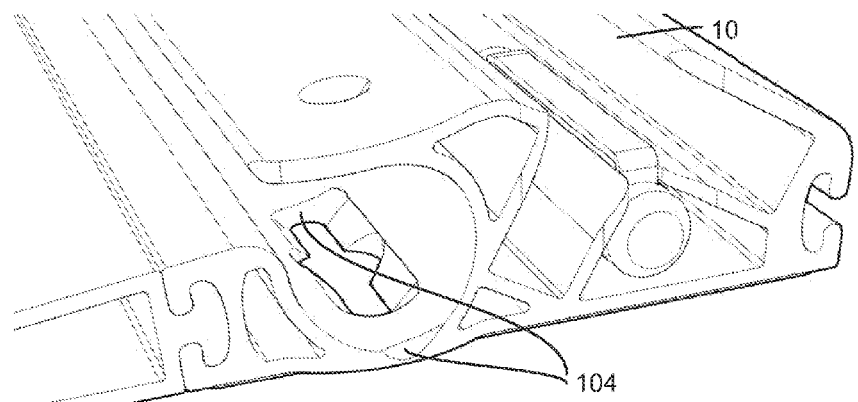
FIGS. 46A-C Cavities to accommodate protruding parts.
Figure 46B:
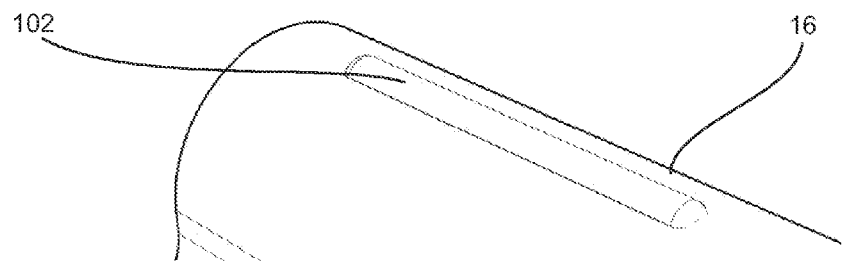
Figure 46C:
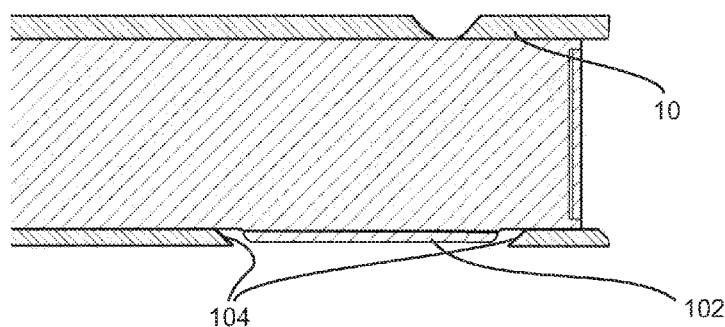

A softened edge 100 in 10 stand core for accommodating slide installation of stand-alone-keyboard 16 to accommodate protruding parts 102 after attaching the stand-alone keyboard 16 to the stand core 10 as shown in FIGS. 46A-C.

Figure 47:
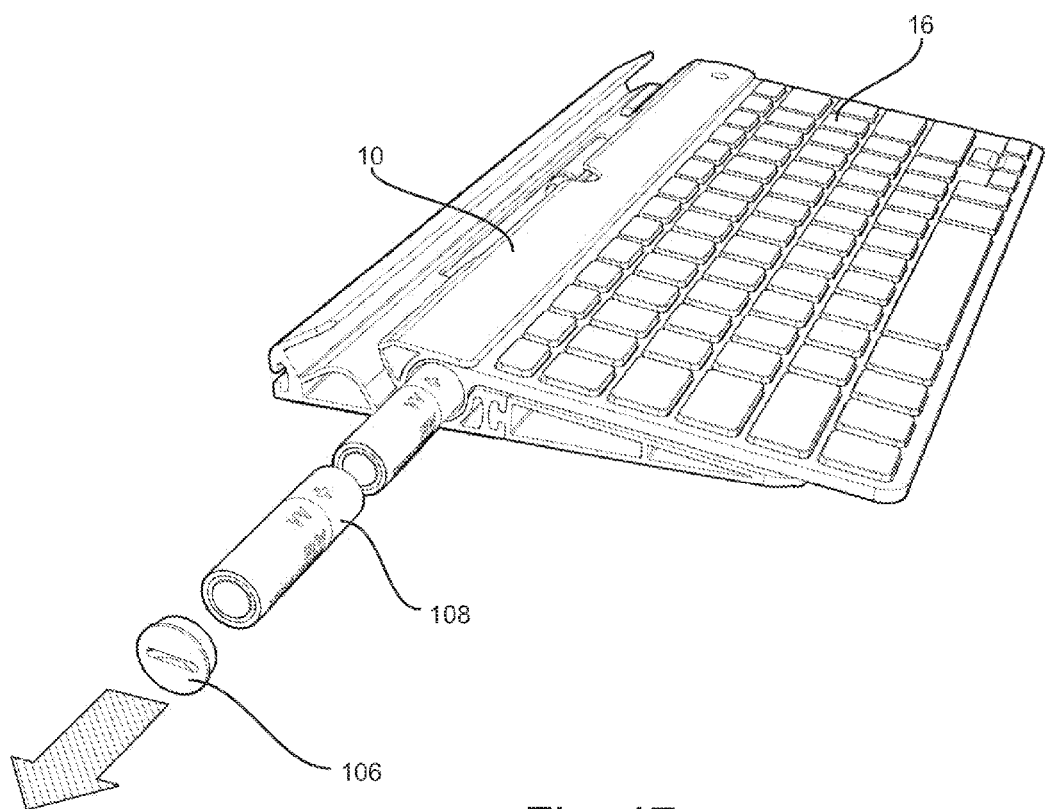
FIG. 47 Access to existing keyboard's battery-door.

A battery-door 106 of stand-alone keyboard is fully accessible without disengaging 16 stand-alone keyboard and stand core to replace 108 batteries for stand-alone keyboard as shown in FIG. 47.

Figure 48:
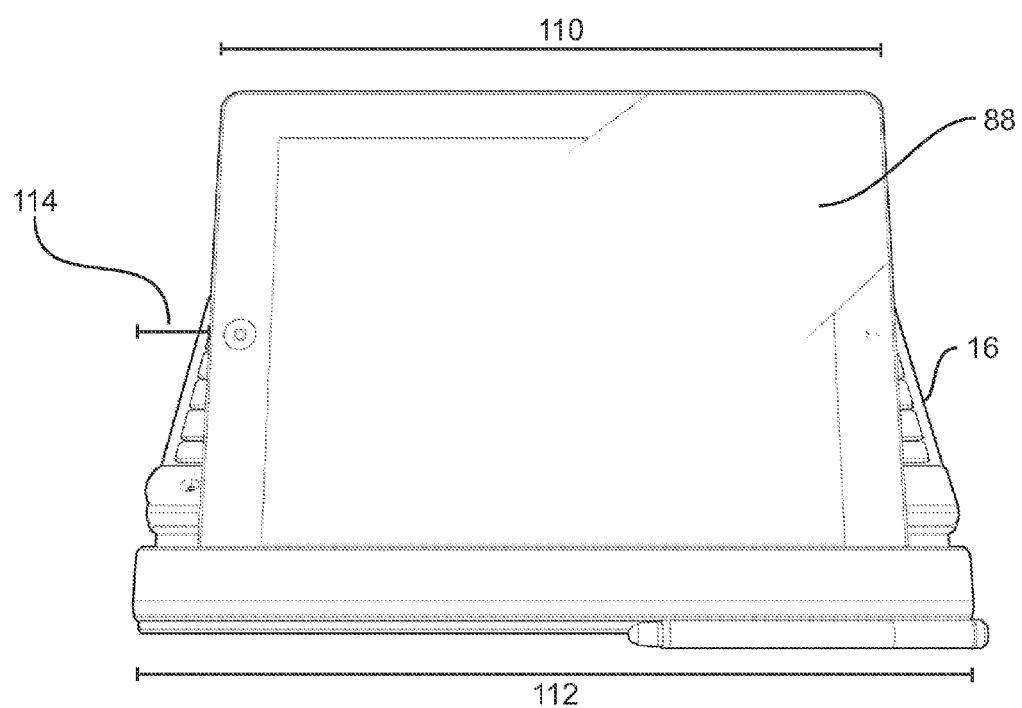
FIG. 48 Width differential of mobile electronic device and keyboard allows on-screen key access.

Now referring to FIG. 48, when a stand-alone keyboard 16 is paired to slate-device 18, the on-screen keyboard 118 does not activate by default for text input. Pressing the on-screen keyboard key 116 makes the on-screen keyboard 118 active without having to un-pair the stand-alone keyboard 116. The stand-alone keyboard's width 112 is greater than slate-device's width 110. This makes the on-screen keyboard key 116 more accessible.

Figure 49:
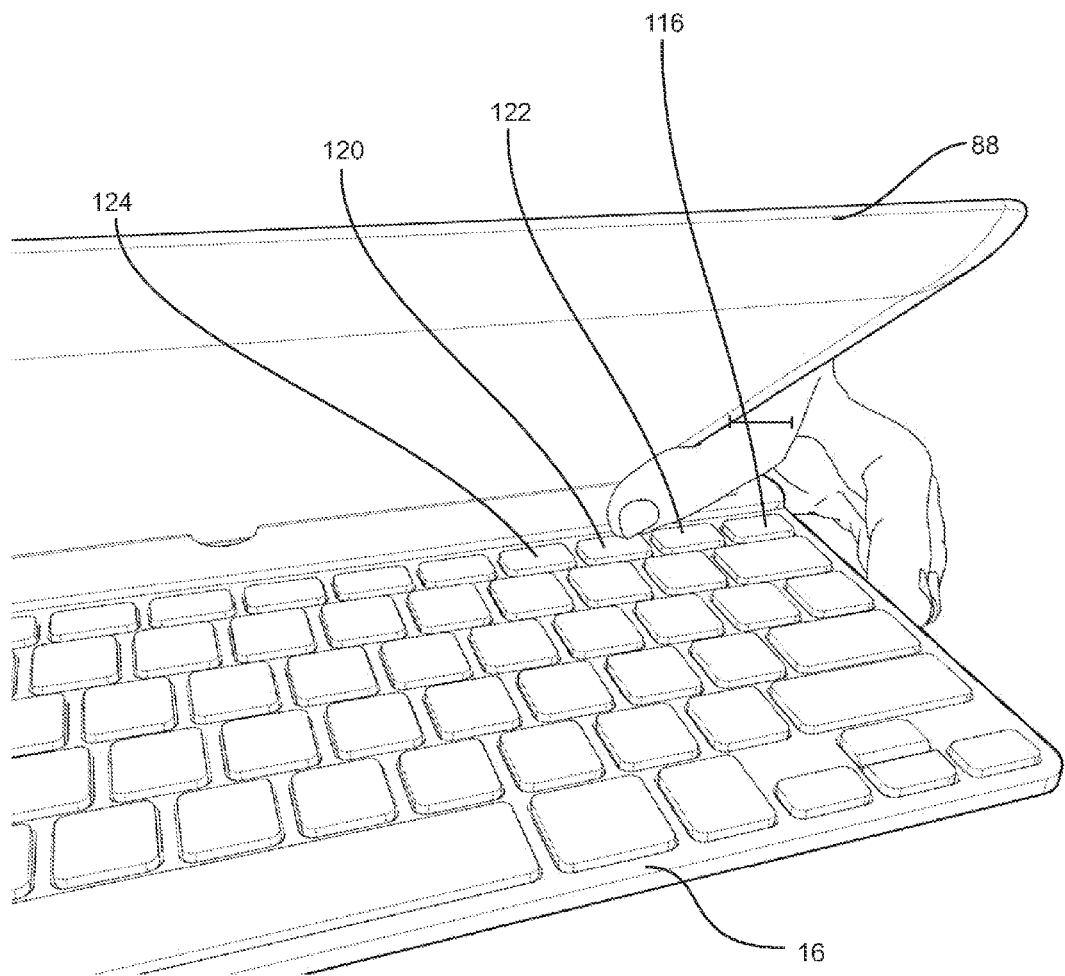
FIG. 49 Width differential of mobile electronic device and keyboard allows volume key access.
Figure 50A:
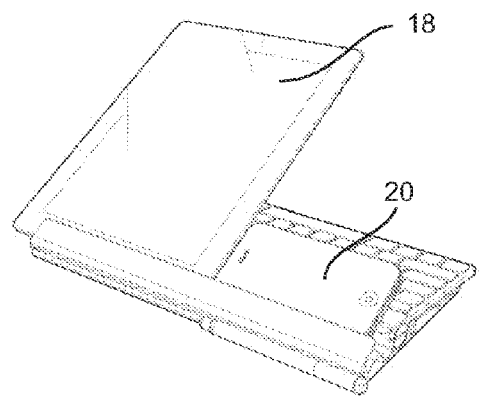
FIGS. 50A-C Side-by-side nesting of a slate-device and a smartphone.
Figure 50B:
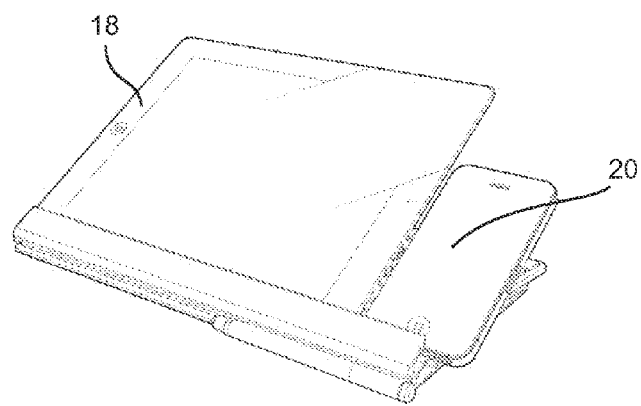
Figure 50C:
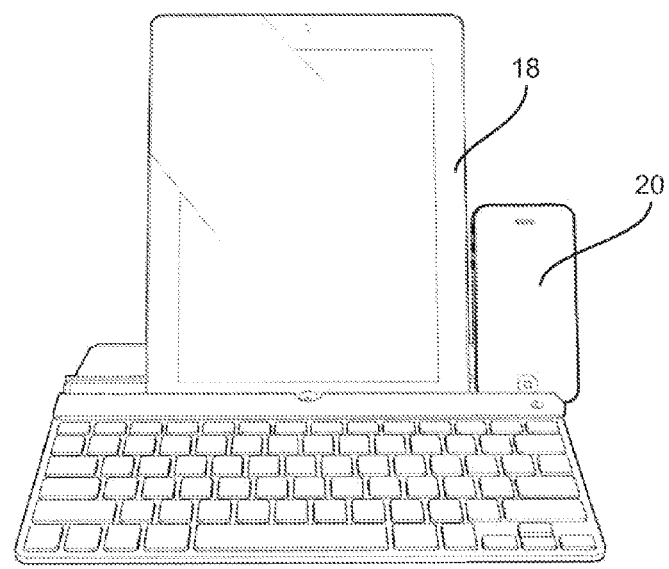
Figure 51:
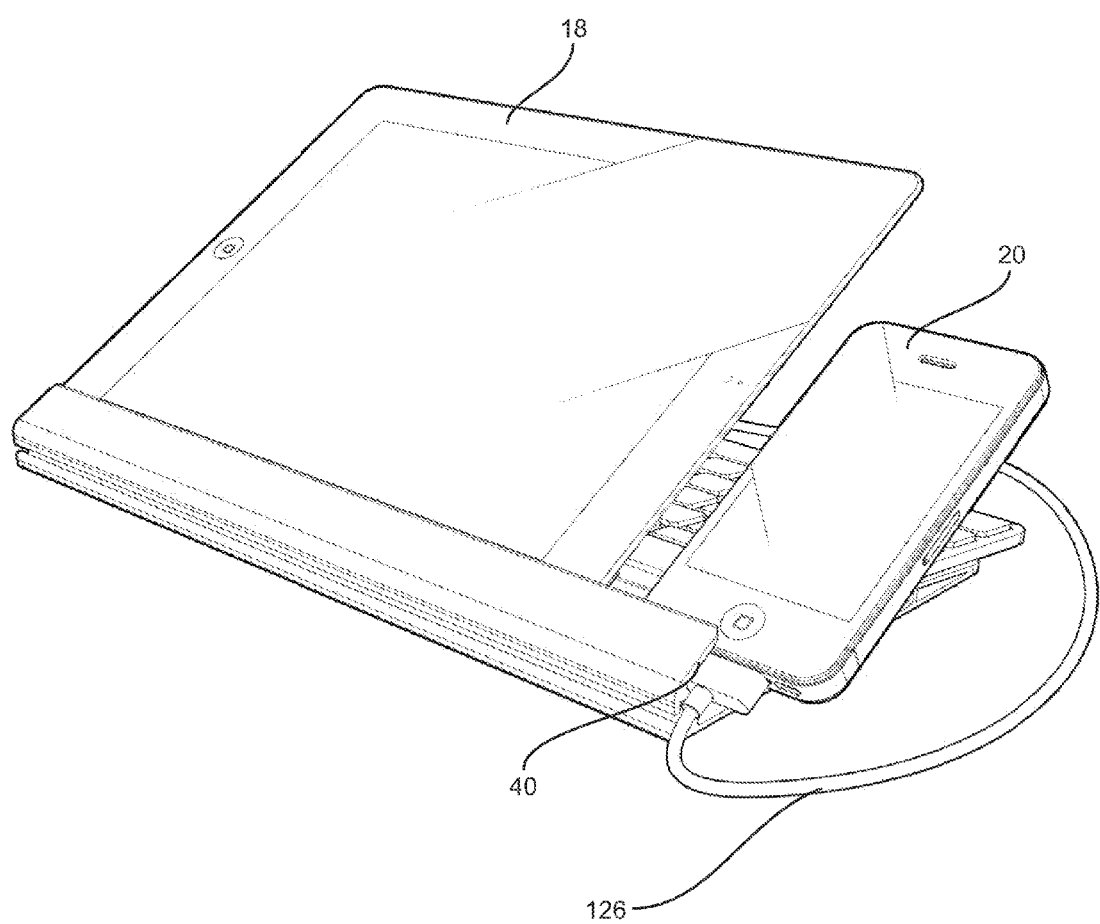
FIG. 51 Side-by-side nesting of a slate-device and a smartphone overhanging for charging.
Figure 52:
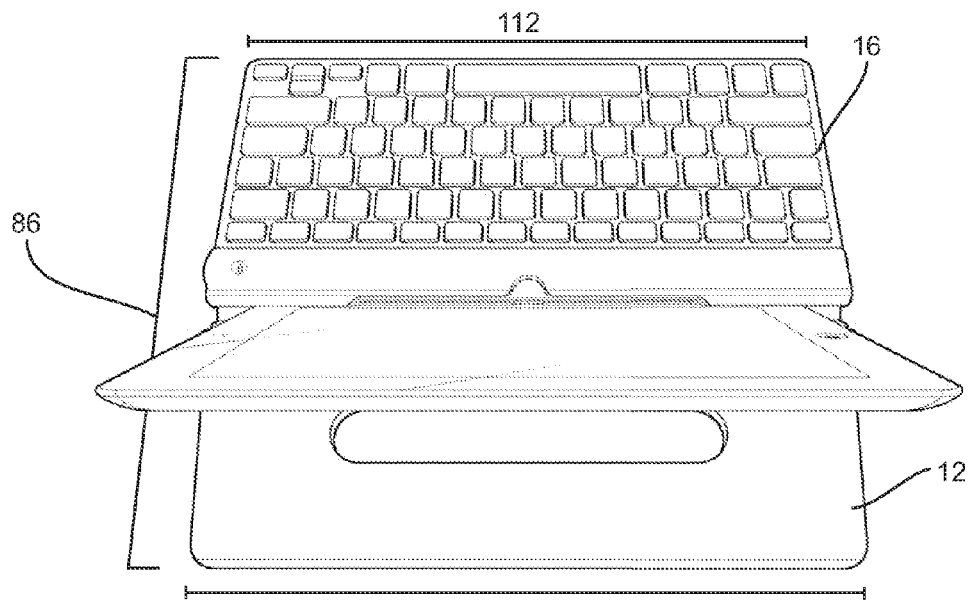
FIG. 52 Full-width support with wedge-extension.
Figure 53:
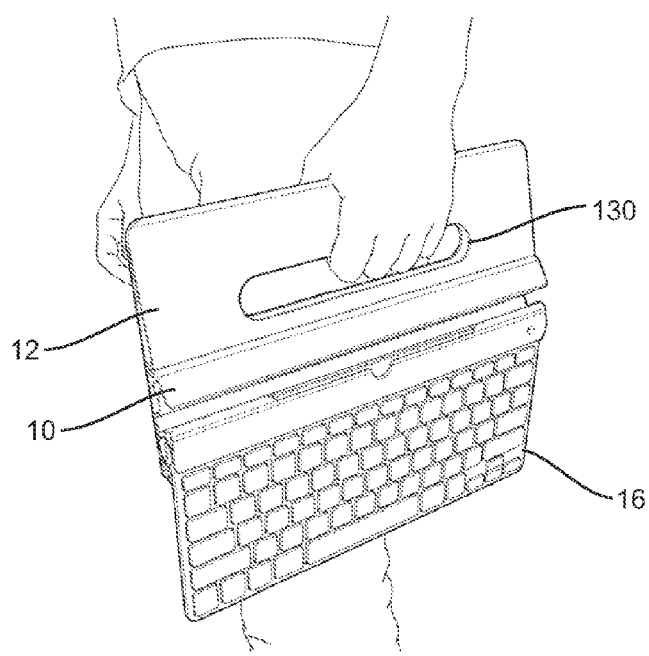
FIG. 53 Extension wedge cavity as carrying-handle.

The width difference 11 between stale-device and keyboard makes volume control keys 120, 122, 124 more accessible as shown in FIG. 49

Referring to FIGS. 50-53, a side-by-side nesting of a slate-device 18 and a smartphone 20 is possible in any combination of landscape/portrait mode in either "writing with keyboard position" 38 and/or "drawing easel position" 40. A smartphone 20 can be nested side-by-side next to a slate-device 18 while overhanging from "drawing easel position" 40 cavity to make room for 126 charge/sync cable. The width of extension wedge 128 matches the width of stand-alone keyboard 112 to provide maximum width of contact when used on extended-position 86 resting on a person's lap.

Figure 54A:
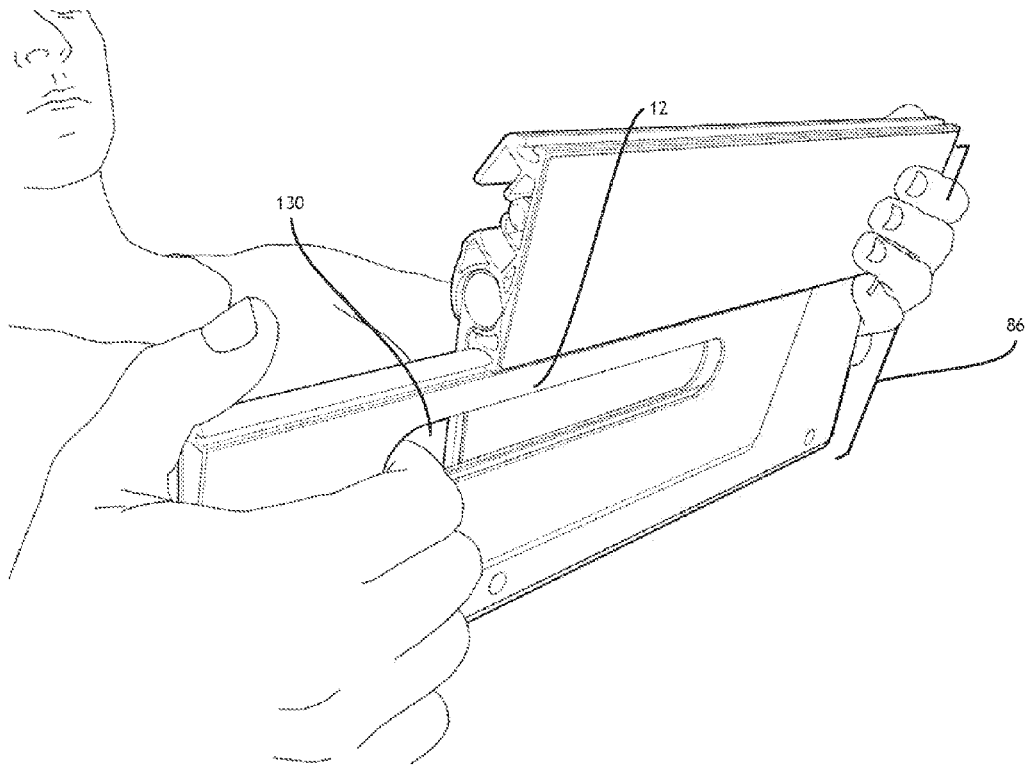
FIGS. 54A-B Extension wedge cavity as pull-handle.
Figure 54B:
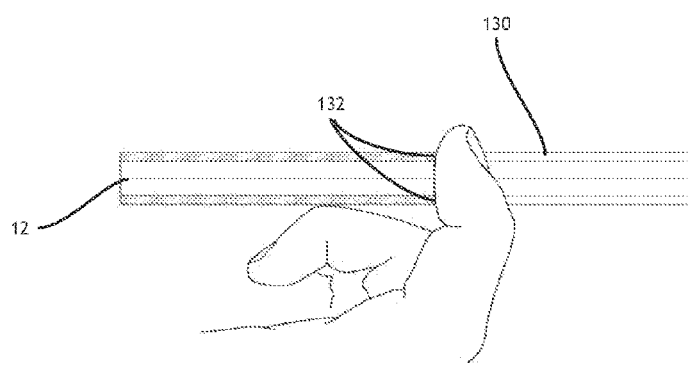

A cut-out 130 on the extension wedge creates a handle that allows a user to carry the extension wedge 12, stand core 10, and the stand-alone keyboard 16 assembled together when moving around. The extension wedge 12 can be easily pulled with 1 or 2 fingers in the cut-out of the extension wedge 130 to slide out from a storage-position 84. The spaced apart walls 132 provide extra gripping surface to facilitate pulling as shown in FIGS. 54A-B.

Figure 55A:
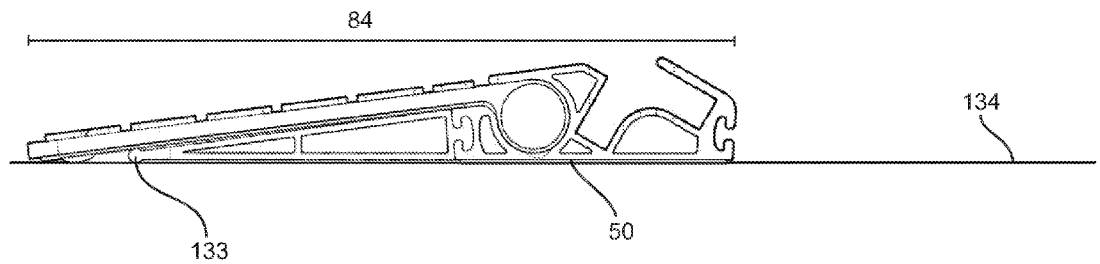
FIGS. 55A-B Ground Stability.
Figure 55B:
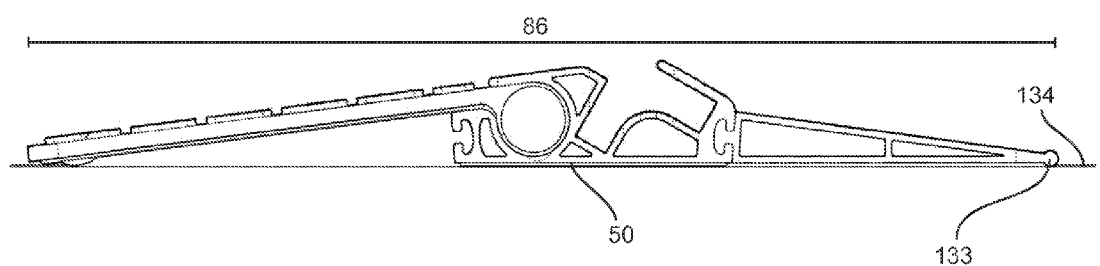

The localized thicker cross-section at converging end of 12 extension wedge creates an elongated foot or line of contact to the flat ground-plane 134 for the product when the extension wedge 12 is in either in a storage-position 84 or an extended-position 86. This foot expands the stability provided by non-slip coating/padding 50 in stand core 10 as shown in FIG. 55.

Figure 56:
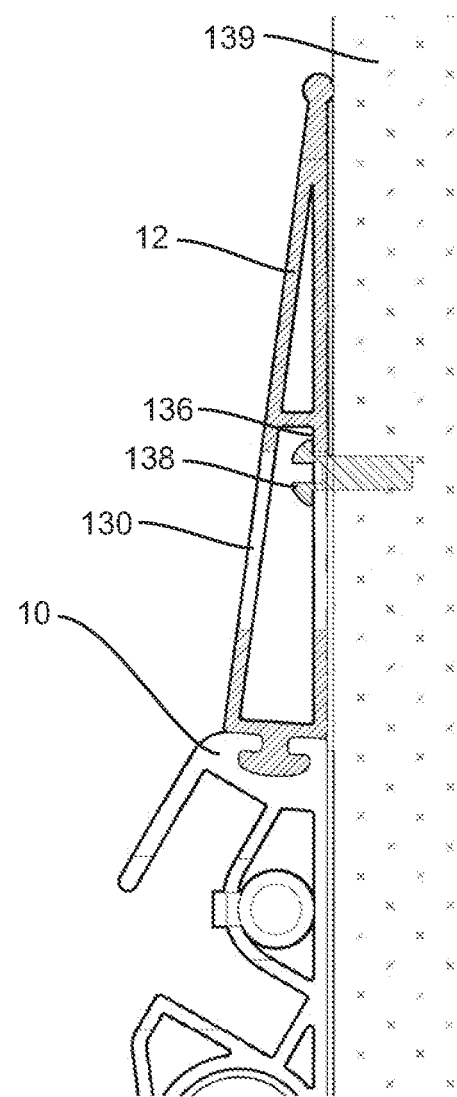
FIG. 56 Extension wedge cavity as hanging feature.
Figure 57A:
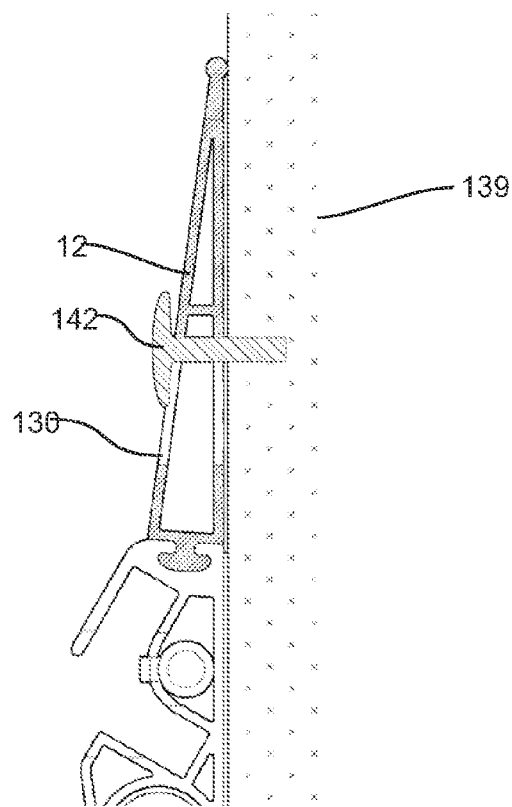
FIGS. 57A-D Hanging options.
Figure 57B:
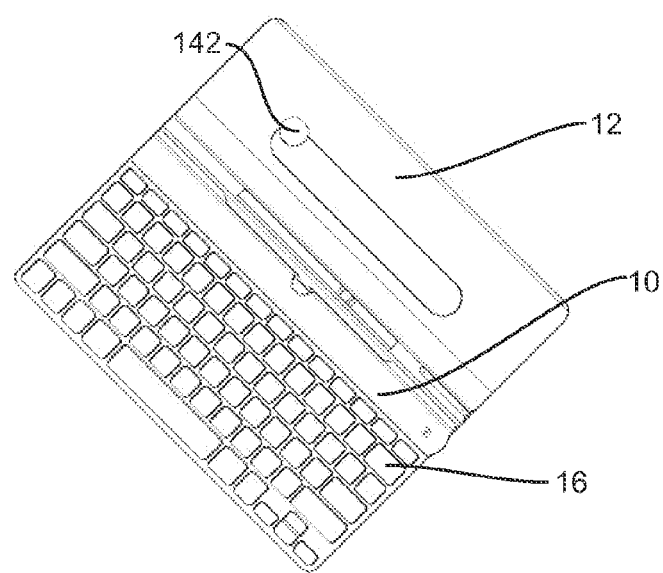
Figure 57C:
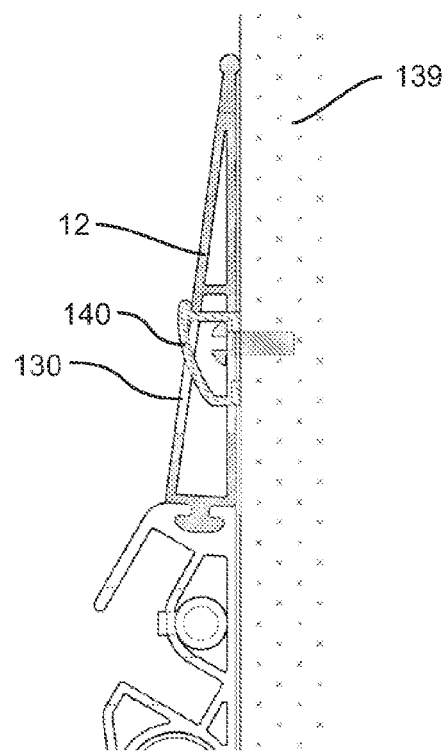
Figure 57D:
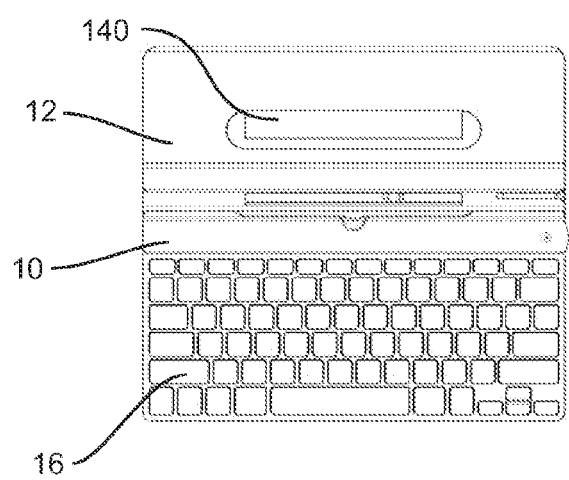

The overhang 156 on the cut-out handle on the extension wedge can be used to hang the extension wedge 12, stand core 10, and stand-alone keyboard 16 on a wall 139 or other vertical/inclined surface using a wall-mounted screw 138. A cut-out on extension wedge can be used to hang the extension wedge 12, stand core 10, and stand-alone keyboard 16 on a wall or other vertical/inclined surface using custom hooks 140 or a generic drawer pull or hook 142 as shown in FIGS. 56-57.

Figure 58:
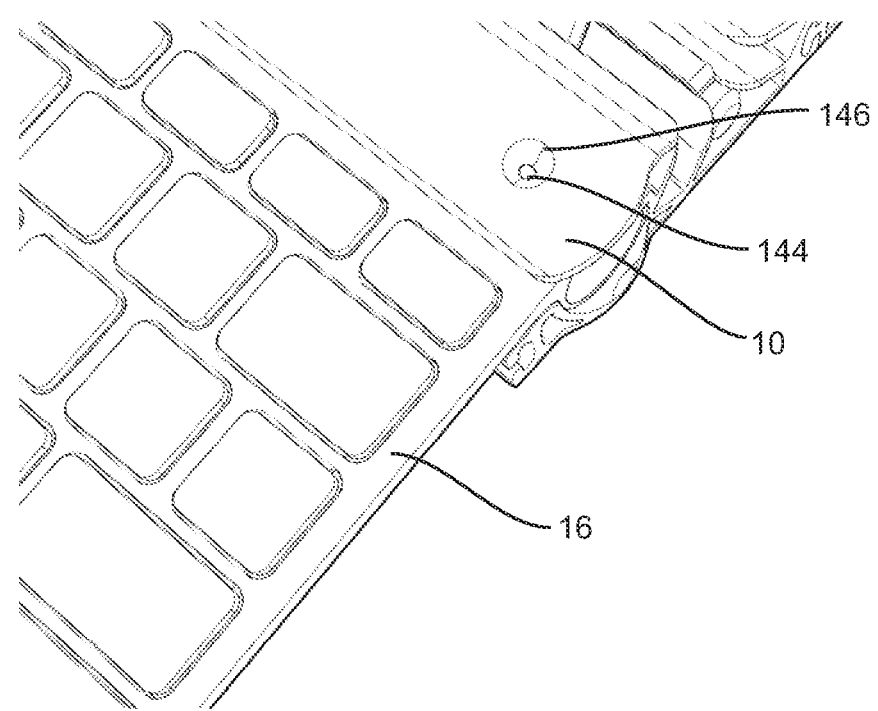
FIG. 58 Localized cavities exposing UI elements of existing keyboard.
Figure 59:
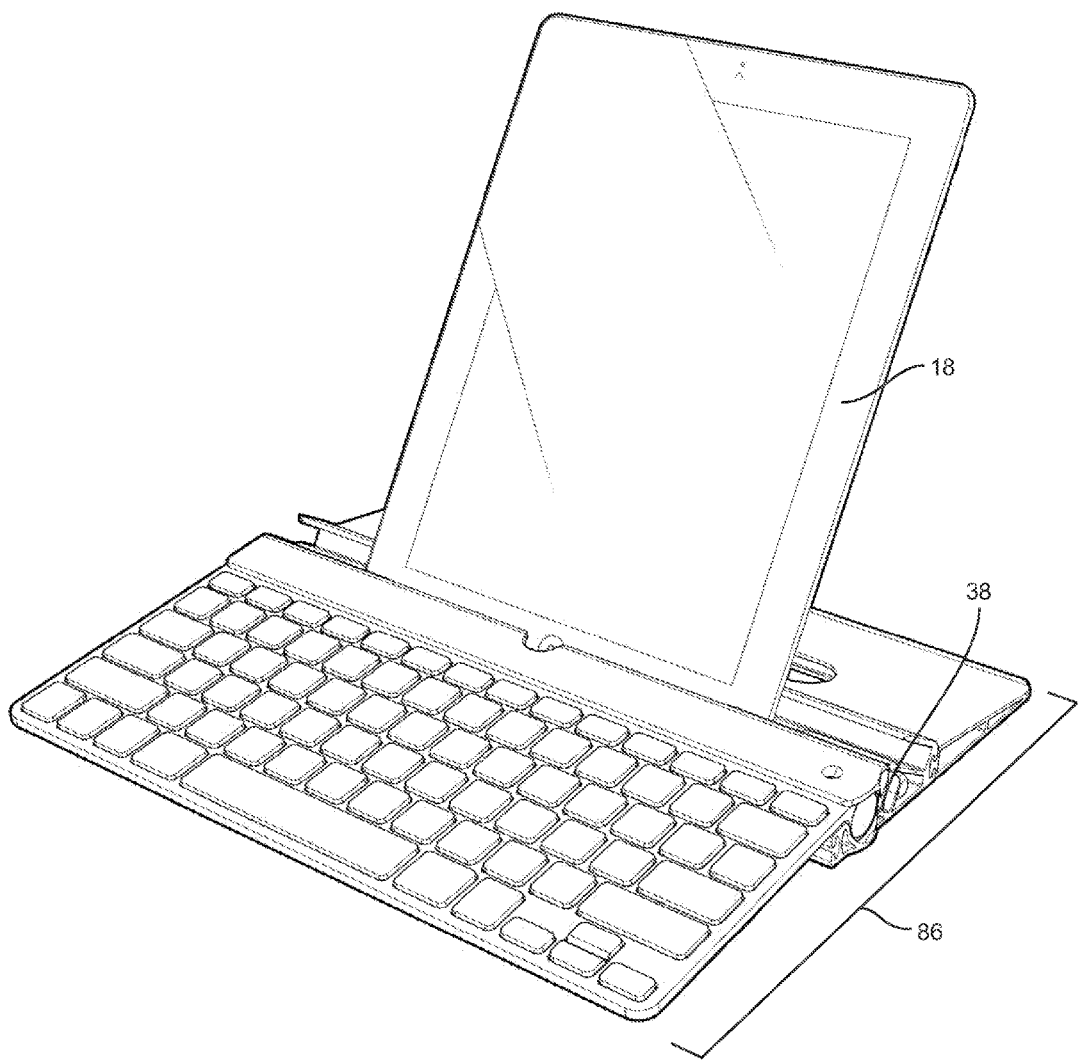
FIG. 59 Writing with keyboard position, with extension wedge in extended-position. Tablet in Portrait mode.
Figure 60:
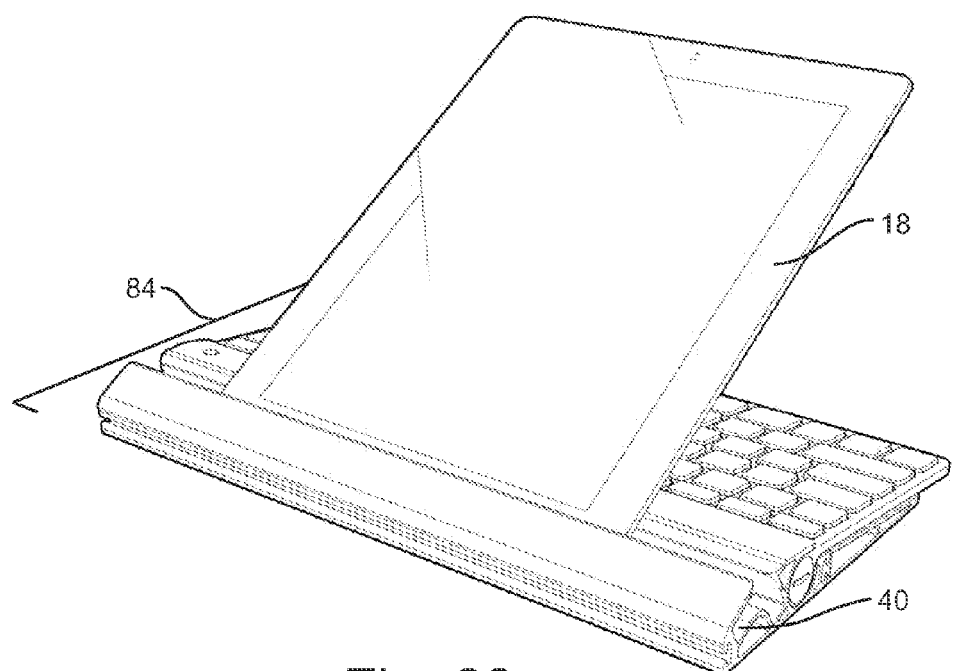
FIG. 60 Drawing with easel position, with extension wedge in storage-position. Tablet in Portrait mode.
Figure 61:
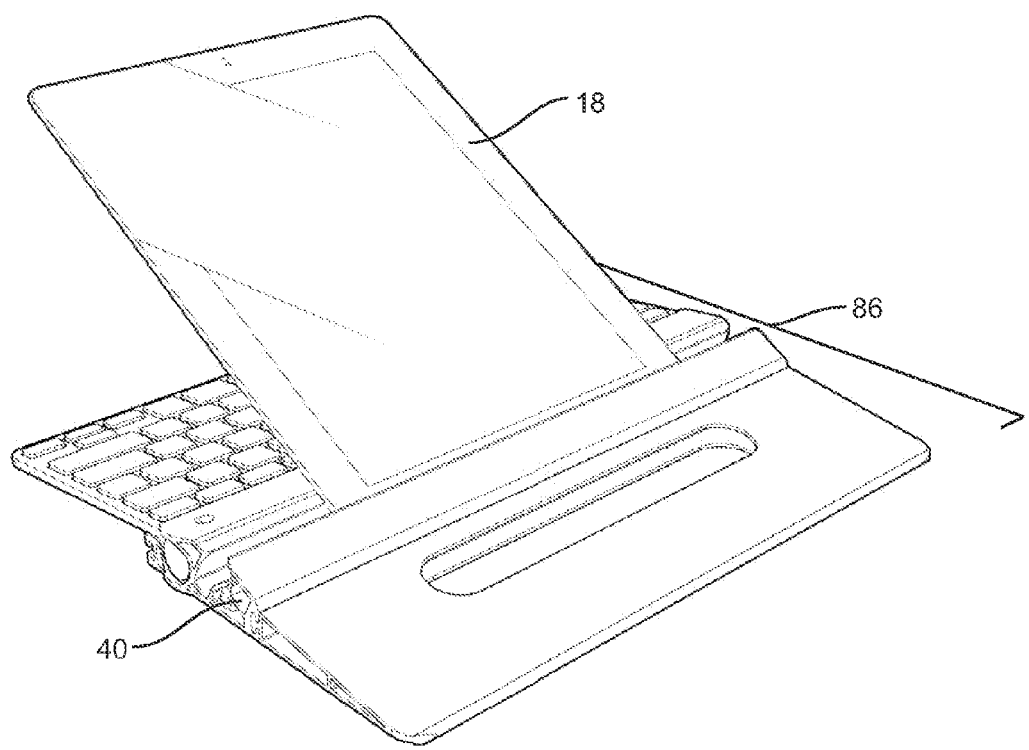
FIG. 61 Drawing with easel position, with extension wedge in extended-position. Tablet in Portrait mode.
Figure 62:
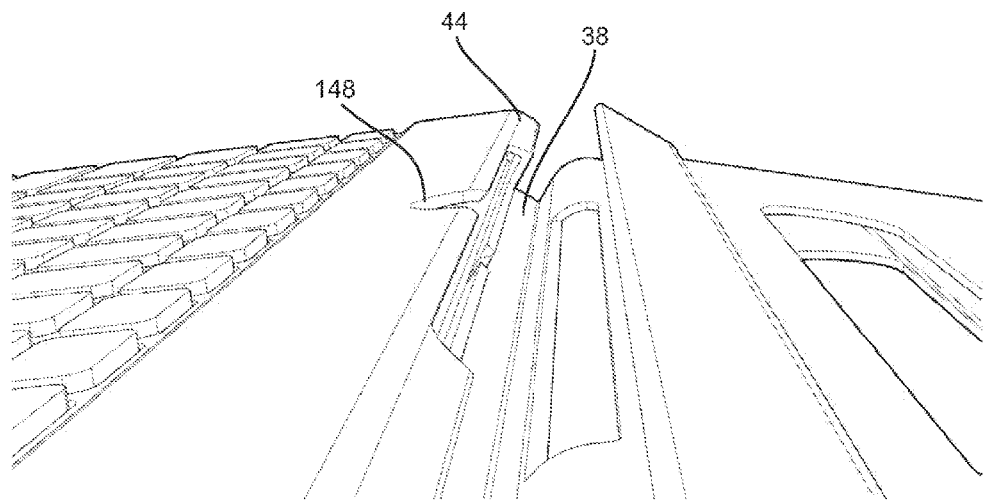
FIG. 62 Access to home-button in portrait mode devices.
Figure 63:
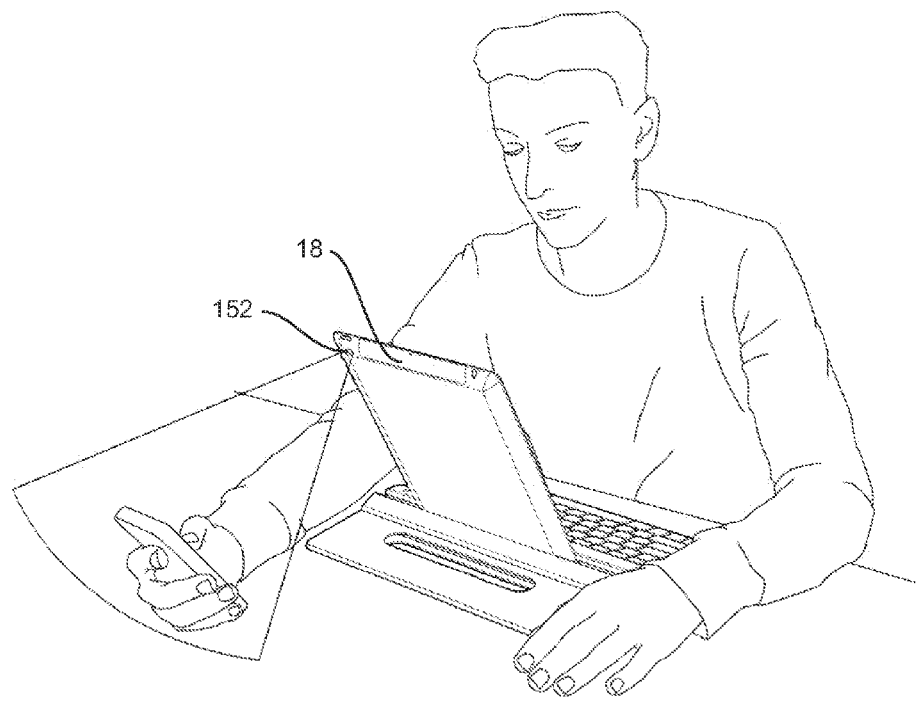
FIG. 63 "writing with keyboard position" used to record/live-steam via rear-facing camera.
Figure 64:
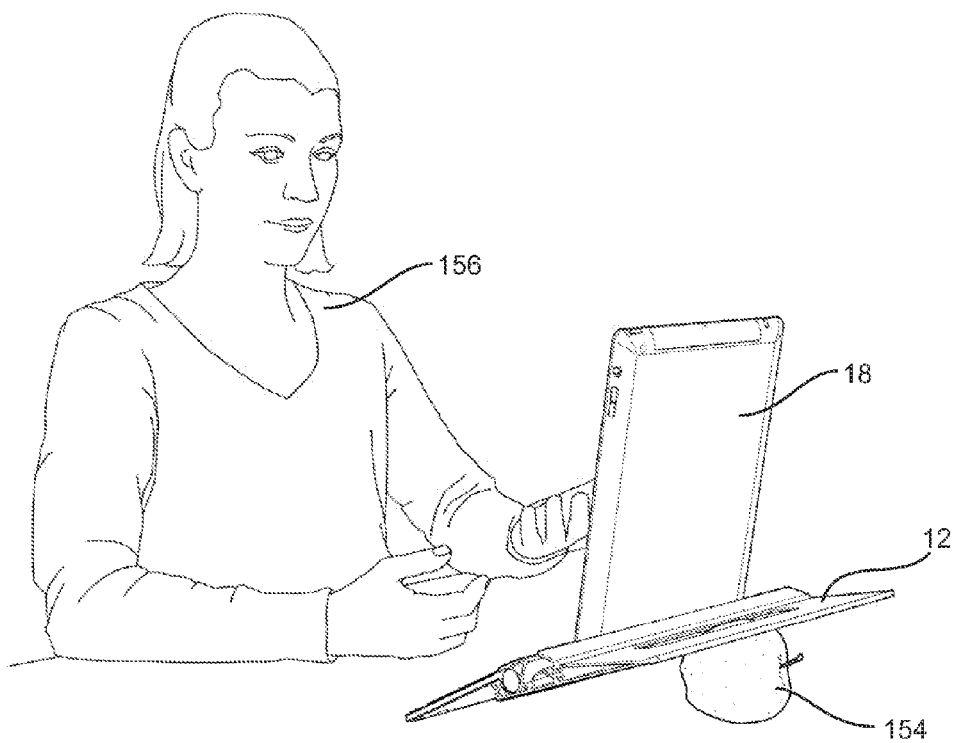
FIG. 64 "writing with keyboard position" used to record/live-steam via front-facing camera.

UI elements of the stand-alone keyboard 16 can be accessed for actuation or visibility though localized cavities of the stand core 10 that act as see-through windows or holes 146 as shown in FIG. 58. Paring an on-off light 146 on stand-alone keyboard is one example of such UI elements.

A slate-device 18 can be nested in portrait-orientation for drawing easel position 40 with extended position of extension wedge 86. A central circular cavity 148 provides access to a home button 96 of slate-device/smartphone when devices are nested in portrait orientation. A slate-device 18 or smartphone 20 in "writing with keyboard position" can also be used to record or live-stream video from a front-facing camera 150, a rear-facing camera 152 or alternating between the two. Placing office or household objects 154 of desired height under the extension wedge 12 can be used to tilt the angle of the slate-device 18 or smartphone 20 for desired front-facing camera 150 or rear-facing camera 152 tilt angle to center objects or people, such user of slate-device/smartphone on screen 156 as shown in FIGS. 59-64.

Figure 65:
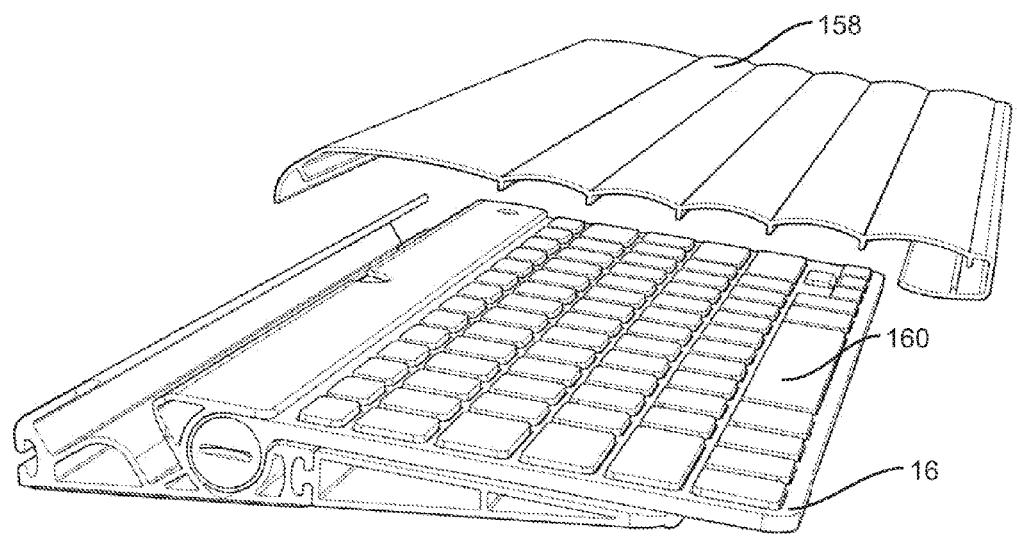
FIG. 65 Keyboard shield.

A keyboard shield 158 has arched profiles 160 with support ribs to prevent keys being accidentally pressed when keyboard with stand is stored in a bag next to other objects as shown in FIG. 65.

Figure 66A:
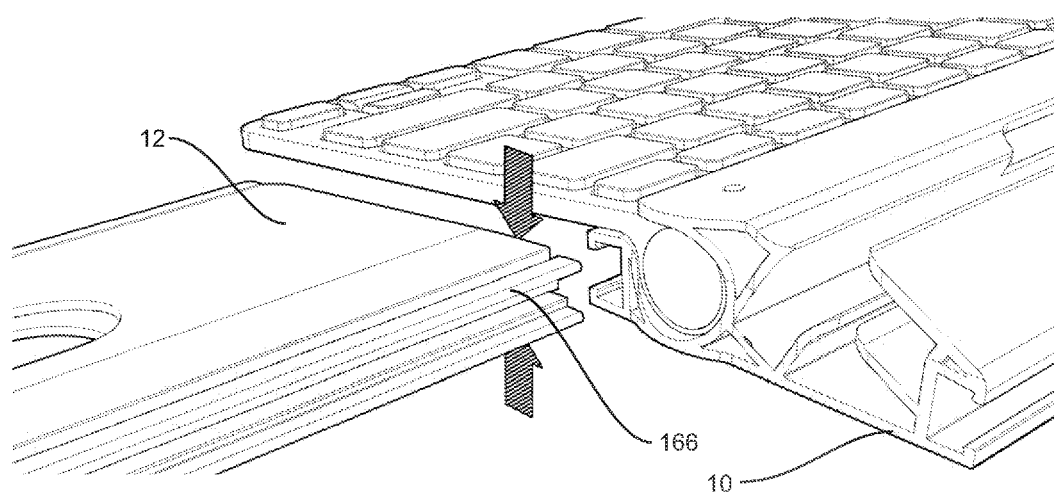
FIGS. 66A-C Pinching sliding-rail.
Figure 66B:
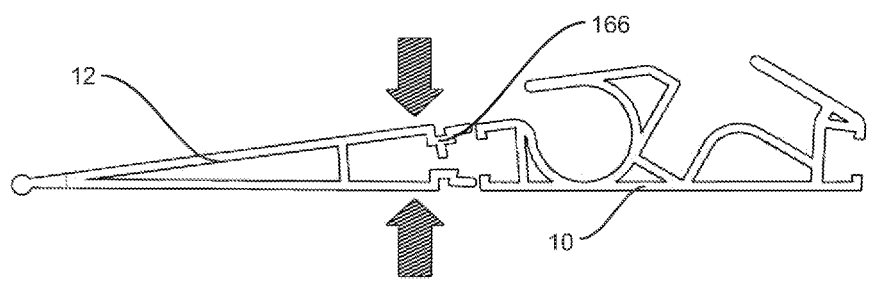
Figure 66C:
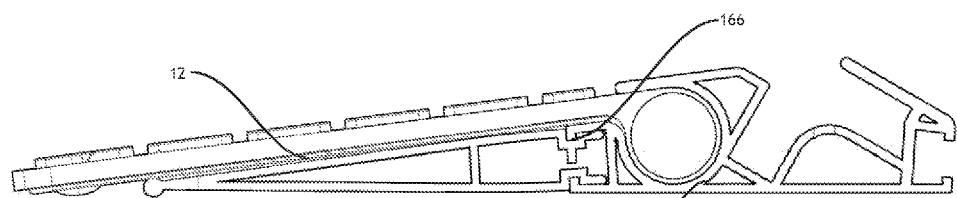

FIGS. 66A-C-illustrated a pinching, sliding rail version of the present invention. In this embodiments the extension wedge 12 is comprised of a pinching sliding rail that, when slid into the rail channel of the stand core 10 a top and bottom rail is compressed in a manner forcing the two rails to narrow towards each other when paced into a receiving rail channel on the stand core 10. The compression forces shown by the arrows in the figures retains the extension wedge 12 in the rail channel and ensure its engagement with the stand core 10.

Figure 67:
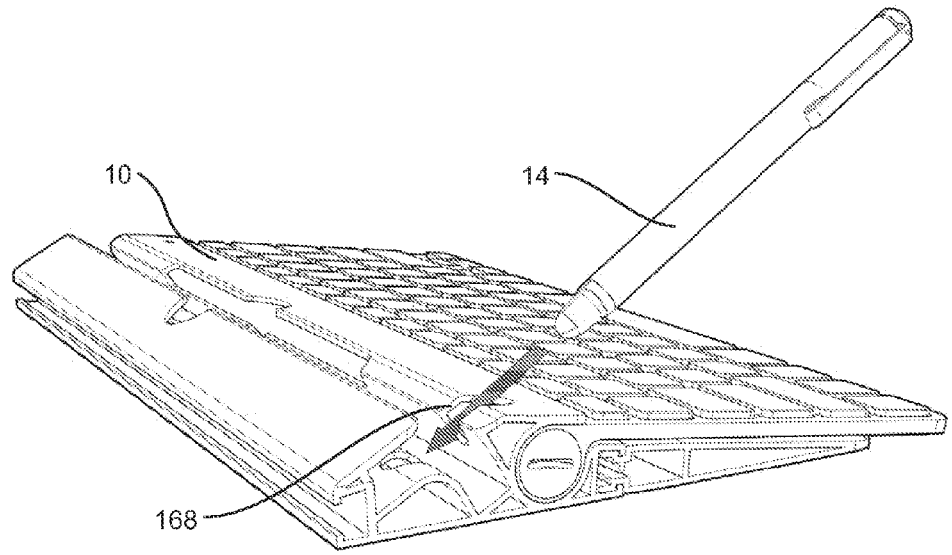
FIG. 67 Stylus Inkwell.

FIG. 67 illustrates another alternative embodiment of the present invention comprising a sliding stylus 14. An inkwell 168 is provided to retain a sliding stylus 14 within the stand core 10. The location of the inkwell 168 can be anywhere on the stand core 10, but it preferably to the left or right side of the keyboard 16 when attached to the stand core 10 so a user can store a sliding stylus 14 in the inkwell 168 while also use the stand core 10 to hold a mobile electronic device or other electronic device 18 in a viewing position.

Figure 68:
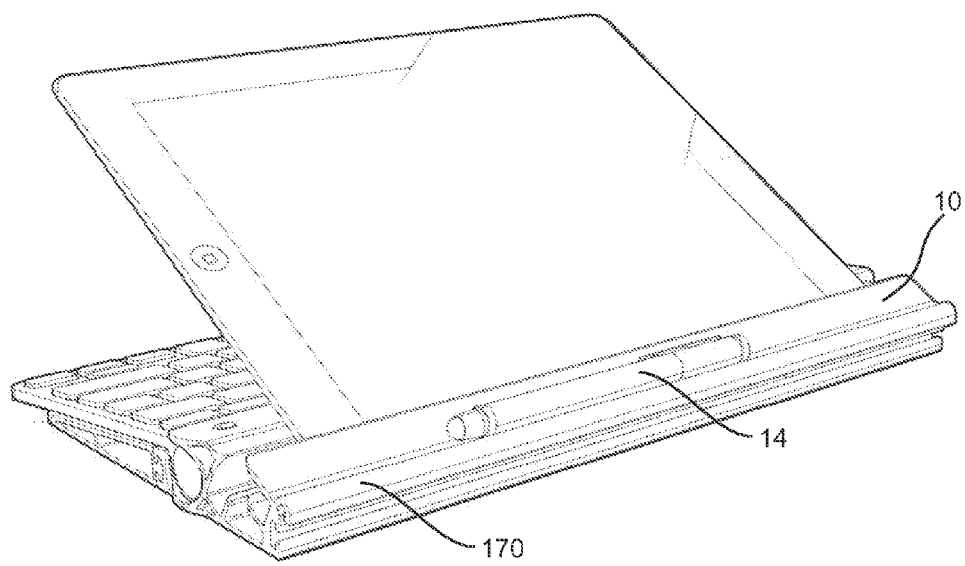
FIG. 68 Barrel-shelf for sliding-stylus.

FIG. 68 illustrates a barrel shelf 170 on the stand core 10 for holding a sliding stylus 14. The barrel shelf 14 is located in front of the electronic device in such a manner that the sliding stylus 14 can be set or placed in the barrel shelf 14 when an electronic device is being retained in a viewing position by the stand core 10.

Figure 69A:
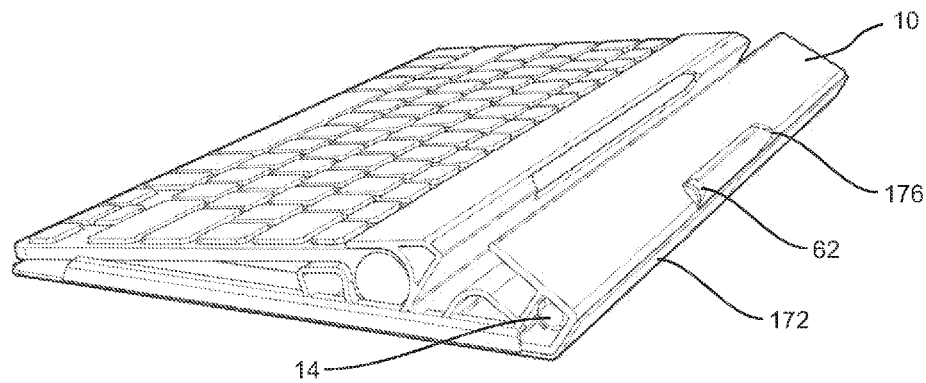
FIGS. 69A-C Sliding tray extension.
Figure 69B:
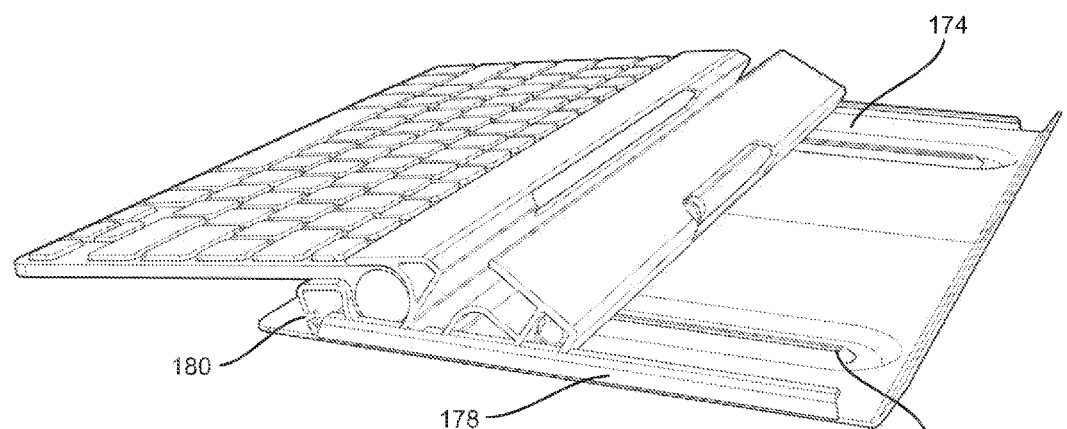
Figure 69C:
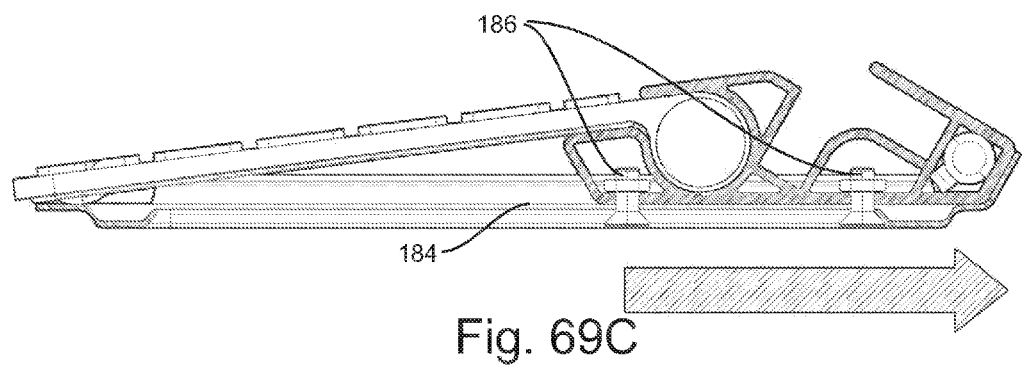
Figure 70A:
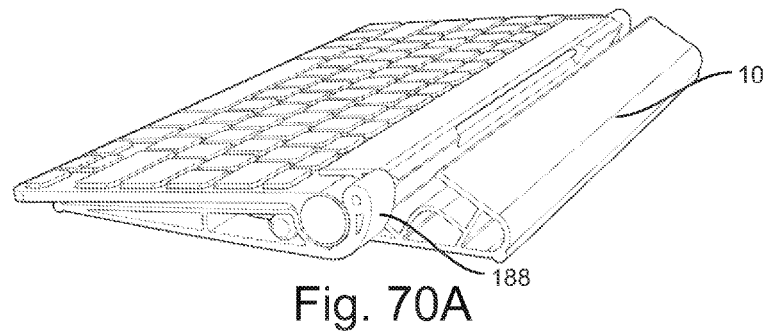
FIGS. 70A-D Folding extension wedge.
Figure 70B:
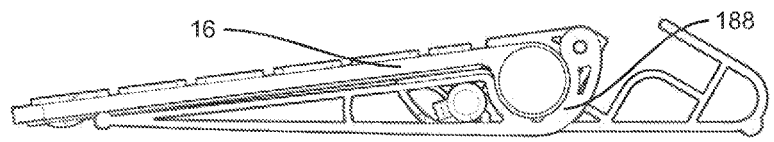
Figure 70C:
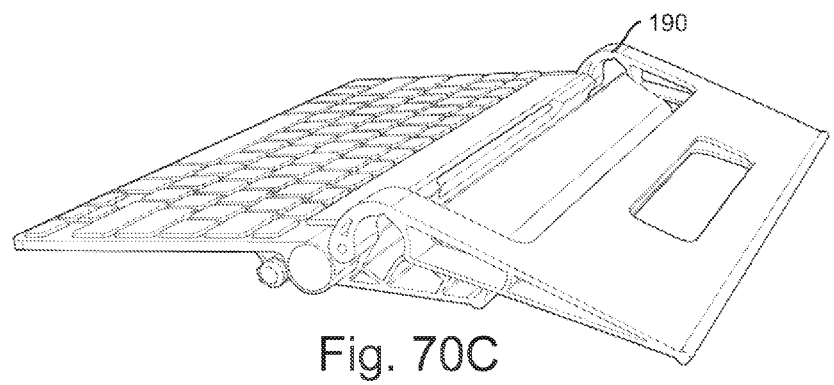
Figure 70D:
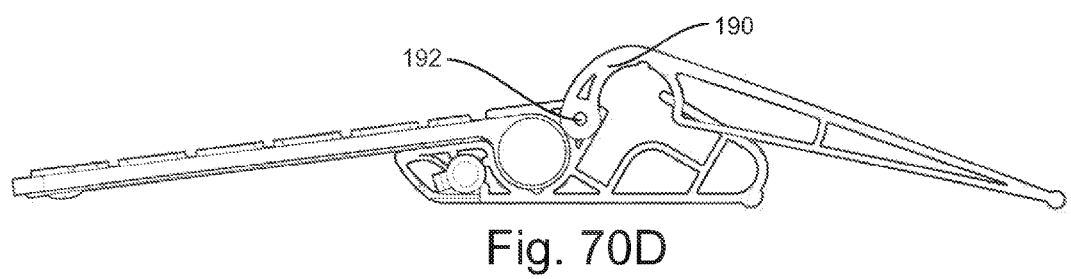

FIGS. 69A-C illustrates a sliding tray extension embodiment wherein the stand core 10 is comprised of an eject window 176 for a sliding stylus 14 and a sliding tray which can be moved between extended and storage positions. An outer rail 178 on the sliding tray engages an outer rail 180 on the stand core 10 a center rail 182 on the sliding tray engages a center rail 184 on the stand core 10 to enable the sliding tray to be engaged with the stand core 10 and move between a storage position 172 and an extended position 174 in the direction illustrated by the arrow as the rails of the sliding extension move with respect to those on the stand core 10.

FIGS. 70A-D illustrates a folding-wedge extension embodiment. In this embodiment the folding extension wedge 188 can be rotated into a storage position 188 and an extended position 190 about a friction pin hinge 192.

Figure 71:
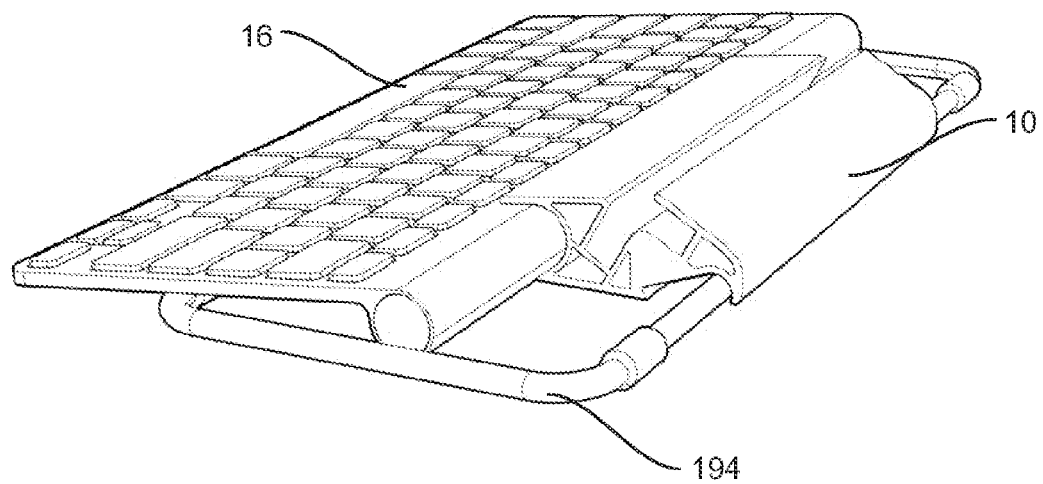
FIG. 71 Folding extension-pipe.
Figure 72:
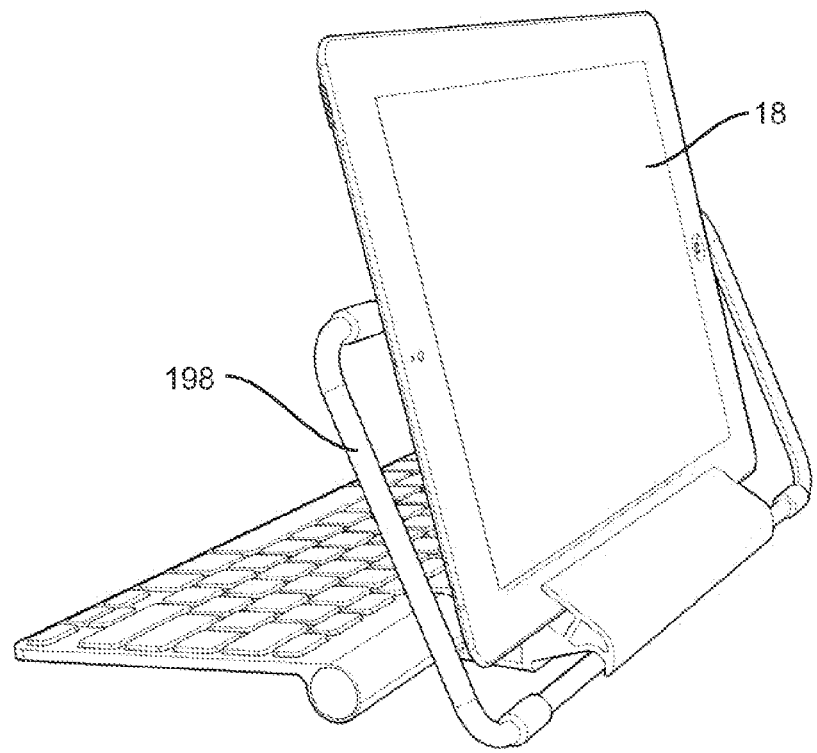
FIG. 72 folding extension-pipe in movie-mode.
Figure 73:
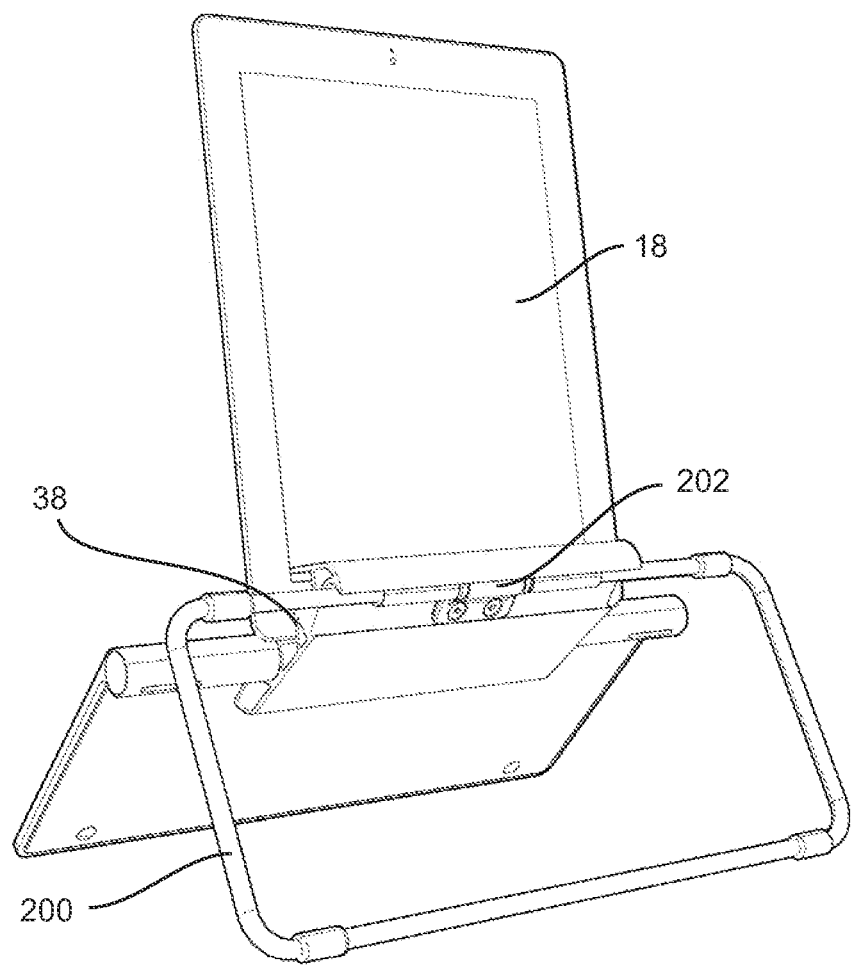
FIG. 73 folding extension-pipe in video-conferencing-mode.

FIGS. 71-73 illustrates a folding-wedge extension embodiment. In this embodiment, the stand core 10 is further comprised of a folding extension pipe 194, that rotates form a storage position folded under a stand-alone keyboard 16 to an extended position 196 using a central friction hinge 202 mounted to the pipe which engages and is retained by the stand core 10 to secure the pipe to the stand core 10 and allow rotation between the storage and extended positions. As shown in FIGS. 72 and 73, the pipe can be folded into a movie mode 198 for holding an electronic device in a movie orientation and angle for easier viewing. In a video conferencing mode 200, the pipe is used to hose the electronic device 18 in a raised position and the keyboard 38 in a writing position.

Figure 74A:
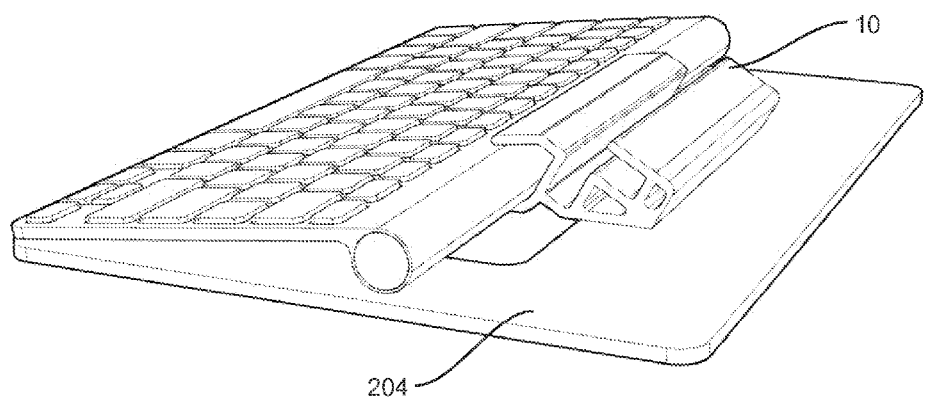
FIGS. 74A-B Rigid extended base.
Figure 74B:
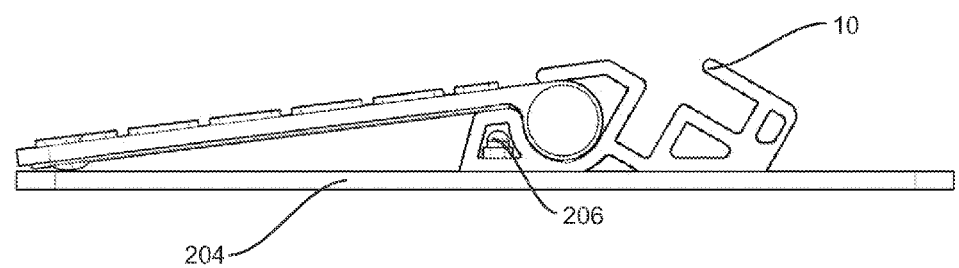

FIGS. 74A-B illustrated a rigid extended base 204 that can be used in combination with the stand core 10 of the present invention. In one embodiment the rigid extended base 204 is attached to the stand core 10 using one or more attachment screws 206, but any attachment means known in the industry could be used for creating a permanent or temporary attachment.

Figure 75A:
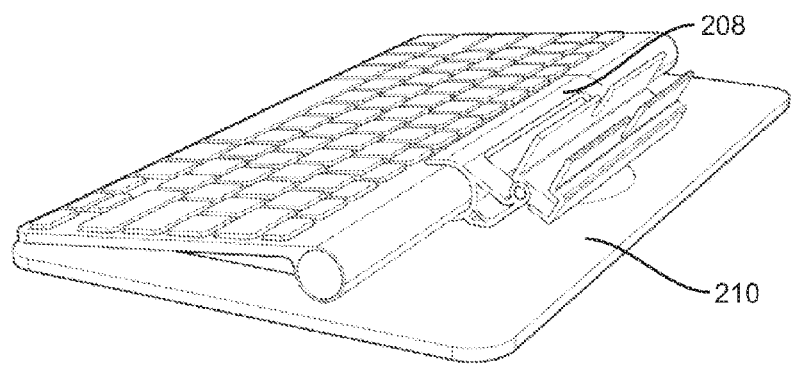
FIGS. 75A-C Rigid rotating base.
Figure 75B:
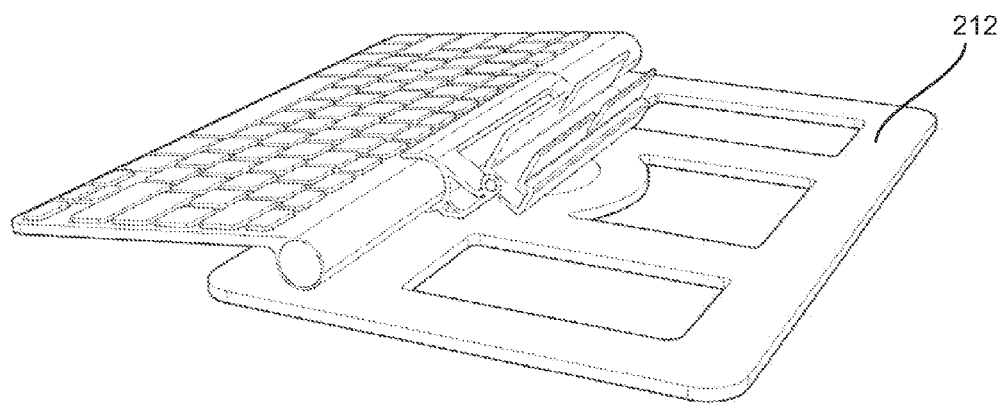
Figure 75C:
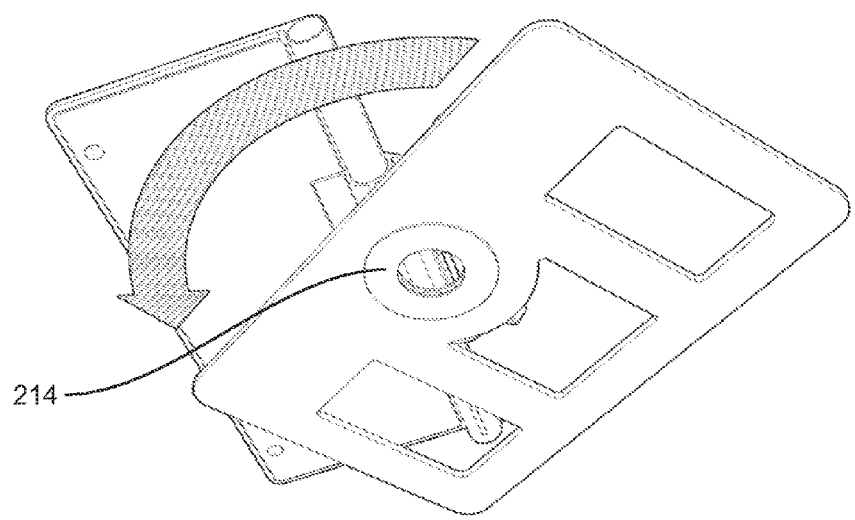

FIGS. 75A-C illustrates a rigid rotating base 210 in combination with the stand core 10 of the present invention. The rigid rotation base is connected via a swiveling flange 214 to the stand core 10 and can be rotated in a clockwise or counterclockwise direction into a storage 210 or extended position 212.

Figure 76A:
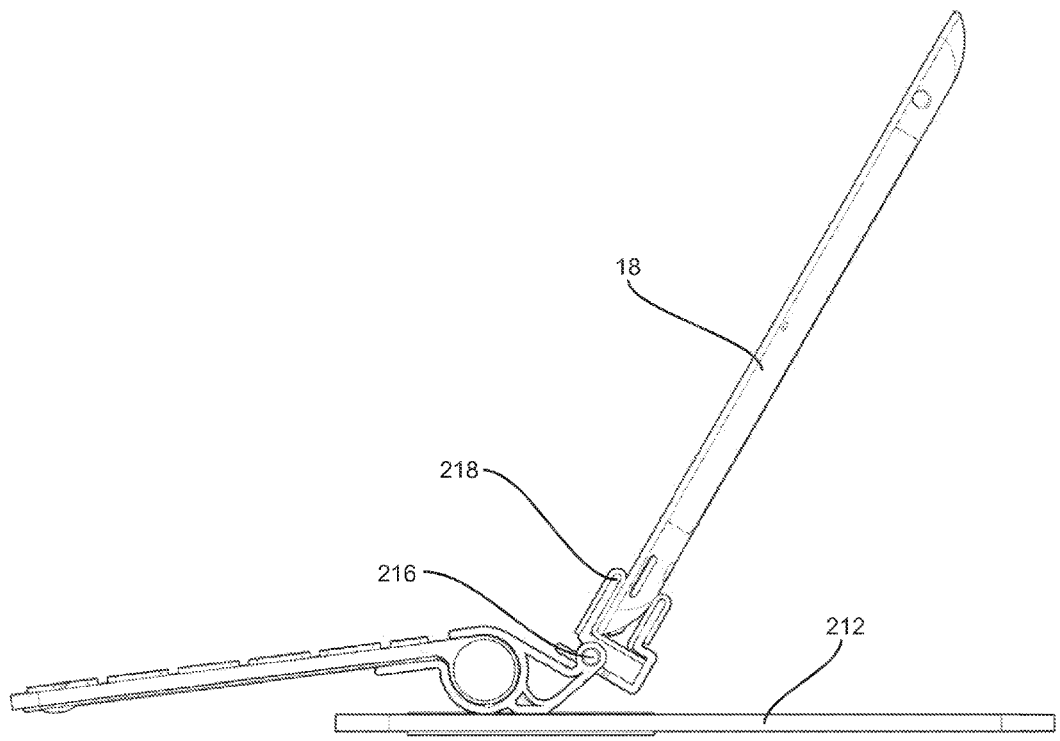
FIGS. 76A-B Nesting area with adjustable angle.
Figure 76B:
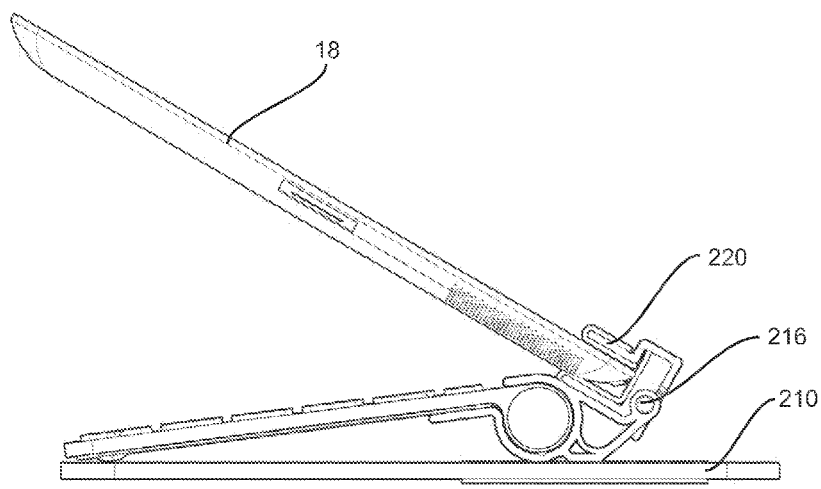

FIGS. 76A-B illustrates the nesting area of the stand core 10 with an adjustable angle. An electronic device 18 is placed into the nesting area with an adjustable stand core being provided by a friction hinge 216 for angle adjustment. For balance purposes, the rigid rotating base in rotated into an extended position 212 while the friction hinge 216 keep the electronic device at the desired, set angle. If the electronic device is rotated to have its display screen face away from the keyboard, the friction hinge 216 can allow the screen to be tilted into a more planar position for drawing or replication a drawing easel 220. The rigid rotation base can be rotate into a storage position 210 for stability purposes.

Figure 77A:
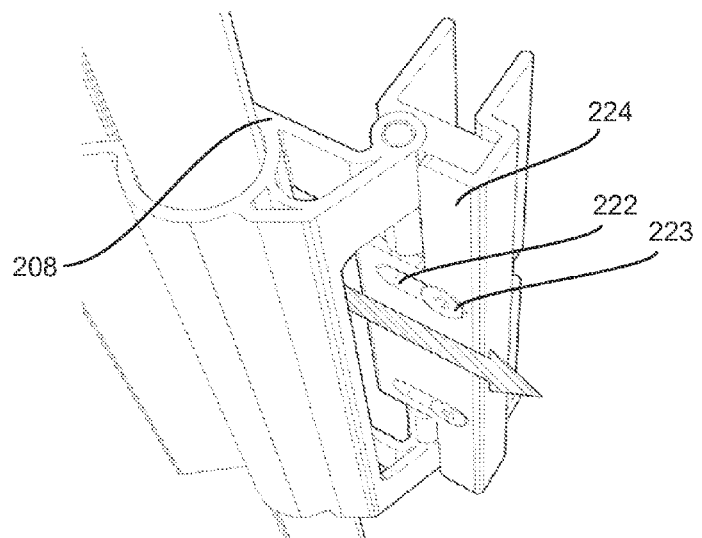
FIGS. 77A-C Nesting area with adjustable slate-device thickness.
Figure 77B:
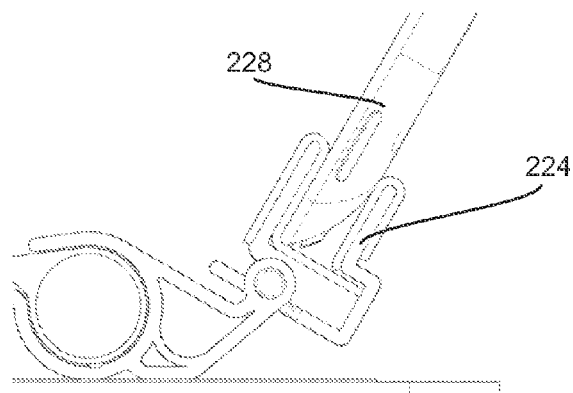
Figure 77C:
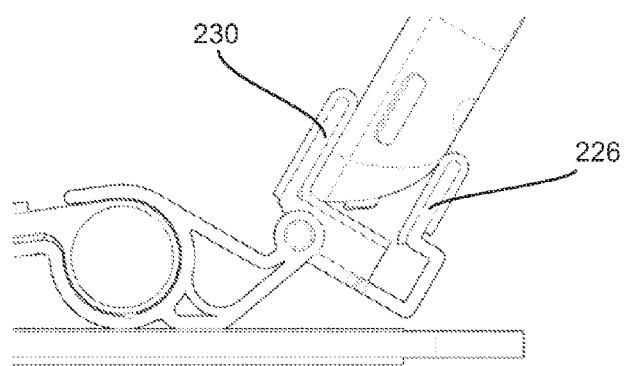
Figure 78A:
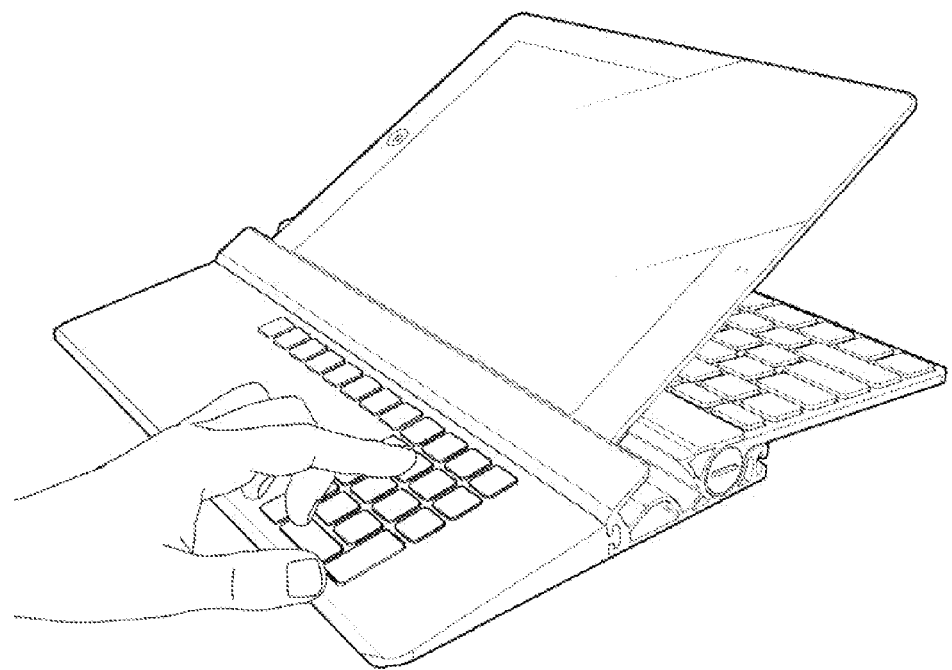
FIG. 78A trade-specific Calculator.
Figure 78B:
FIG. 78B touchscreen as art paint color palette.
Figure 78C:
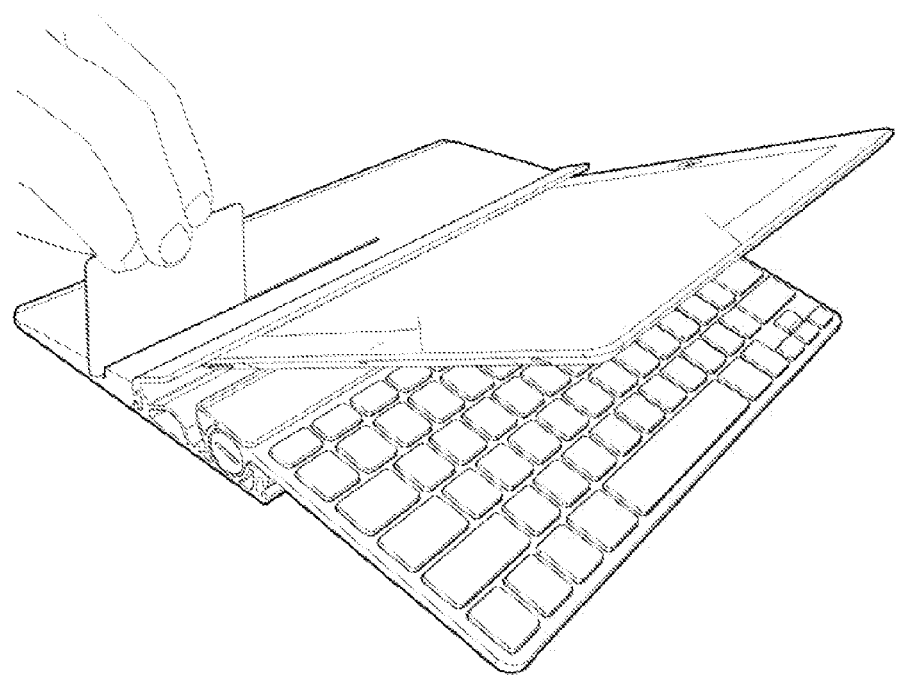
FIG. 78C: credit or smart card reader.
Figure 78D:
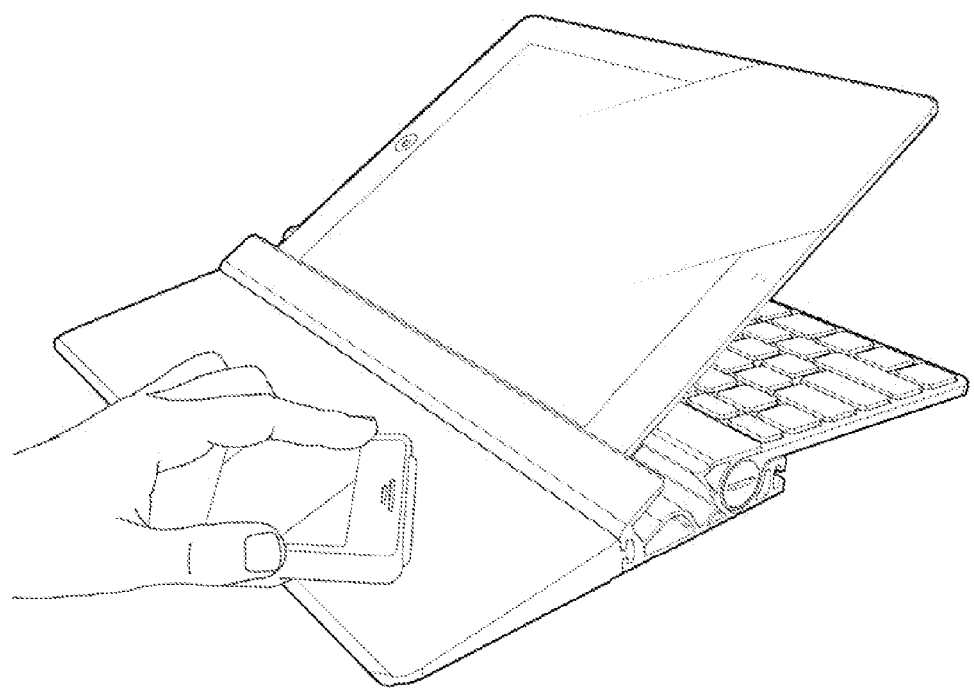
FIG. 78D: wireless proximity authentication technology (such as NFC) that acts as a bridge between slate device and other hardware.
Figure 78E:
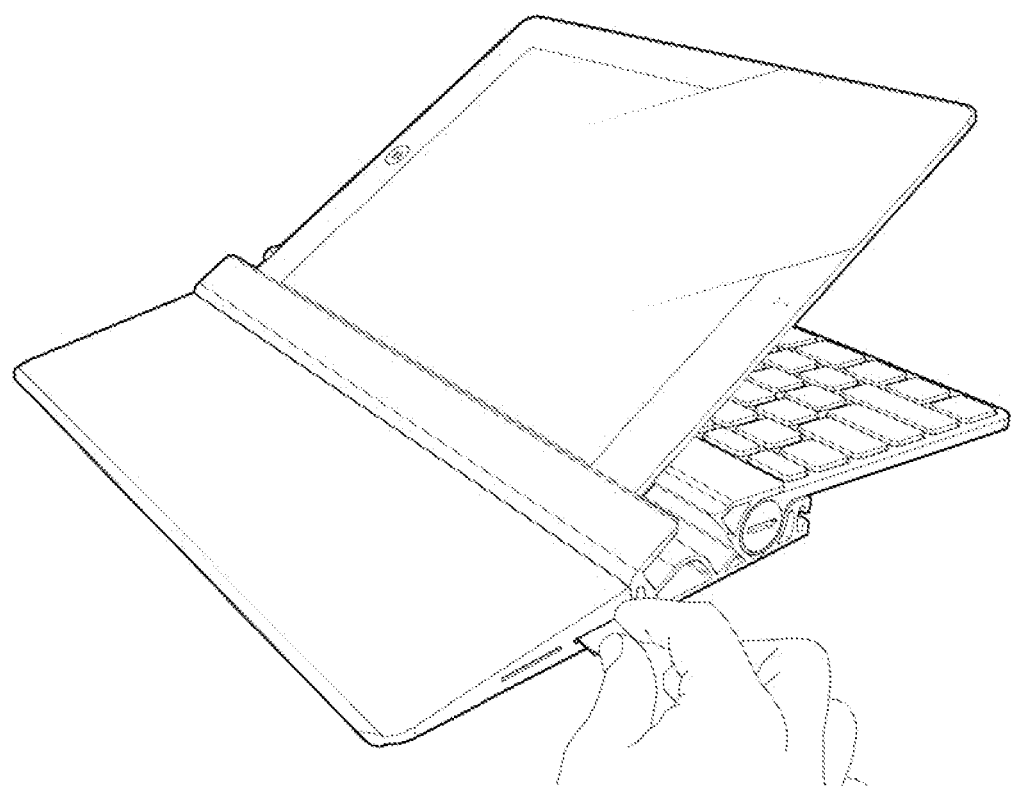
FIG. 78E: Physical storage reader such as SD card.

FIGS. 77A-C illustrates the nesting area of the stand core 10 with adjustable thickness for various electronics devices. A rail 222 for nesting area thickness adjustments is provided. The rail is affixed to the stand core 10 by two recessed screws or rivets 223 that allow one side of the nesting area to move as shown by the arrow, resulting in a larger or smaller nesting area that can accommodate a thin device 228, where the nesting area is adjusted in a narrowing position, and a thicker device 230, where the nesting area is adjusted in a widening position 226 for thicker device 230.

FIG. 78 illustrates the present invention further in combination with a smart stylus color pallet controller. The smart module provides a wireless connection to the electronic device via BLUETOOTH or other wireless protocol and enables wireless communication between the electronic device and attached device.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention. Furthermore, other areas of art may benefit from this method and adjustments to the design are anticipated. Thus, the scope of the invention should be determined by the appended claims and their legal equivalents, rather than by the examples given.

The invention claimed is:

1. A stand and drawing-easel device attached to a keyboard to use with electronic devices comprising:
   a stand-alone keyboard;
   a stand core with a nesting area for securing a mobile electronic device;
   and extension wedge;
   the stand core fixably attached to the stand-alone keyboard; and
   the stand core moveably attached to the extension wedge.

2. The device of claim 1, further comprising
   a sliding-rail on the stand core;
   a sliding rail on the extension wedge
   in a storage-position, the extension wedge fits under the stand-alone keyboard by sliding into a sliding-rail; and
   in an extended-position, the extension wedge slides into a sliding-rail; and has extra support/stability needed for use on inclined or uneven areas.

3. The device of claim 1, wherein,
   the extension wedge is comprised of a pinching sliding rail that, when slid into a rail channel of the stand core a top and bottom rail is compressed in a manner forcing the two rails to narrow towards each other when paced into a receiving rail channel on the stand core; and
   a compression force retains the extension wedge in the rail channel and ensure its engagement with the stand core.

4. The device of claim 3, further comprising
   a symmetrical extension wedge fitting in male-female;
   a sliding-rail on stand core for 'extended-position' of extension wedge and sliding-rail on stand core for 'storage-position' of extension wedge have the same cross-section;
   a sliding-rail on extension wedge has a male-female relationship with geometry of the sliding-rails on the stand core; and
   the extension wedge has a symmetrical design along its two axes' centers so there is no possibility inserting the extension wedge on the slide-on rails in a wrong orientation.

5. The device of claim 1, wherein the stand core provides two nesting areas, a first nesting area for a drawing easel position and a second nesting area for keyboard writing position.

6. The device of claim 1, further comprising:
   an opening slot for a stylus or pen storage;
   the opening defined by the combination of functional cross-sections used to store a pen or stylus;
   a pen-clip within the pen slot securing a sliding stylus;
   pen-clip access use for pen eject; and
   an edge of the pen-clip depressible for ejecting the stylus.

7. The device of claim 1, further comprising:
   a sliding stylus on the stand core;
   an inkwell is provided to retain a sliding stylus within the stand core; and
   the location of the inkwell can be anywhere on the stand core, but it preferably to the left or right side of the keyboard when attached to the stand core.

8. The device of claim 1, further comprising:
   two or more cavities in the stand core enabling the placement of a smartphone of various sizes and thicknesses in two different "writing with keyboard" angles;
   a first angle where a smartphone is placed between the upper cut of cavity and a lower cut of cavity, and an upper edge of the nesting area on the stand core for a sitting-use angle; and
   a second angle where a smartphone is placed between the lower cut of a cavity, and a lower cut of a cavity, and the upper edge of the nesting area on the stand core for a laying-use angle.

9. The device of claim 1 further comprising: a folded cover outside of the writing with keyboard nesting area which is left folded outside of nesting area for the writing with keyboard position.

10. The device of claim 1, further comprising: a custom-cut privacy sheet for mobile electronic device in landscape or portrait orientation covers the active screen area and overextends for the gripping area in nesting areas where such sheets are held in place.

11. The device of claim 1, further comprising: the width of the extension wedge matches the width of the stand-alone keyboard to provide maximum width of contact when used on extended-position resting on a person's lap.

12. The device of claim 11, wherein the extension wedge is further comprised of a cut-out on extension wedge that creates a handle that allows to carrying of the extension wedge, stand core, and stand-alone keyboard assembled together as one unit.

13. The device of claim 12, wherein the extension wedge cavity is further comprised of a cut out pull-handle to slide out from a storage-position, providing extra gripping surface to facilitate pulling.

14. The device of claim 13, wherein the cut-out handle on extension wedge is used to hang the extension wedge, stand core, and stand-alone keyboard on a wall or other vertical/inclined surface.

15. The device of claim 1, further comprising: a cross-linked structure x-section providing a structural frame that prevents the stand core from bending when user presses on screen of the slate-device or smartphone during touch input.

16. The device of claim 15 further comprising:
- a symmetrical extension wedge fitting in male-female rail;
- a sliding-rail on the stand core for an 'extended-position' of the extension wedge;
- a sliding-rail on the stand core for a 'storage-position' of the extension wedge having the same cross-section;
- a sliding-rail on the extension wedge has a male-female relationship with the sliding-rails on the stand core; and
- the extension wedge has a symmetrical design along its two axes' centers so there is no possibility inserting the extension wedge on the slide-on rails in a wrong orientation.

17. The device of claim 15, further comprising: a thicker cross-section at the converging end of the extension wedge creates an elongated foot or line of contact to a flat groundplan for the product when the extension wedge is in either a storage-position or an extended-position.

18. The device of claim 1, further comprising
- a sliding tray extension embodiment wherein the stand core;
- an eject window for a sliding stylus;
- a sliding tray which can be moved between extended and storage positions; and
- an outer rail on the sliding tray engages an outer rail on the stand core a center rail on the sliding tray engages a center rail on the stand core to enable the sliding tray to be engaged with the stand core and move between a storage position and an extended position in the direction illustrated by the arrow as the rails of the sliding extension move with respect to those on the stand core.

19. The device of claim 1, wherein the stand core is further comprised of a folding extension pipe that rotates form a storage position folded under a stand-alone keyboard to an extended position using a central friction hinge mounted to the pipe which engages and is retained by the stand core to secure the pipe to the stand core and allow rotation between the storage and extended positions.

20. The device of claim 1, further comprising
- a rigid extended base that can be used in combination with the stand core;
- the rigid extended base is attached to the stand core using one or more attachment screws.

21. The device of claim 1, further comprising
- a rigid rotating base in combination with the stand core; and
- the rigid rotation base is connected via a swiveling flange to the stand core and can be rotated in a clockwise or counterclockwise direction into a storage or extended position.

* * * * *